Jan. 1, 1924
H. B. SMITH
MACHINE FOR MAKING COVERED PAPER BOXES
Filed Sept. 16, 1921
1,479,401
22 Sheets-Sheet 1
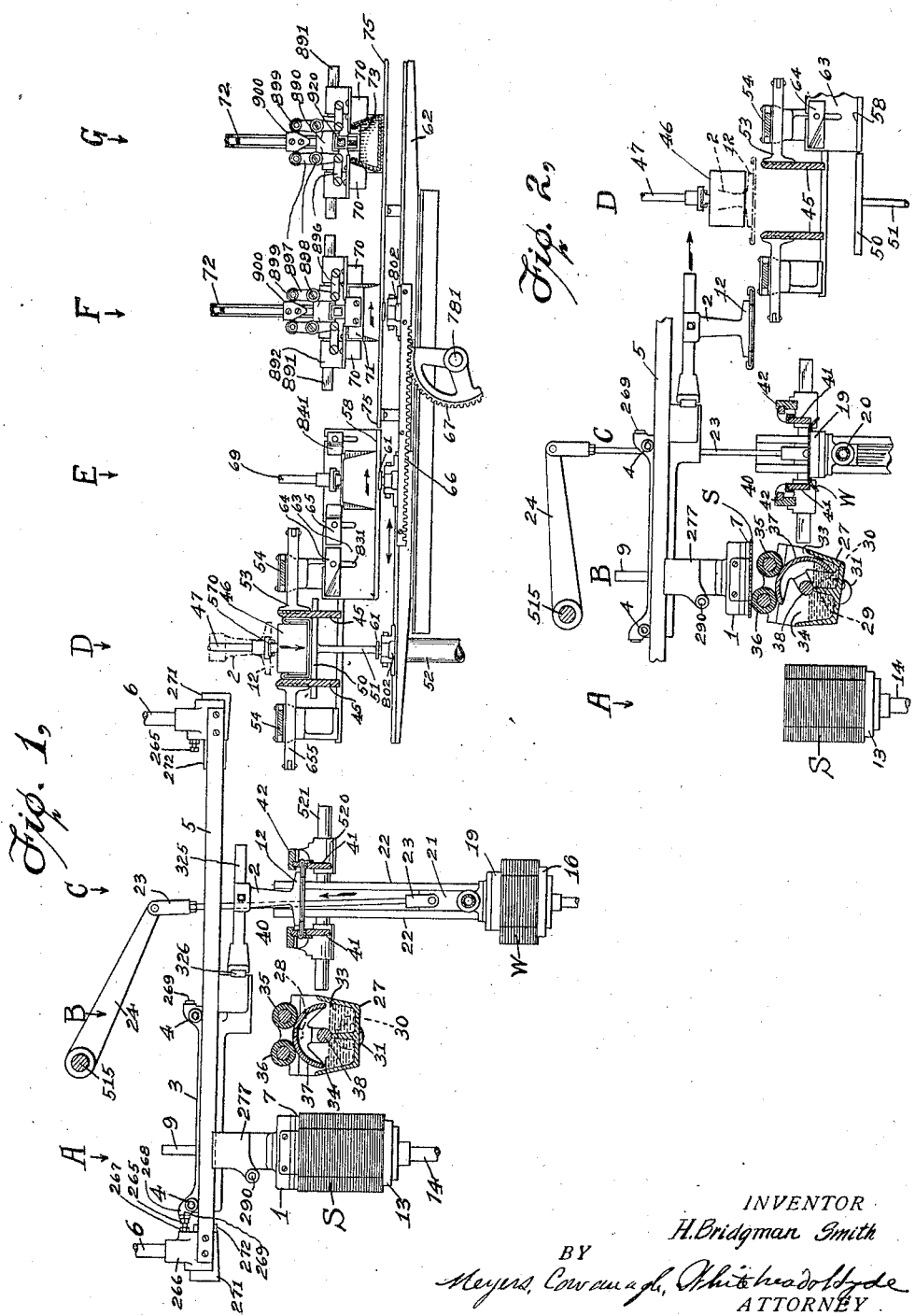
INVENTOR
H. Bridgman Smith
BY
Meyers, Cavanagh, Whitehead & Hyde
ATTORNEY

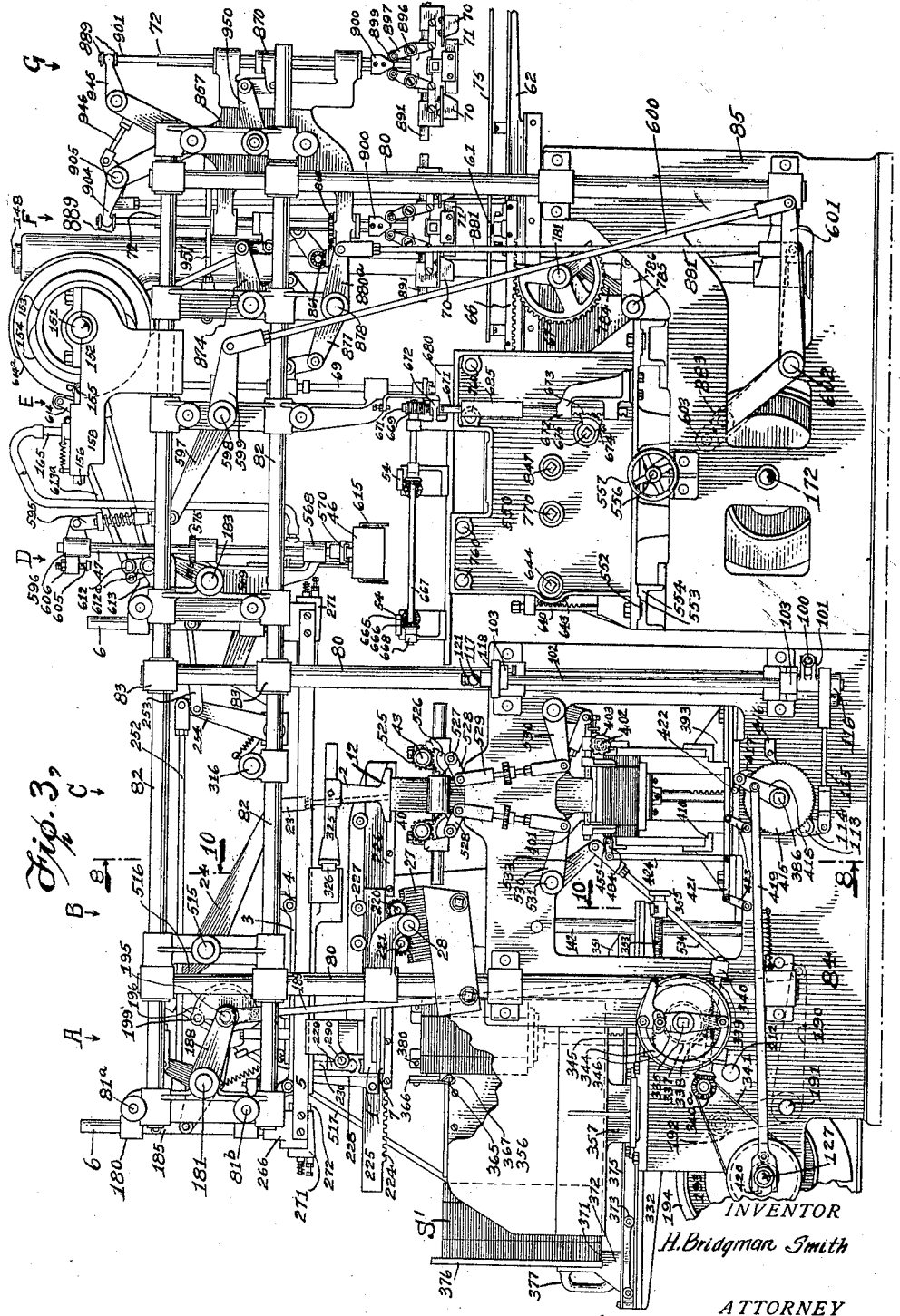

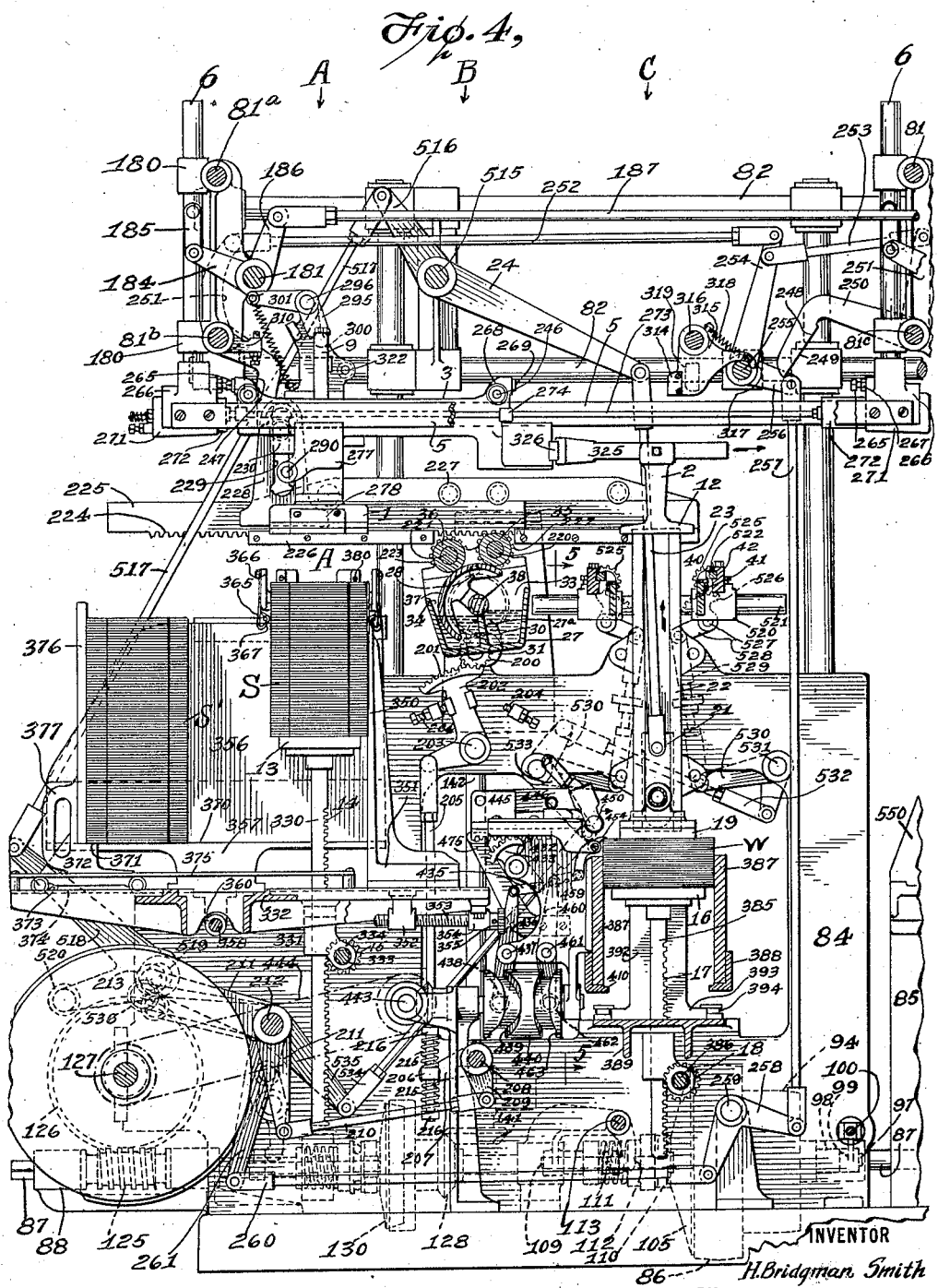

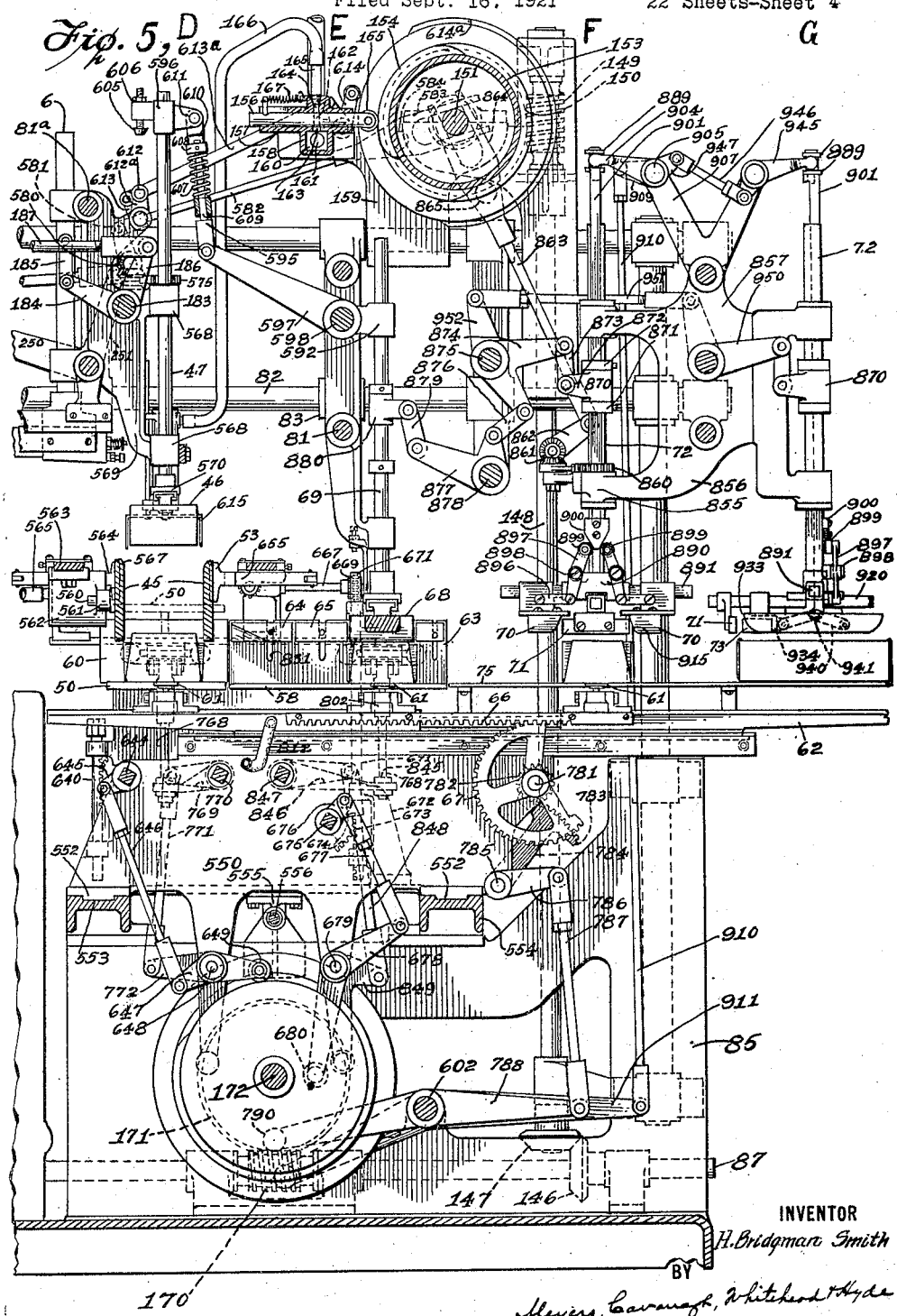

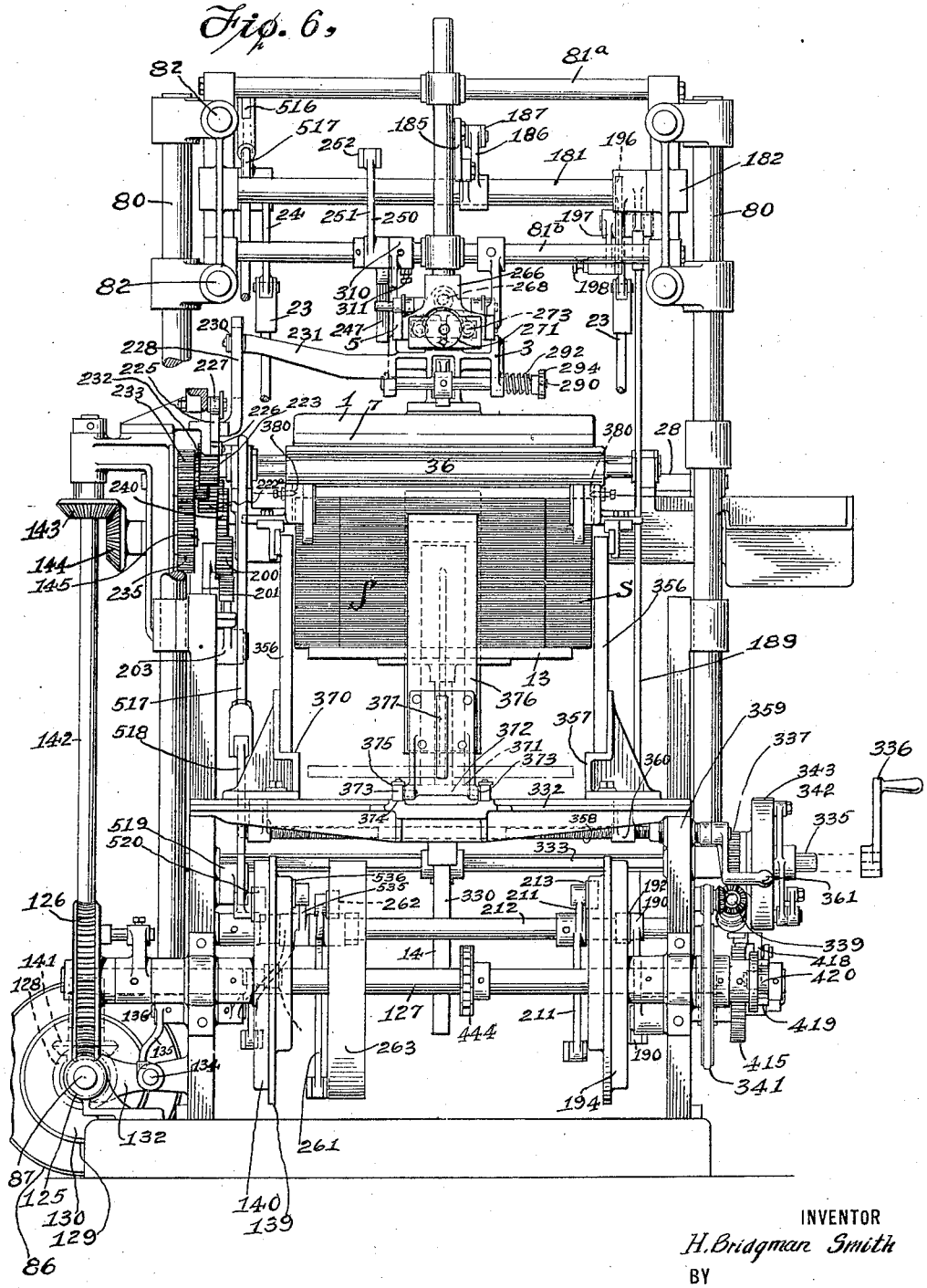

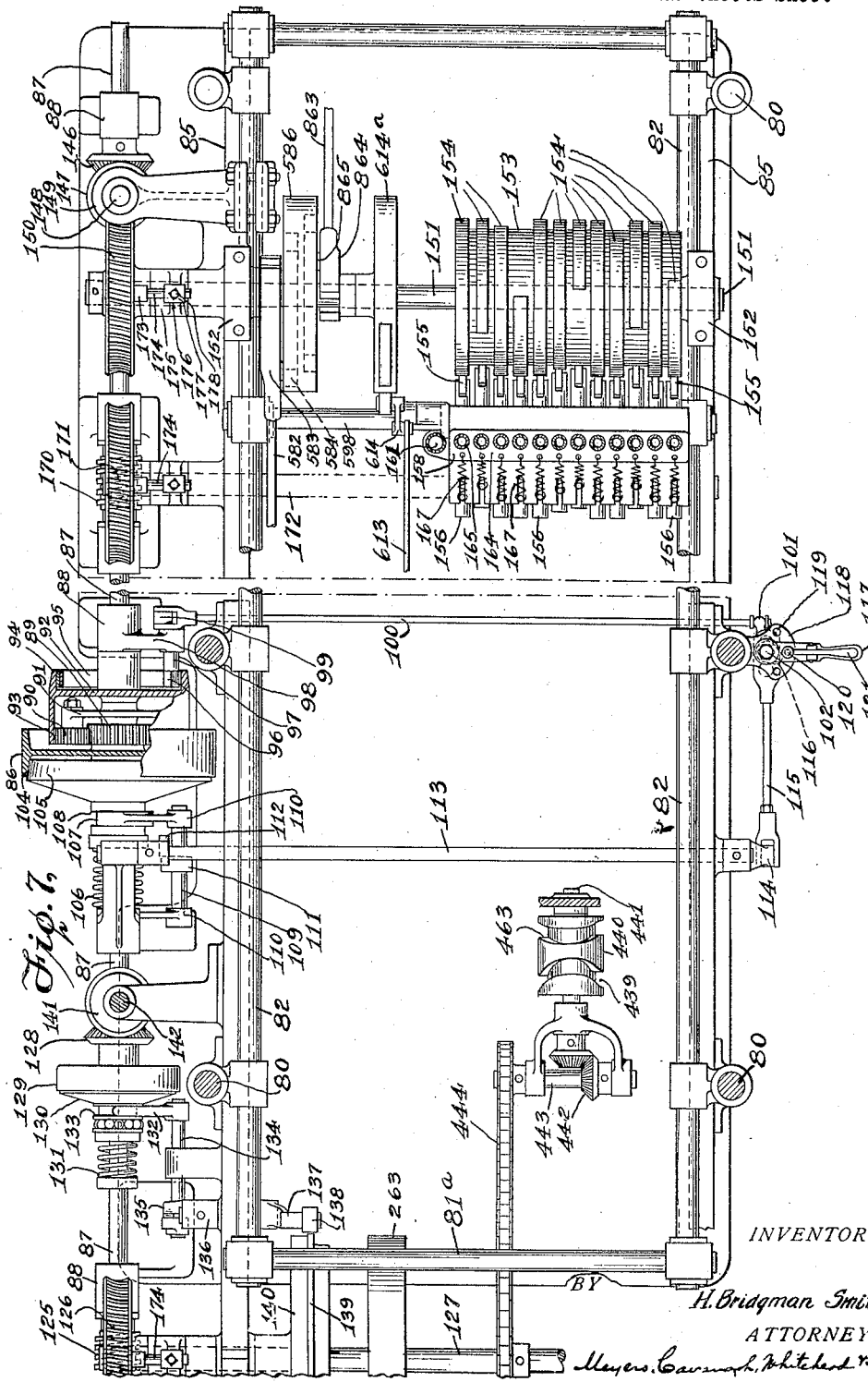

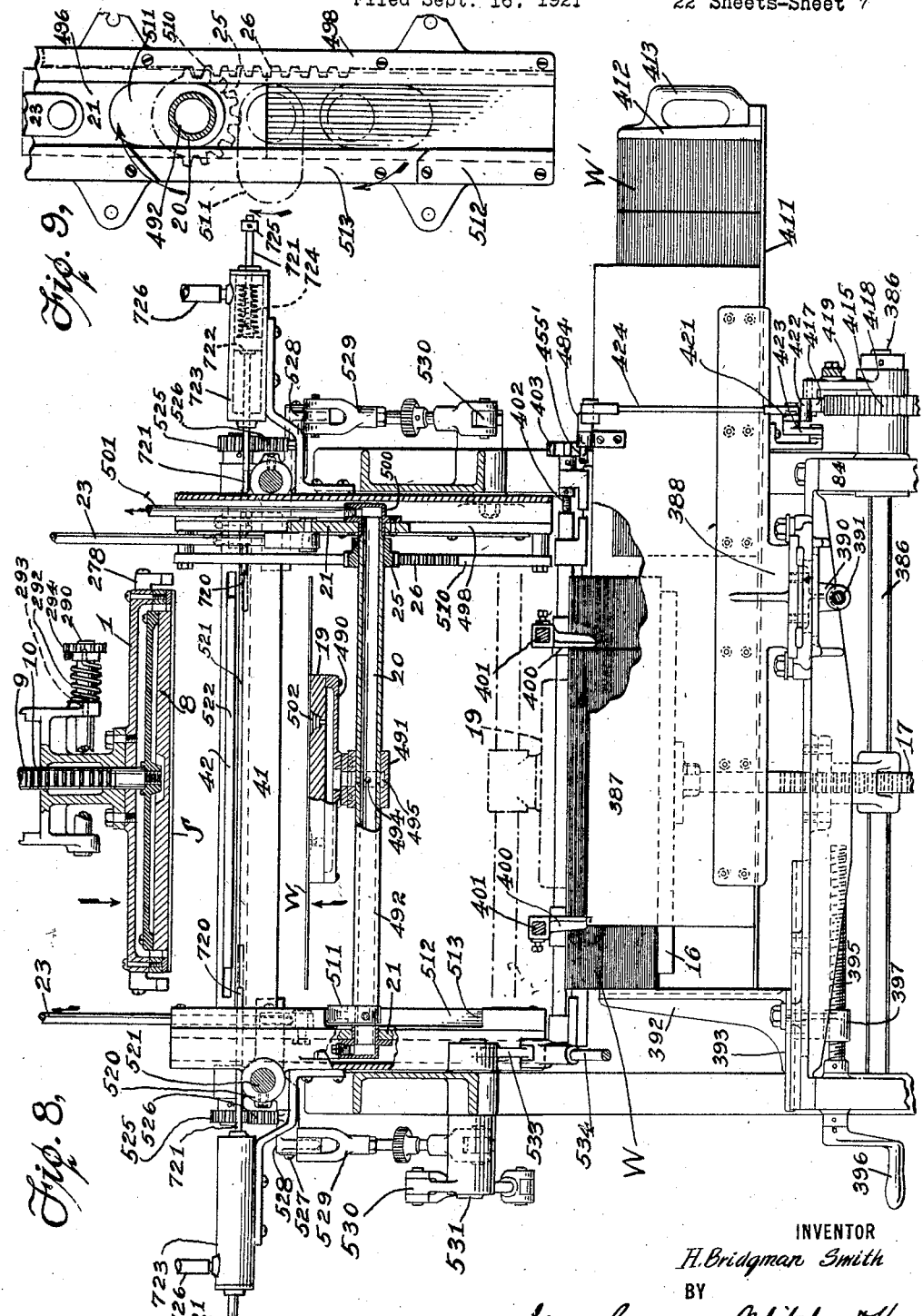

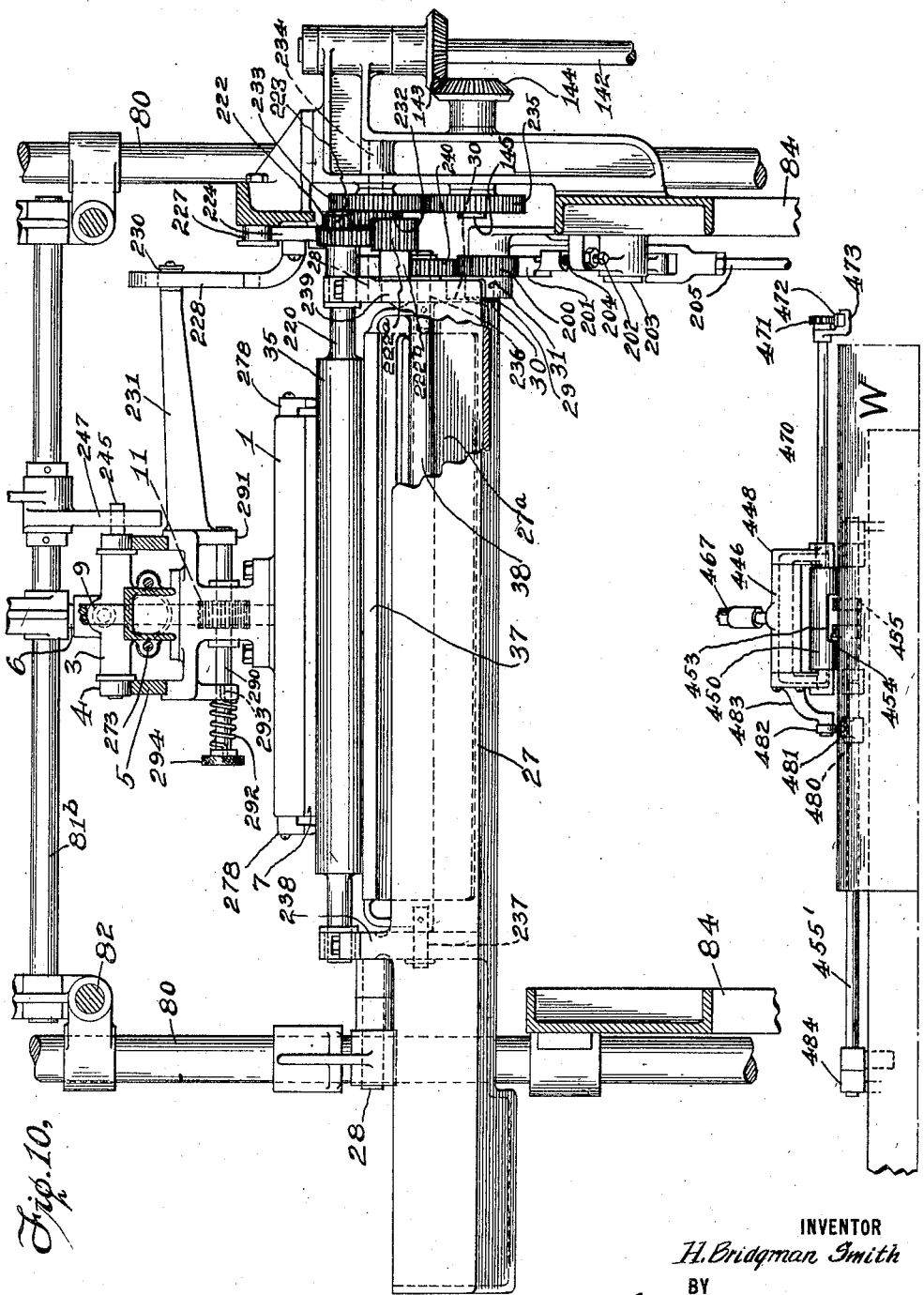

Jan. 1, 1924. 1,479,401
H. B. SMITH
MACHINE FOR MAKING COVERED PAPER BOXES
Filed Sept. 16, 1921 22 Sheets-Sheet 9

INVENTOR
H. Bridgman Smith
BY
Meyers, Cavanagh, Whitehead & Hyde
ATTORNEYS

Jan. 1, 1924
H. B. SMITH
MACHINE FOR MAKING COVERED PAPER BOXES
Filed Sept. 16, 1921
1,479,401
22 Sheets-Sheet 10
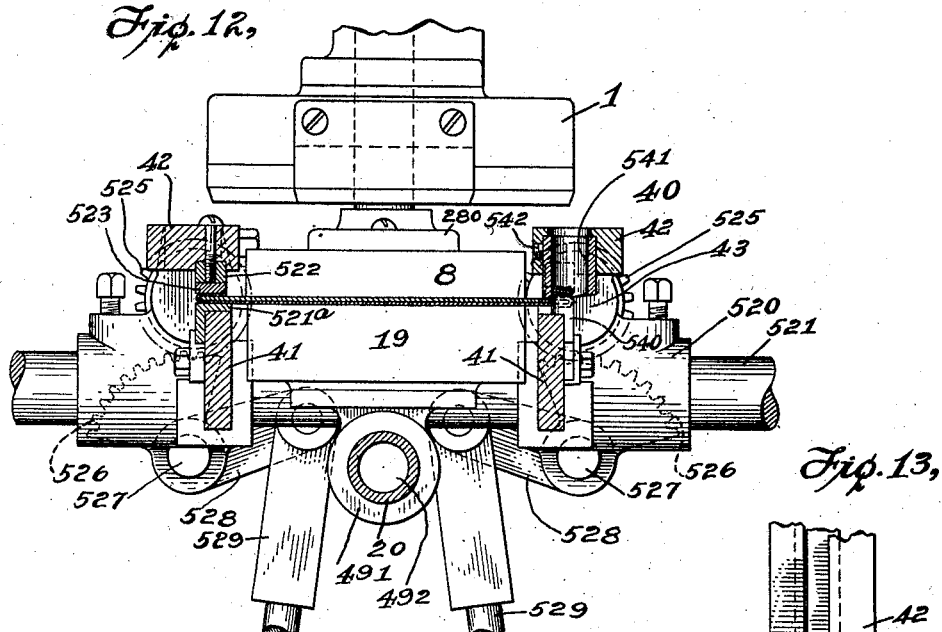
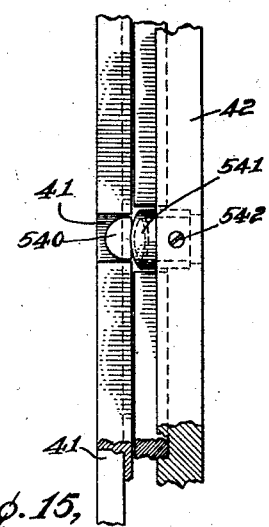
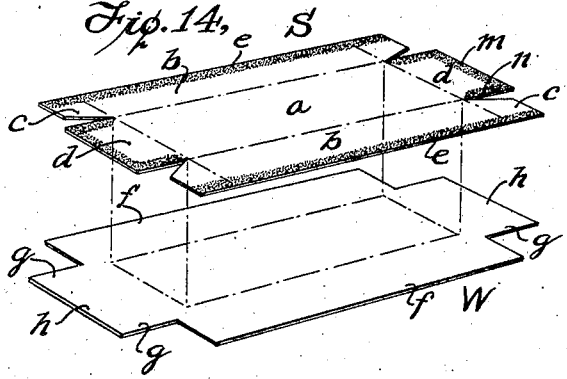
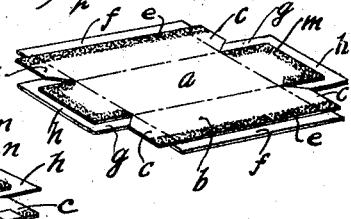
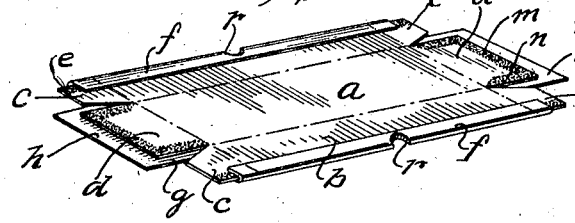
INVENTOR
H. Bridgman Smith
BY
Meyers, Cavanagh, Whitehead & Pyle
ATTORNEYS

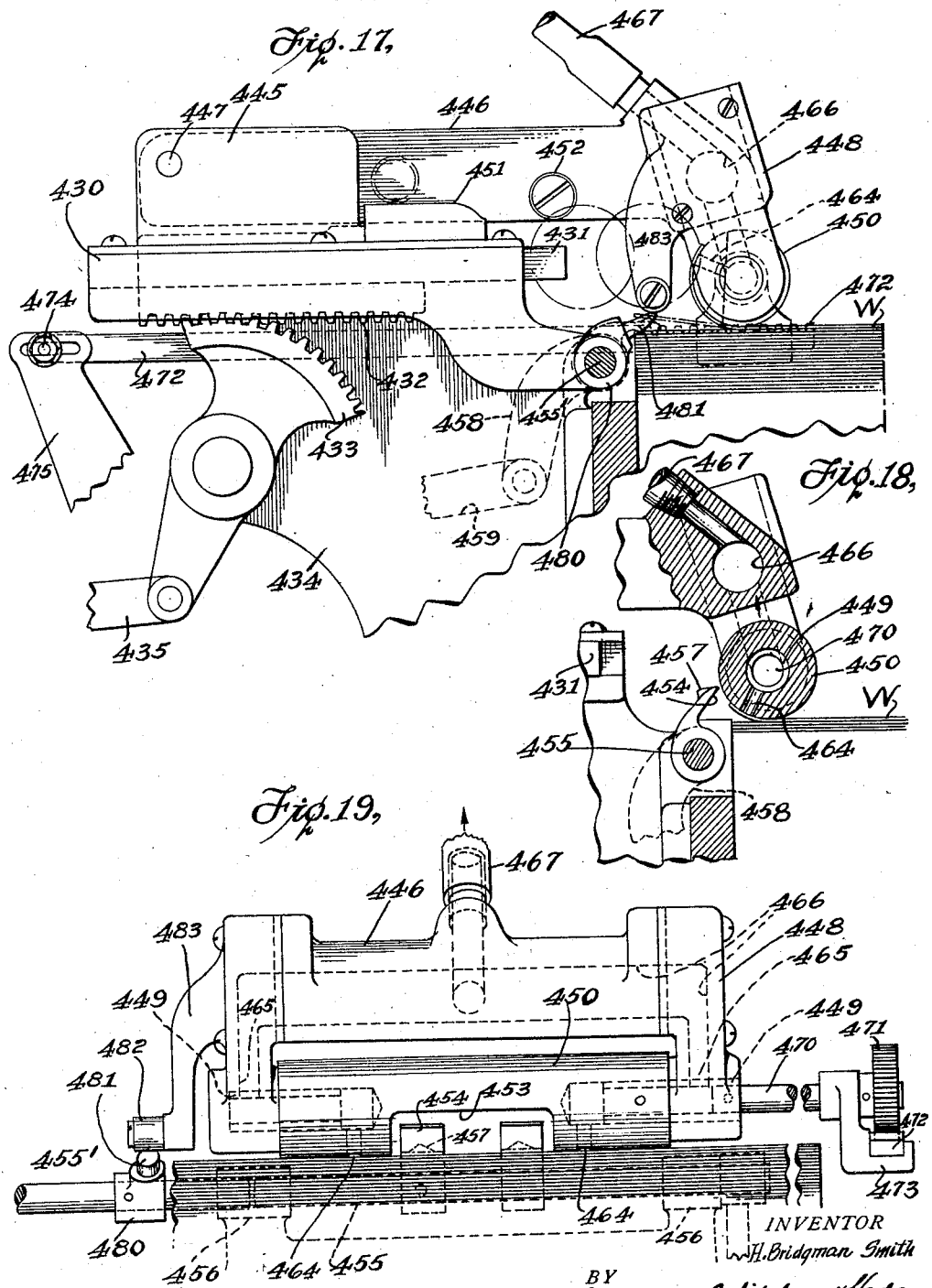

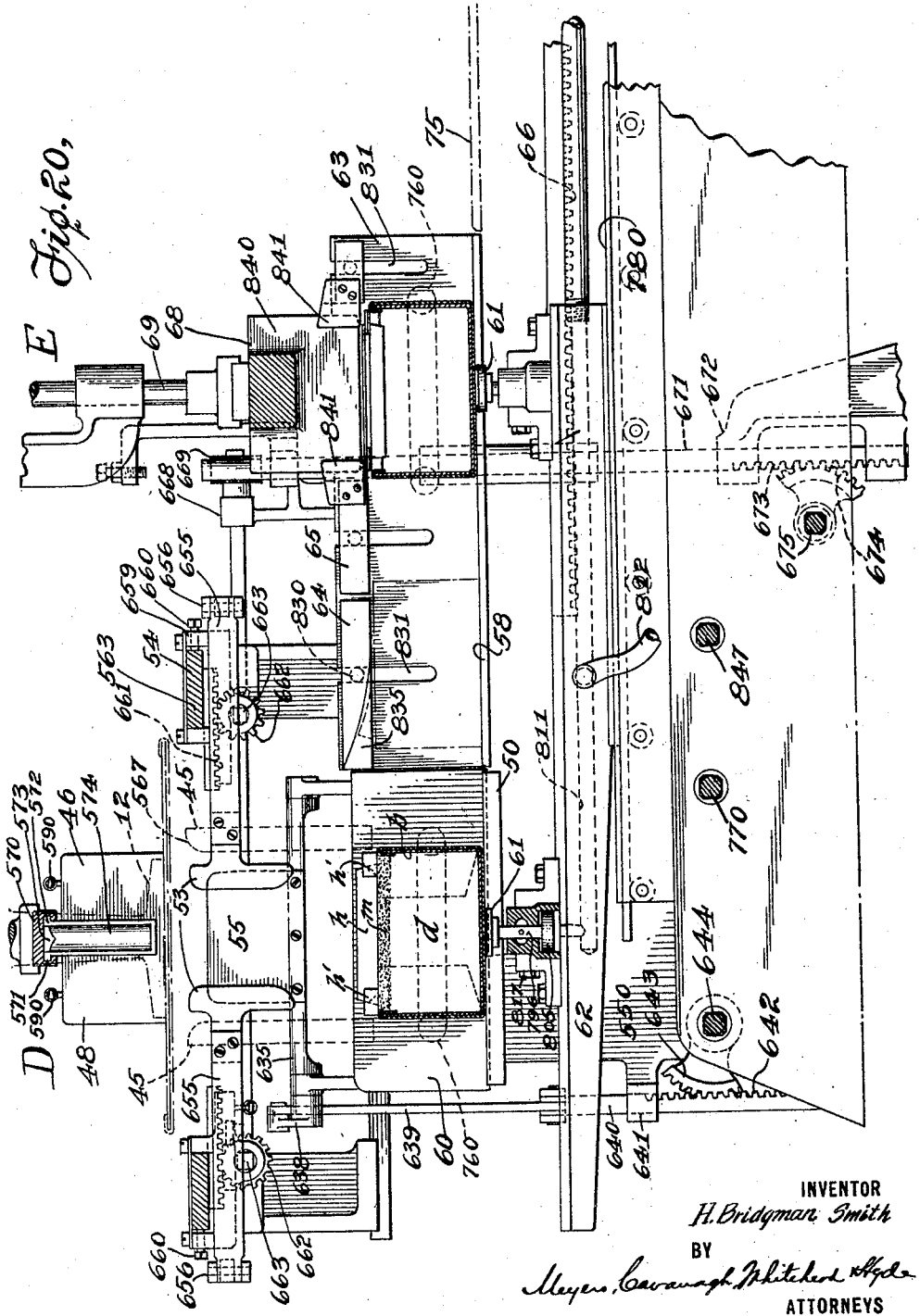

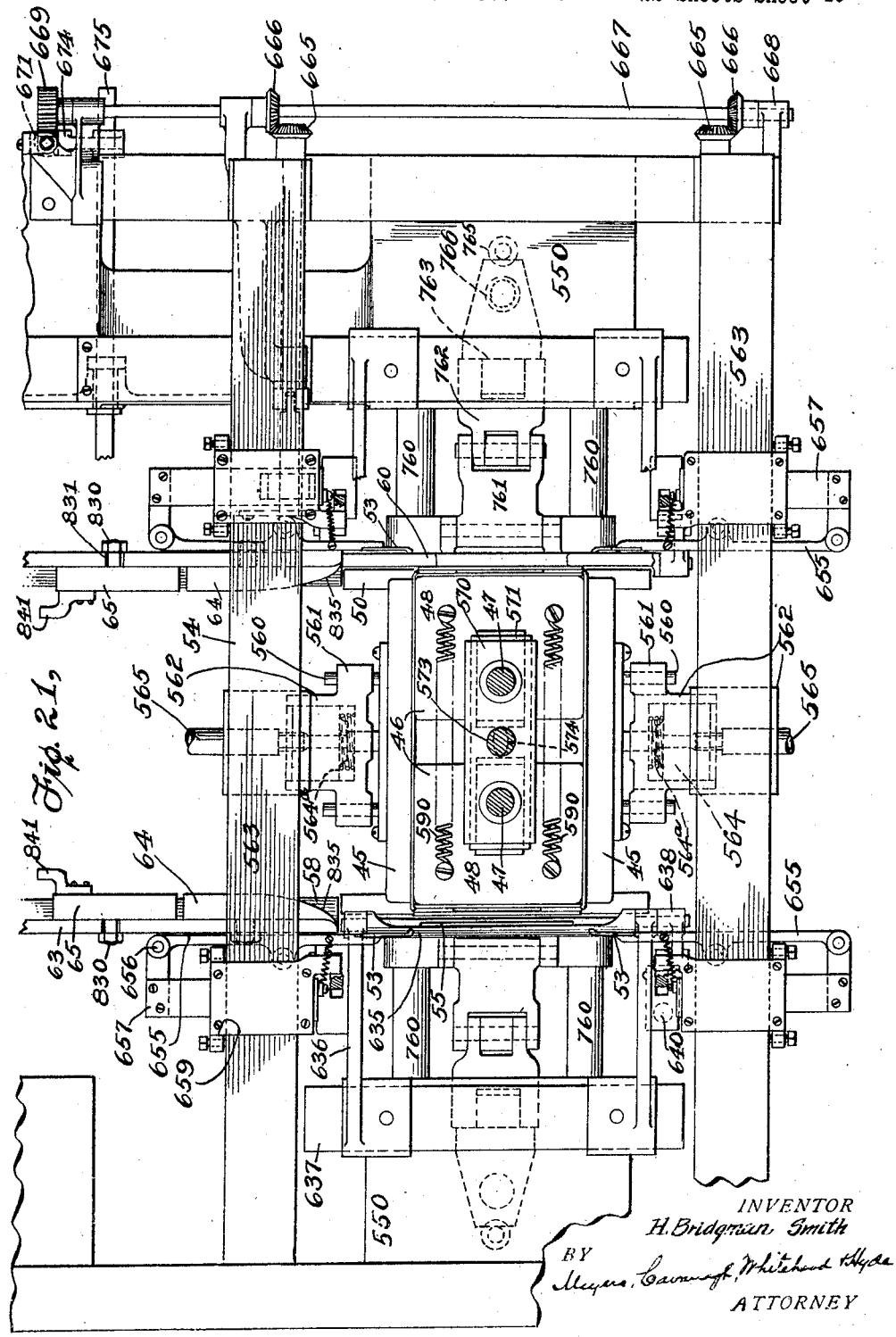

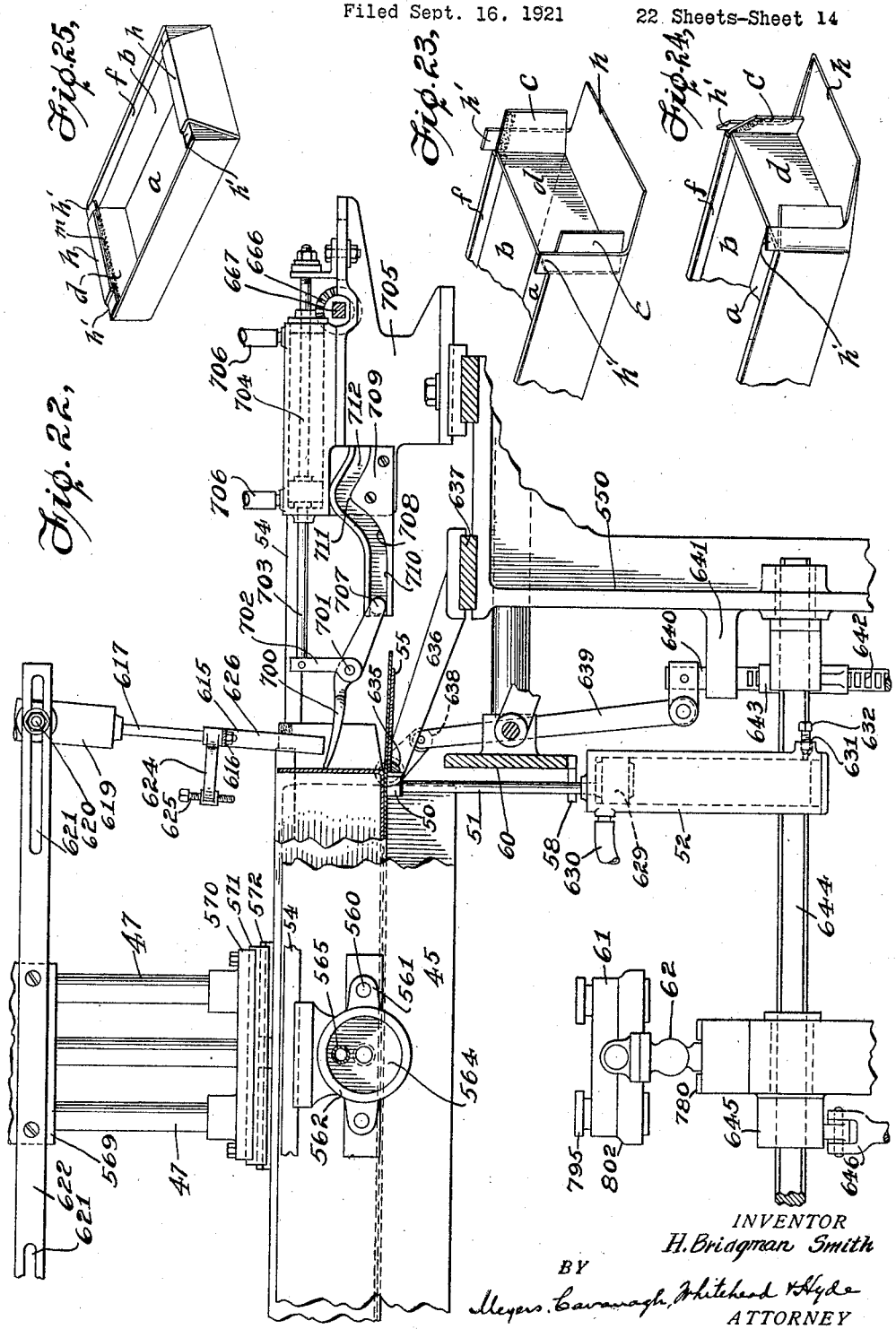

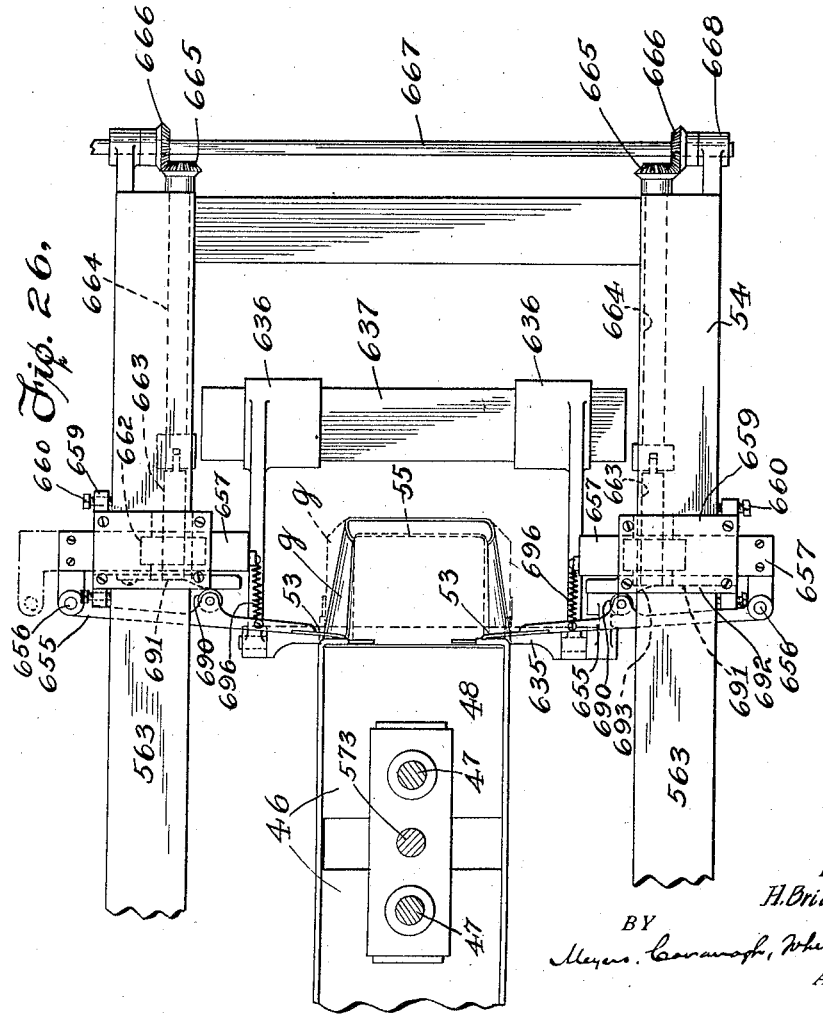

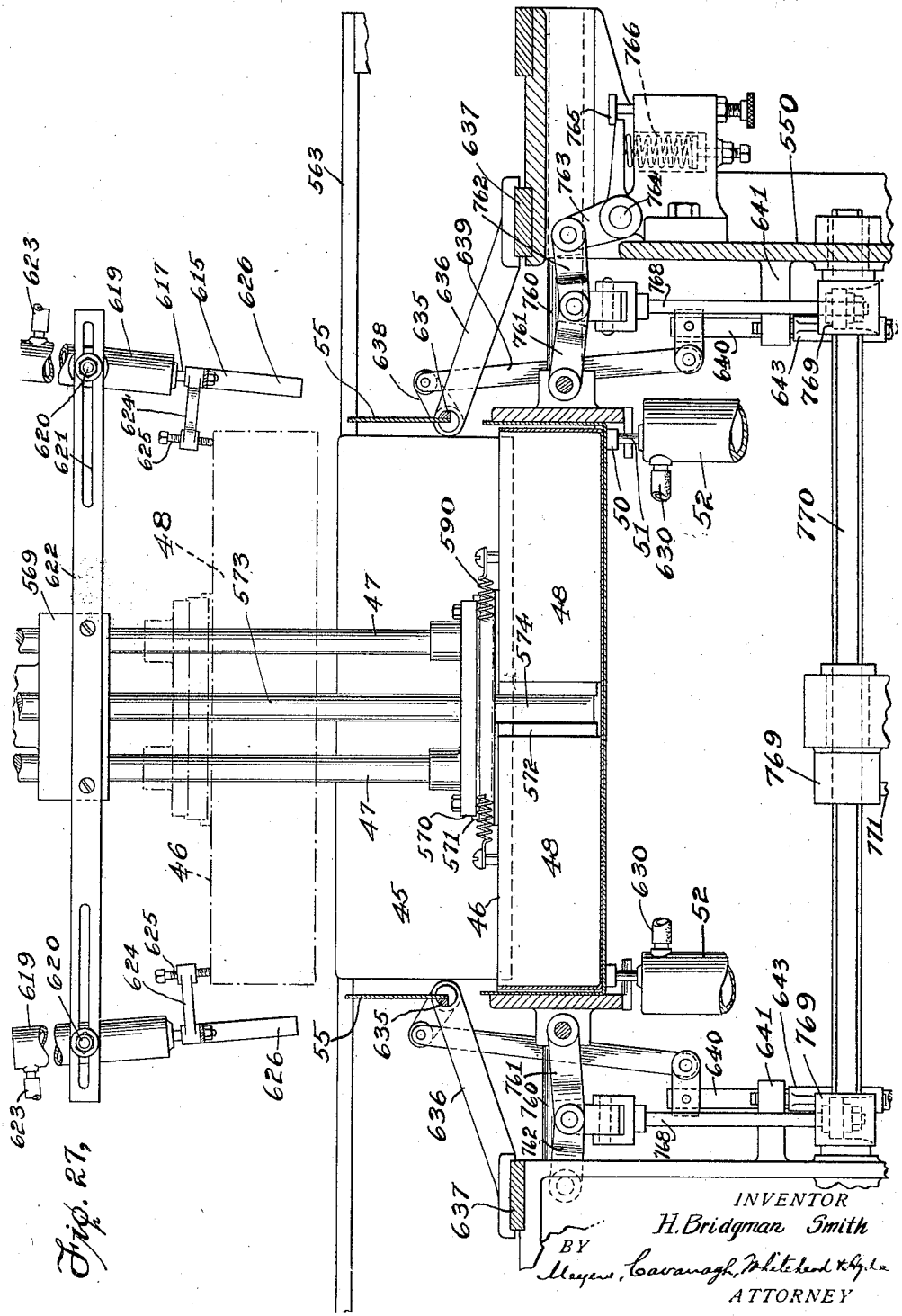

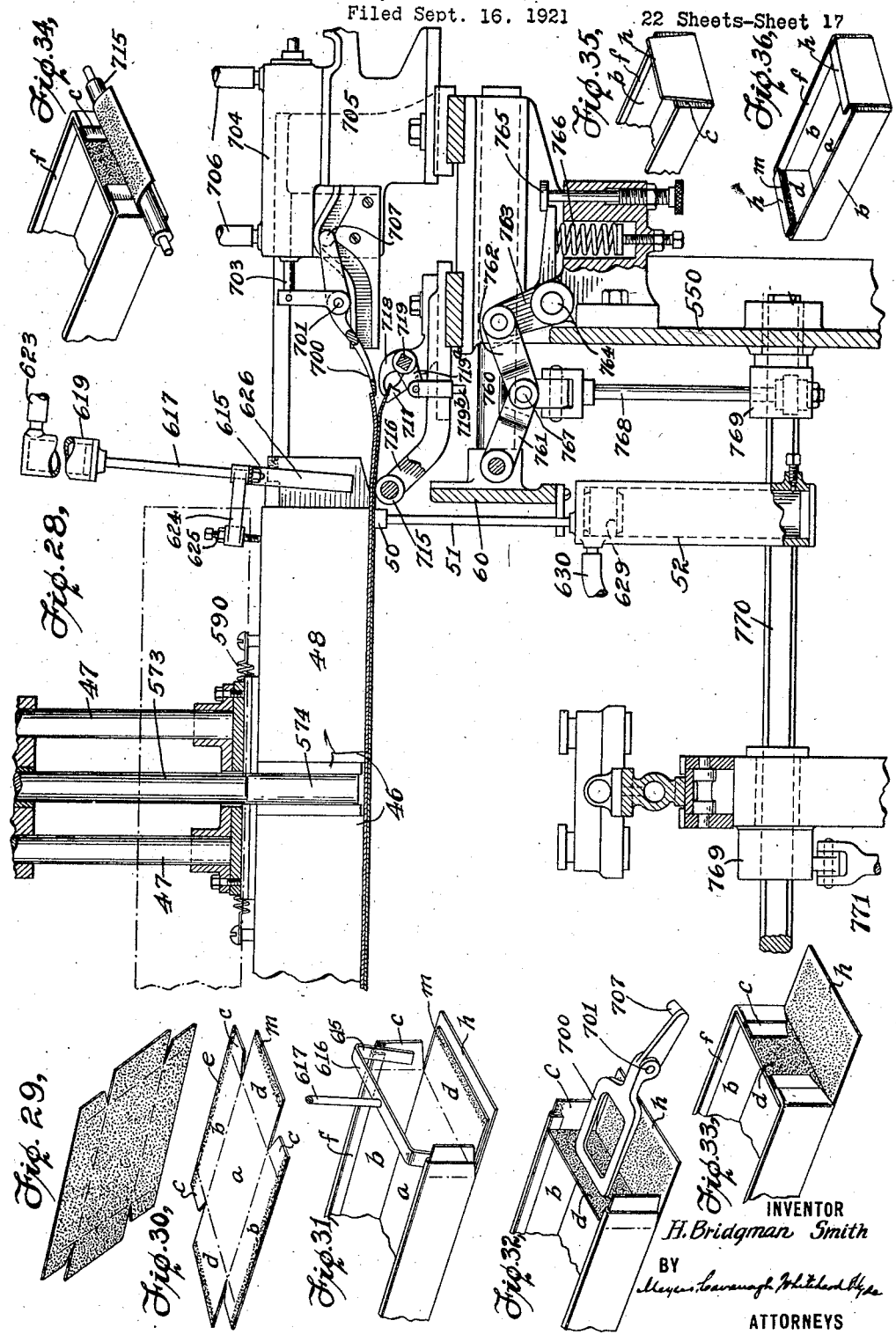

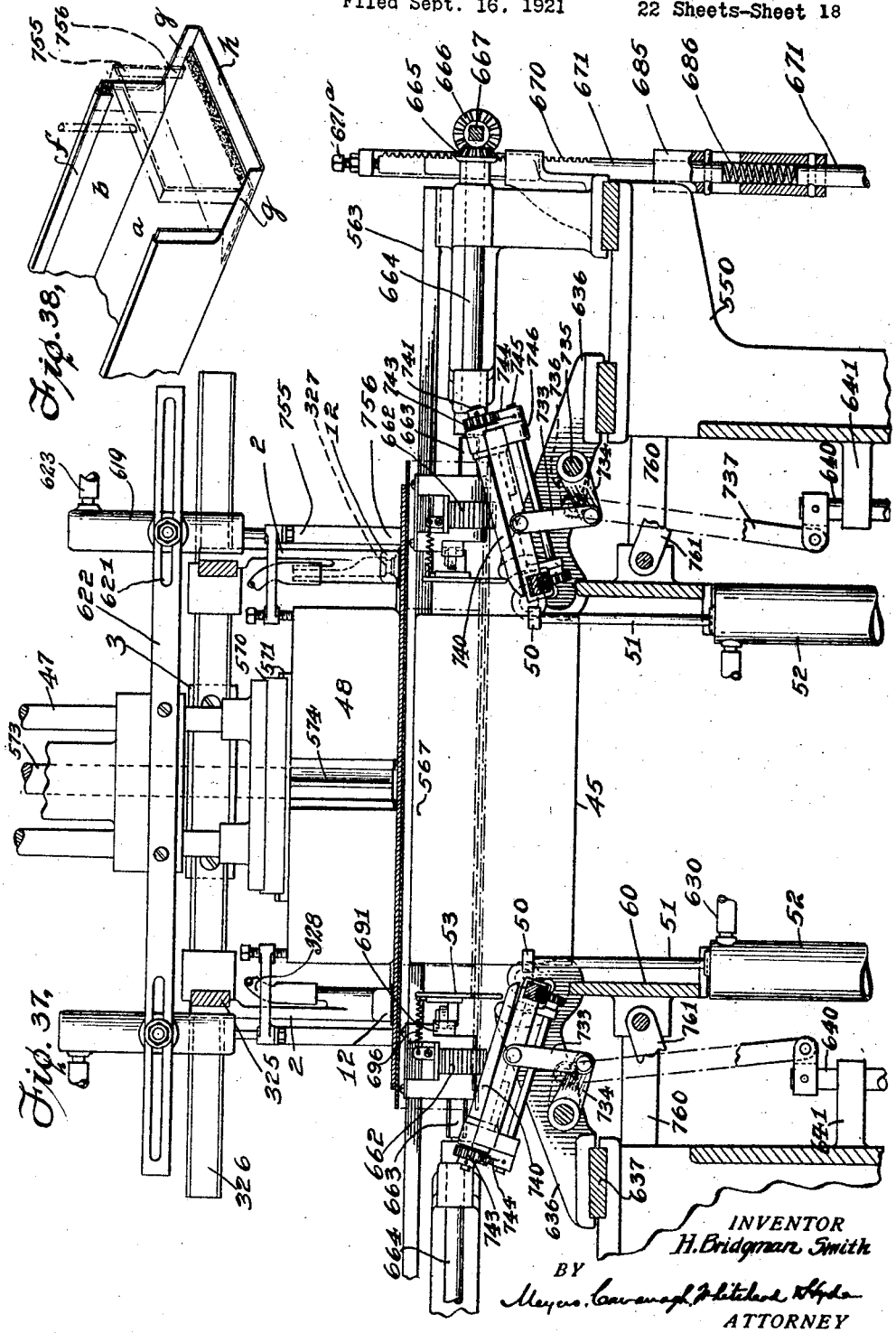

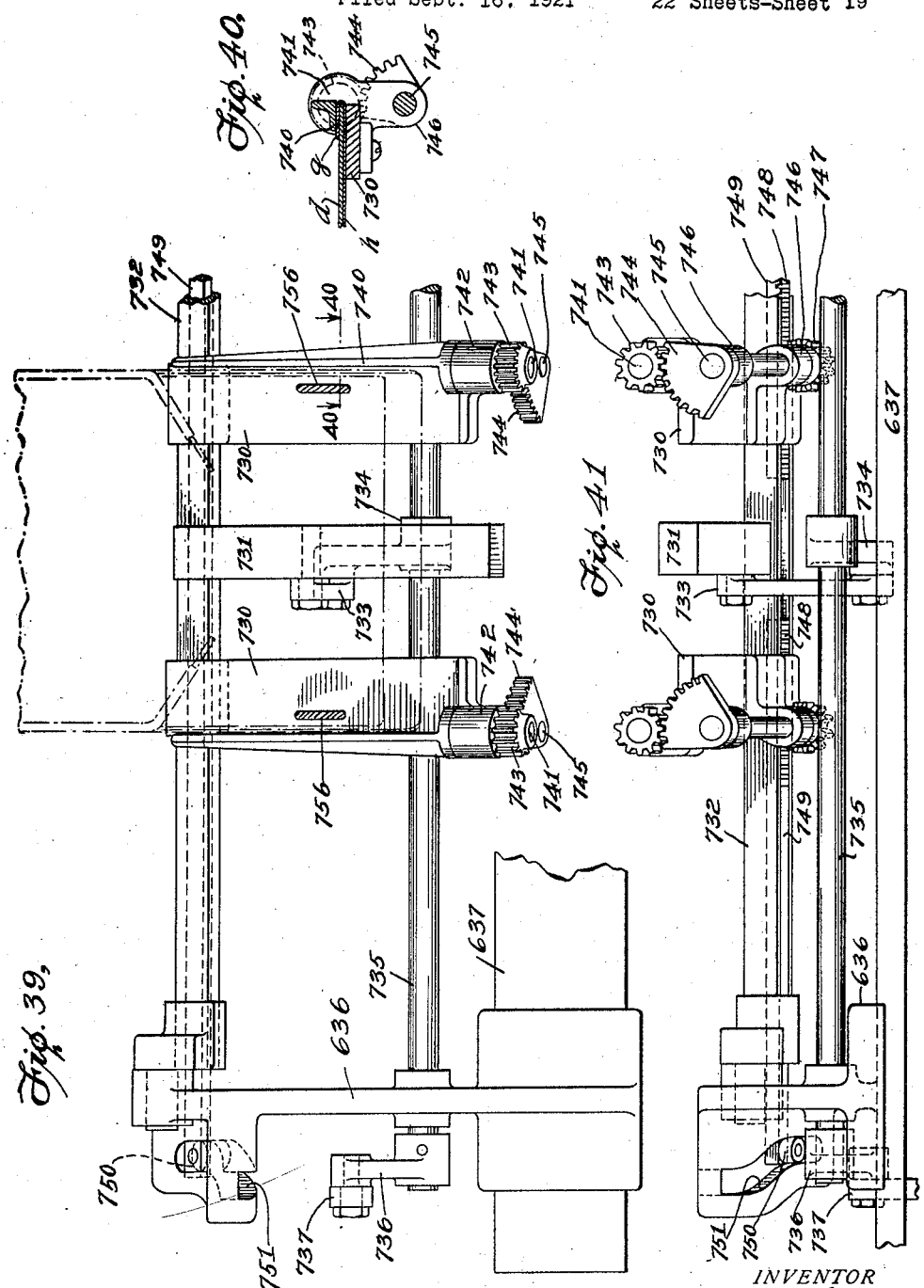

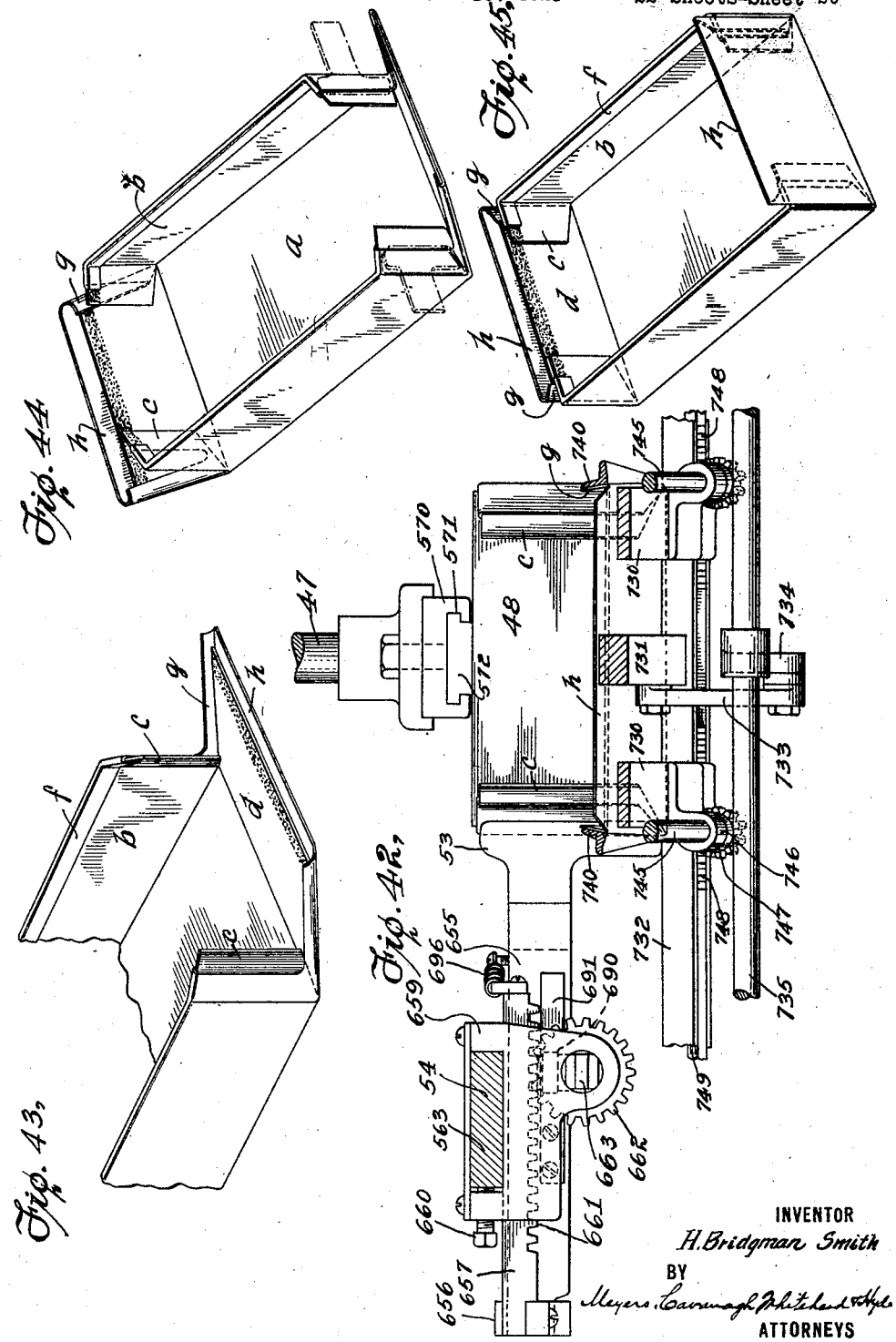

Jan. 1, 1924
H. B. SMITH
MACHINE FOR MAKING COVERED PAPER BOXES
Filed Sept. 16, 1921
1,479,401
22 Sheets-Sheet 21
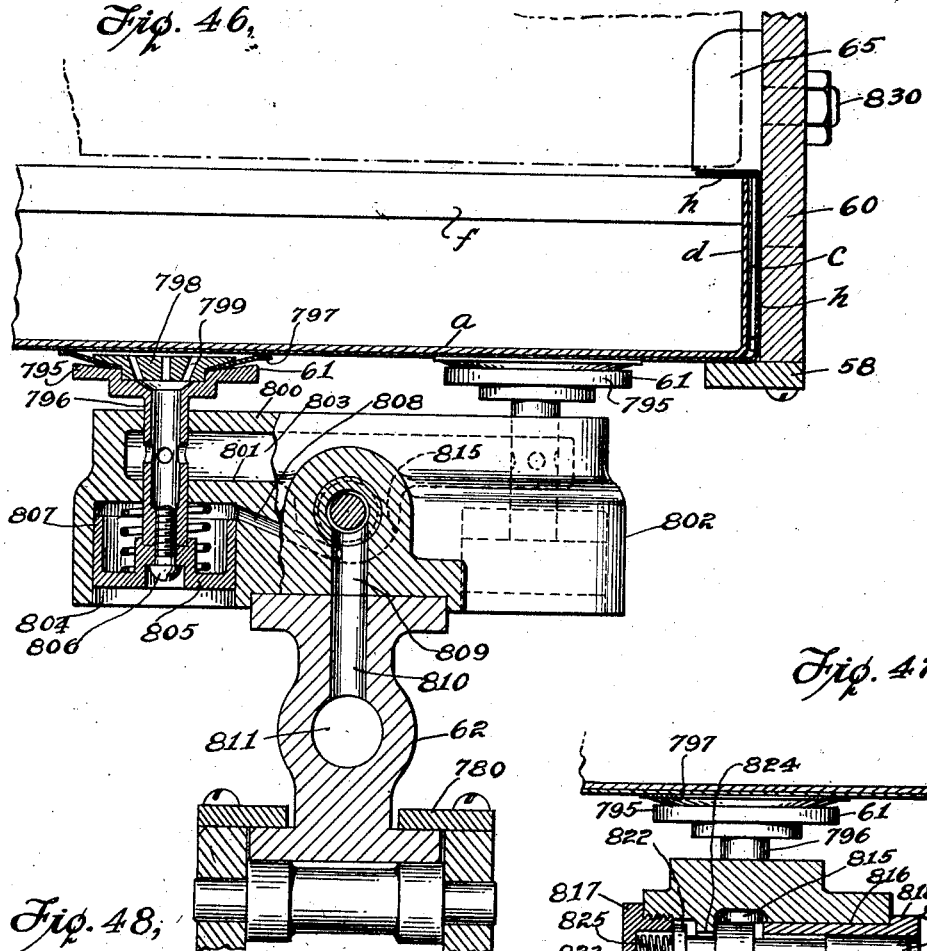
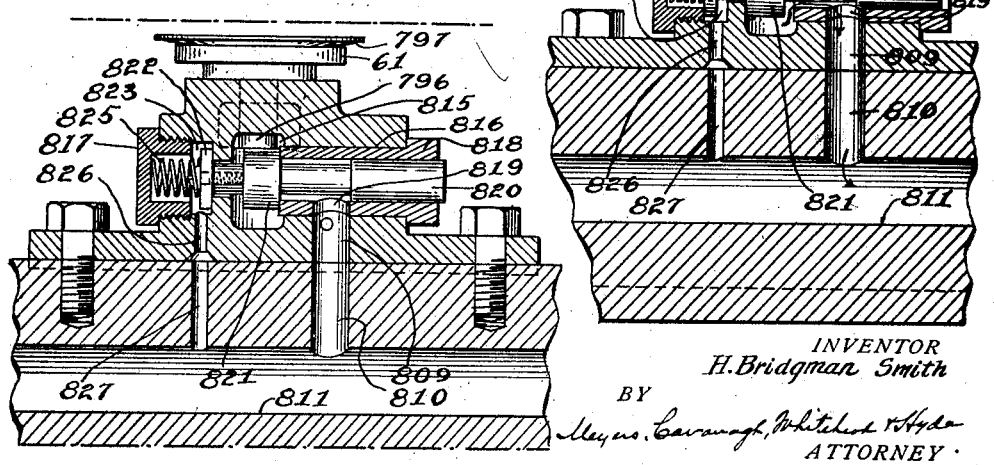
INVENTOR
H. Bridgman Smith
BY
ATTORNEY

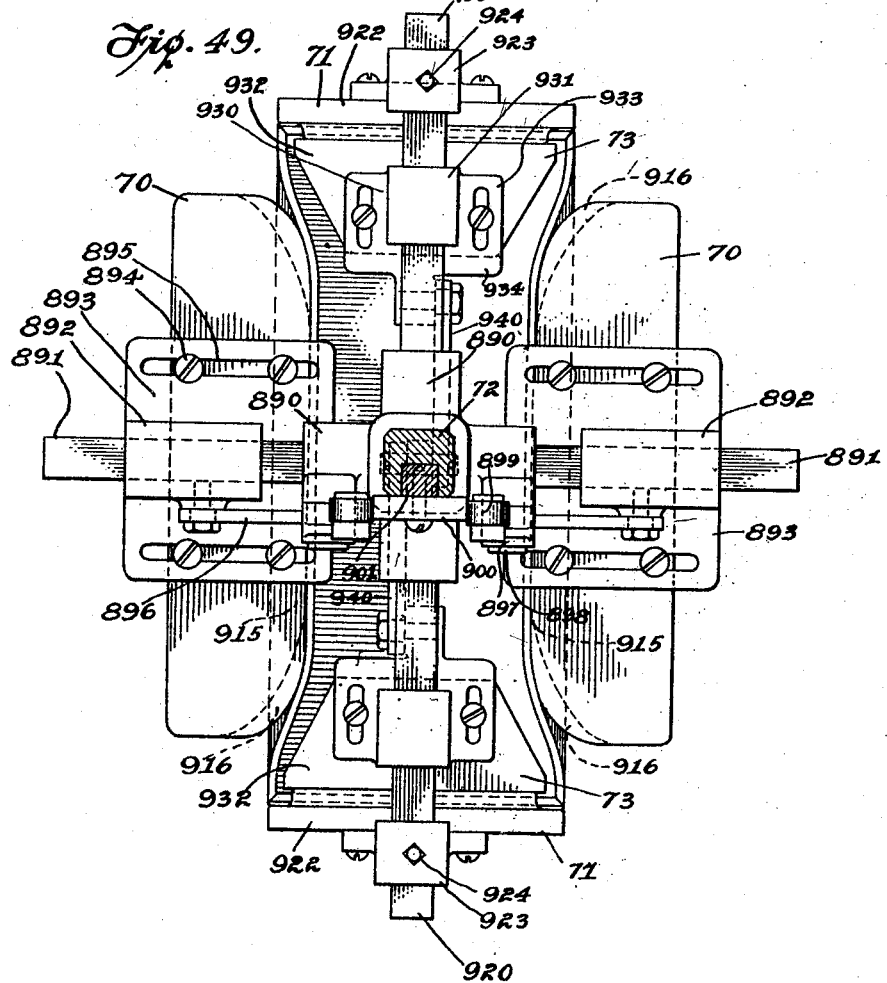

Patented Jan. 1, 1924.

1,479,401

UNITED STATES PATENT OFFICE.

HARRY BRIDGMAN SMITH, OF BROOKLYN, NEW YORK, ASSIGNOR TO BRIDGMAN SMITH PATENTS COMPANY, INC., OF BROOKLYN, NEW YORK, A CORPORATION OF NEW YORK.

MACHINE FOR MAKING COVERED PAPER BOXES.

Application filed September 16, 1921. Serial No. 501,088.

*To all whom it may concern:*

Be it known that I, HARRY BRIDGMAN SMITH, a citizen of the United States, and resident of Brooklyn, in the county of Kings and State of New York, have invented certain new and useful Improvements in Machines for Making Covered Paper Boxes, of which the following is a specification.

This invention is a continuation in part, of my co-pending application, Serial No. 370,180, filed March 31, 1920, for method of and machine for making covered boxes, and the present invention includes the machine or apparatus features of that application, with additions and improvements.

The invention relates to machines, or apparatus, for producing complete covered box parts in one or a variety of desirable forms.

A general object of the invention is to provide a commercially practical machine capable of producing covered boxes by entirely automatic operations.

According to the methods and machines now generally employed in the manufacture of covered paper boxes, the cut or "cornered" box shell blanks are first folded into box form, the corners "stayed" with suitable corner-staying material, and the covering blank or wrapper which has adhesive applied to one face thereof is then applied to the outer walls of the shell, sometimes by hand and sometimes by machinery. In some instances it has been proposed to eliminate the corner-staying operation, but in all such cases, so far as I am aware, it has been the practice to first fold the box shell into box form and then apply to it a freshly gummed covering blank or wrapper.

Many attempts have been made to provide an entirely automatic machine for making covered paper boxes of the type referred to. In every instance, so far as I am aware, the automatic machines heretofore proposed include in their organization a mechanism for gumming the thin wrapper blanks, instrumentalities for applying the gummed wrapper blanks to the box shells, and mechanism for transporting the gummed wrapper blanks from the gumming mechanism to the box covering instrumentalities. Some of the machines also include means for automatically feeding thereto the "stayed" box shells to be covered.

Great difficulties have been encountered in the attempts heretofore made to successfully operate machines of these types, due among other things to the tendency of the thin paper covering blanks to curl immediately after fresh adhesive is applied to a face thereof, resulting in much bad work and waste. Because of this curling of the blanks, the consequent waste, and other troubles, including imperfect registration, these automatic machines have not been successful where attempts have been made to operate them commercially.

Many attempts have been made to prevent or counteract this curling tendency of the blanks resulting from the application thereto of fluid adhesive. In some cases the blanks have been steamed or otherwise moistened during or after the application of the glue in order to kill the curling tendency. In others an attempt has been made to hold the glued wrapper blanks flat by mechanical means as they pass from the gumming mechanism to the wrapper applying mechanism. In others, attempts have been made to so organize the machines that the gumming mechanism is close to the wrapper applying mechanism with the object of delivering the wrappers quickly, before they have an opportunity to curl. While some of these various attempts may have been successful as to this particular item, the means suggested, besides being complicated, brought about numerous new difficulties, and so far as I am aware, a satisfactory automatic machine has not yet been produced, and the old practice of employing separate hand operators to feed the blanks to the gumming machine and also to the operator of the cover-applying machine, is still carried on, notwithstanding the slowness and increased expense of such procedure.

To overcome the difficulties described, my invention provides improved means for supplying and feeding the shell and cover material, or blanks, for bringing them into accurately registered association or "assembly," for supplying adhesive to the different materials or blanks, and for shaping the materials into complete box form. Although not limited, in one of the broader aspects of the invention, to the particular method of applying adhesive, in the embodiment disclosed herein the adhesive is applied to the body or "shell" material or blank, rather than to the cover material.

I have discovered after extensive and costly experiments, that the previously existing difficulties which have been encountered due to curling of the wrapper blanks when fresh adhesive is applied, as well as the many other difficulties, including imperfect registration, are entirely obviated or overcome and the wrapper blanks more accurately, neatly, quickly and cheaply applied, by first applying the adhesive to the relatively stiff box shell blank (which will not curl appreciably when moistened with adhesive), and by then applying the ungummed wrapper blank to the gummed face of the box shell blank to provide a box forming "assembly" consisting of a box shell blank and an attached cover blank, which may then be folded into box form. Such a procedure, I have discovered, not only overcomes the objections incident to the described curling of the cover blanks, as well as other objections, but very materially simplifies and cheapens other operations incident to the formation of the finished box.

So far as I am aware I am the first in the art of making covered boxes, to suggest and provide for the application of the cover or wrapper affixing adhesive to the relatively stiff box blank direct, instead of to the thin and flexible wrapper blank, for the purpose stated, and I, therefore, lay claim to this procedure broadly.

I have also discovered that the box forming and wrapper applying operations may be more rapidly, cheaply, and accurately performed by first producing what I will term, an "embryo" box, or box-forming "assembly," consisting of a substantially flat box shell blank and an applied cover or wrapper blank, with opposite marginal edges of the cover blank folded over opposite edges of the shell blank and adhesively affixed thereto. The assembly thus produced may then be folded into box form and maintained in its "set up" condition without requiring separate corner staying operations.

According to this part of my improved method I first apply adhesive material to the flat or unfolded box shell blank direct, the adhesive being applied to the blank in spots or zones, as by stenciling, or over the entire face thereof, and in some instances in spots or zones applied to both faces, or spots or zones on one face and throughout the entire area of the other face, the manner of applying the adhesive depending upon the type or style of box to be manufactured. This application of the adhesive to the relatively stiff box shell blank does not cause appreciable bending or curling thereof and all difficulties incident to such curling are entirely overcome. I then assemble the adhesively coated box shell blank and the wrapper blank in superposed relation, while these elements are substantially flat, and I also inturn and affix marginal portions of the wrapper blank to certain of the adhesive zones or stencil lines of the shell blank while these elements are substantially flat, thereby producing what I have termed an "embryo" box or box-forming "assembly."

By the procedure described it will be seen that the operations of covering the box shell blank, including a part of the marginal "turn-in" are partly or entirely completed before the blank is folded into the final box form.

I have demonstrated that I can produce, according to my improved method, and with an apparatus designed to carry out the method, covered paper boxes of various kinds, including the so-called "tight-wrapped" and "loose-wrapped" boxes, as well as other kinds, more rapidly and economically, in greater quantities and of better and more uniform quality, than by any other method or apparatus heretofore employed or provided.

The accompanying drawings show a machine which is one embodiment of the invention, consisting of mechanisms arranged to operate on the plan above generally described. As indicated previously, the invention is broadly new in many of its aspects, and, therefore, the machine and the various subordinate instrumentalities here shown are subject to a great number of variations and I contemplate the employment of any structures which are properly within the scope of the appended claims.

In the drawings:

Figure 1 is a side elevation in diagrammatic style, of a machine embodying the invention, showing certain principal parts of the machine in orderly arrangement, but with many other parts omitted, for the purpose of explaining the principal parts and functions of the machine.

Fig. 2 is a similar view, with rearward portions omitted, and with the parts in a different position.

Fig. 3 is a right side elevation.

Figure 11:
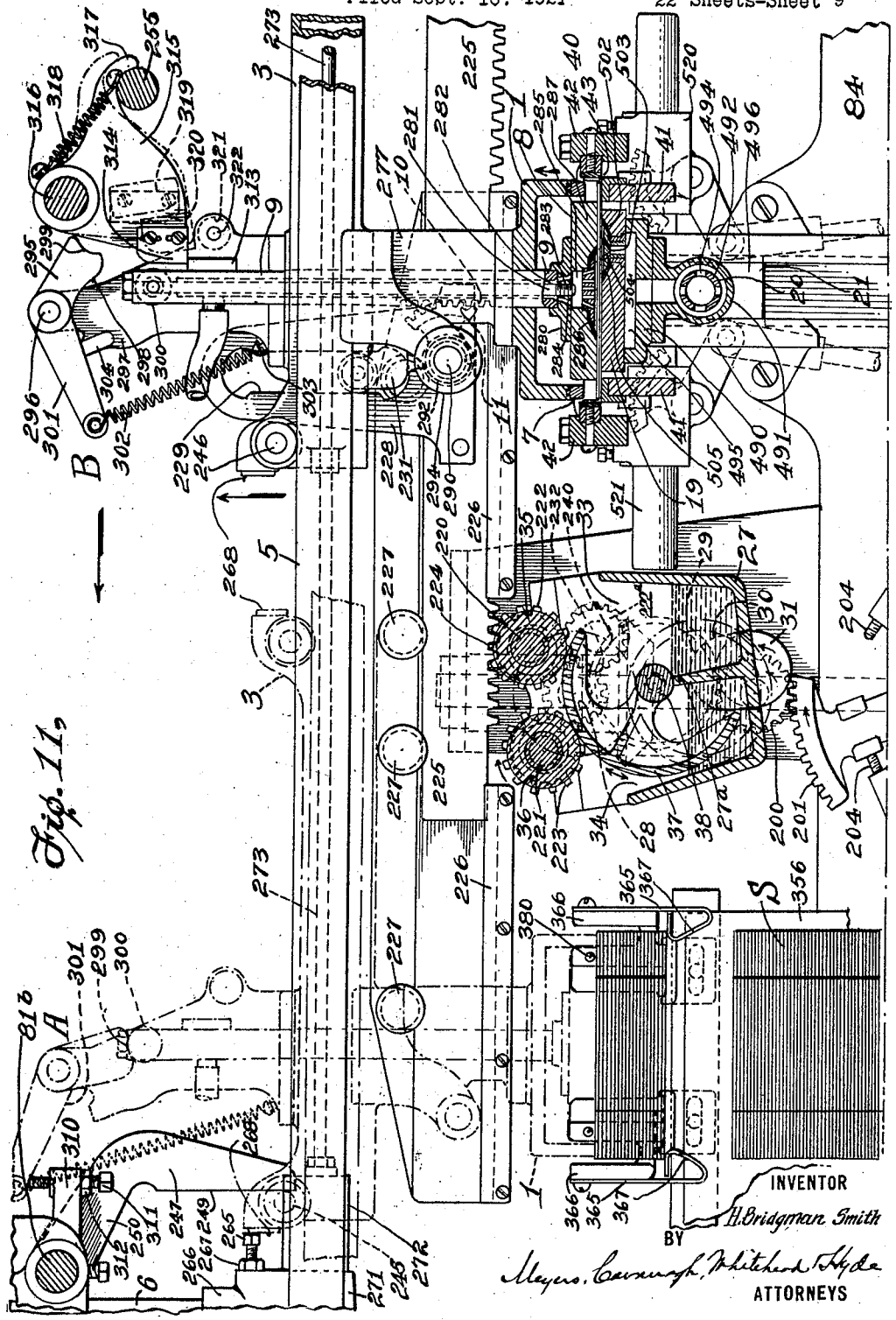

Figs. 4 and 5, taken together, are a vertical longitudinal section of the machine on an enlarged scale, certain central portions of the machine being duplicated to more readily explain the connection of the two figures.

Fig. 6 is a front end elevation.

Fig. 7 is a view, partly in top plan and partly in section, with many parts omitted, mainly for the purpose of showing driving parts and connections.

Fig. 8 is a vertical section at 8—8, Fig. 3.

Fig. 9 is an enlarged detail of a part of the cover feed mechanism.

Fig. 10 is a vertical section, enlarged, in substantially the plane 10—10, Fig. 3, showing mainly the glue roll and carriage feed mechanism.

Fig. 11 is an enlarged detail in longitudinal section showing principally the blank feed carriage, gluing and assembly mechanism.

Fig. 12 is an enlarged detail, in a longitudinal plane of the machine, of the cover margin turning and pressing mechanism.

Fig. 13 is a detail of the same.

Fig. 14 shows a shell blank in superposed relation to a cover blank, before assembly contact, these blanks being designed for one type of loose-wrapped box.

Fig. 15 shows the blanks in contact producing an initial, unsecured blank assembly.

Fig. 16 shows the two blanks secured in assembly-contact, with the cover margins turned over and secured on upper marginal surfaces of the shell. (See also Figs 38, 43, 44 and 45, for subsequent " forming " steps of this type of box.

Fig. 17 is an enlarged detail of part of the cover blank feed mechanism.

Fig. 18 is a sectional detail of the same.

Fig. 19 shows the mechanism of Fig. 16 in right hand end elevation.

Fig. 20 is a vertical section in a longitudinal plane of the machine showing the first and second box shaping or " forming " stations.

Fig. 21 is an enlarged horizontal section showing principally the first forming station.

Fig. 22 is a vertical section in a transverse plane showing principally parts located at the first forming station for supporting and manipulating parts of the blank assembly.

Figs. 23 and 24 are perspective views of the same end of a blank assembly of different design from that shown in Figs 15, 16, 38, 43, 44, and 45, for a different style of loose-wrapped box, used to illustrate another mechanical arrangement and mode of operation of the machine, especially at the first " shaping " station, the two figures showing different stages of its shaping into box form at the first forming station.

Fig. 25 is a perspective view of the same style of box with cover end margins turned horizontally inward.

Fig. 26 is a plan view of mechanism at one end of the blank assembly at the first forming station showing mainly corner lap turn-in devices.

Fig. 27 is a vertical section in a transverse plane of the machine showing parts at the first forming station including the expansible forming plunger and box supporting and end pressing devices.

Fig. 28 is a vertical section in a transverse plane showing the machine arranged for making tight-wrapped boxes.

Fig. 29 is a perspective bottom view of a shell blank properly glued for a tight-wrap operation.

Fig. 30 is a perspective top view of the same blank suitably glued (" stenciled ") along its margins for a tight-wrap operation.

Figs. 31 to 36, inclusive, illustrate different steps in the tight-wrap operation.

Fig. 37 is a vertical section in a transverse plane, showing parts located at the first forming station with the machine arranged for making a loose-wrapped box of a form, suitable for the style of blank assembly shown in Figs. 14 to 16; 38 and 43 to 45.

Fig. 38 shows a blank assembly of the type shown in Figs. 14 to 16, and 43 to 45, adapted for the machine as arranged in Fig. 37, and partly folded into box form.

Fig. 39 is an enlarged plan detail of the end wing forming and turning mechanism of Fig. 37.

Fig. 40 is a detail of the same.

Fig. 41 is an elevation of the same.

Fig. 42 is a vertical section of the longitudinal plane of the machine showing the mechanism of Fig. 37.

Figs. 43, 44 and 45, are perspective views of the same box style, as shown in Fig. 38, in subsequent progressive stages of formation.

Fig. 46 is an enlarged detail of the box feed mechanism employed for moving boxes from the first to subsequent forming stations and for delivering them from the machine.

Figs. 47 and 48 are additional details of the same.

Fig. 49 is a plan view of side-bending and end-pressing mechanism at one of the last forming stations.

My pending application above identified describes three different forms of boxes and methods of making them, suitable for machines of the general character therein disclosed. The boxes described have novel characteristics of my own invention and the methods of making them are also of my invention, these box forms and methods being covered by various patents and pending applications. I have chosen the same three types of boxes for explanation of particular constructions and modes of operation of my present invention. But it must be understood that the machine may be used either in the present form or by various modifications and adaptations which are within the spirit of my invention, for making boxes of various other forms, including simpler forms which do not require all the structural refinements herein disclosed; and also for making other forms of boxes of my invention, having characteristics more or less similar to the present examples.

Since the pending application shows and fully describes the three particular box forms above mentioned, the description of the blanks, blank assemblies and boxes in the present specification will be confined as far as possible to what is necessary in explaining the operation of the present mechanisms. The blanks and box parts are identified, as far as possible, by the reference characters used in the pending application, to which reference should be made for a full understanding of the box forms and also for a preliminary understanding of the methods by which they are produced.

The instrumentalities disclosed herein are arranged to produce a succession of assemblies of the character described in the pending application, and deliver them successively to mechanism for folding them into box form. I do not wish to be understood, however, as limiting myself to the precise forms of mechanism illustrated, as obviously other forms of mechanism may be employed within the spirit of the invention. Nor do I limit myself to the employment in a single machine of all the different mechanisms about to be described, as it will be obvious from the showing that some of the mechanisms may be omitted, leaving others to perform useful functions in association with each other or with other mechanisms.

While in one preferred embodiment of the invention, as disclosed herein, adhesive is applied to the relatively stiff and "non-curling" shell blank rather than to the relatively thin and flexible cover blank, for reasons stated, it will be apparent to skilled persons that the assembly-making mechanism herein disclosed may be employed for this purpose, whether the adhesive is applied to the shell blank or to the cover blank, and this is especially true in the matter of preparing assemblies for the manufacture of "loose-wrapped" boxes where adhesive is applied only to the marginal edges of one of the blanks. So far as I am aware I am the first in the paper box making art to provide mechanical means for preparing and assembling two flat blanks of the kind referred to, in the manufacture of box forming assemblies, wherein the blanks are maintained flat or substantially so during the assembly forming operations.

In making covered boxes of the "loose-wrapped" type, according to my preferred method, it will be seen that no glue is applied directly to the thin cover or wrapper blanks in any way which has a tendency to cause the blanks to curl. This curling tendency, therefore, with the difficulties resulting therefrom is entirely avoided by my preferred method. In making tight-wrapped boxes according to my improved method, only relatively small spots or zones of adhesive are applied to the cover or wrapper blanks, or else the adhesive is applied in such a way and at such a time that no curling of the blank is possible, since the end wings of the cover blank to which the spots or zones of glue have been applied are held from any curling tendency by the adhesive attachment of the cover blank wings to the shell blank wings, until just prior to the time when the cover blank wings are to be finally and permanently affixed.

I do not lay claim in the present application to the box structures or the assemblies per se, as these are claimed in my various co-pending applications, including Serial No. 235,515, filed May 20, 1918, Serial No. 235,516, filed May 20, 1918, Serial No. 272,907, filed January 25, 1919, and in various patents.

One of the important advantages resulting from my improved method of making covered paper boxes is that I am able to employ relatively light stock for the cover blanks, since I have entirely eliminated the troubles heretofore encountered by reason of the curling tendency of the cover blanks; whereas when the adhesive is applied directly to the cover blanks, according to previous methods, it has been necessary to employ relatively heavy stock in order to lessen the curling tendency as much as possible. I am, therefore, able to use the lighter and cheaper grades of covering papers, with a material saving in the cost of the finished product.

In Figs. 1 and 2 I show one form of mechanism for performing in a simple manner and very expeditiously the required "assembly" forming and box folding operations, only sufficient parts of the mechanism being shown to give a clear understanding of the general constructions and operation thereof. The "assembly" forming mechanism is a machine complete in itself, but I have shown it in association with box forming instrumentalities so that the disclosure of the essential elements of a machine for forming completely covered boxes will be complete. The box folding mechanism may, of course, be varied greatly to suit different requirements.

According to the construction and plan of operation of the assembly forming and folding mechanism illustrated, I provide a plurality of stations arranged in series, each having devices thereat, or associated therewith, to perform certain of the several steps or operations required to produce the assemblies and form them into finished boxes. Devices at several stations are each operating upon an assembly-element or elements at the same time, so as to increase the capacity of the machine, which may be said to be of the "stage" type. The machine thus automatically produces a succession of finished assemblies, which are automatically delivered to the box folding and "setting up" instrumentalities where they are formed into finished box parts, either bodies, (bottom sections), or covers (top sections).

In short, the mechanism is designed to produce a succession of embryo box forming assemblies, each comprising a substantially flat box shell blank and an attached wrapper blank, and said mechanism includes a plurality of stations, each having devices thereat or associated therewith for performing a succession of assembly forming operations, and means co-operating with said stations for transferring the assembly-elements from one station to another in succession.

In the machine illustrated, I have shown three stations which co-operate in the production of the assembly, and have also shown in association therewith, a series of box forming stations. These stations will hereafter be referred to as follows:

A—shell blank supply station;
B—stencil and shell blank gumming station;
C—wrapper blank supply and assembly station;
D—first box forming station, where box side and end folding operations are performed;
E—second forming station, where cover margins are turned in and pressed;
F—third forming or shaping station, where the box sides are bent to remove outward bulge and where the end structure is also additionally pressed and secured;
G—last forming station, where additional bending and pressing operations are performed.

A shell blank stenciling and transporting device, and an assembly transferring device or carrier, are co-operatively associated with the assembly forming stations. The shell-blank stenciling and transporting device operates to carry the shell blanks successively from the shell blank supply station to the assembly forming station, and the assembly carrier or transferring device operates to transfer the finished assembly and carry it into or partially through the box folding mechanism, it being understood always that the assembly forming elements, i. e., the shell blank and the cover or wrapper blank, as well as the assembly itself, are preferably maintained in a flat or substantially flat condition until the assembly is delivered into the box-folding mechanism.

The shell-blank transporting and the assembly transferring devices operate in conjunction with the assembly forming stations to apply adhesive to the relatively stiff shell blank either on one or both faces, depending upon the style of box being made, then transfer the adhesively coated shell blank and deliver it flatwise onto its wrapper blank, and then transfer the finished assembly to the assembly folding mechanism to form it into a "set up" and completely covered box.

The shell blank transporting device 1, Figs. 1 and 2, and the assembly transferring or carrying device 2 are both mounted on a carriage 3, of any suitable construction. The carriage has rollers 4, which travel on a track or tracks 5, the latter being supported in any suitable manner as by frame members 6. A vertical reciprocating motion is imparted to the trackway 5, by any suitable means, so that as the trackway moves up and down, the carriage with its transporting and transferring devices 1 and 2 move with it. The carriage also travels back and forth horizontally upon the trackway 5, these horizontal movements being effected in any suitable way, for example by connection with the gluing mechanism, as explained hereafter. The horizontal movements of the carriage bring the shell-blank transporting device 1 and the assembly transferring device 2 into cooperative relation with the several stations A, B and C. The movements of the carriage are timed to coordinate with the movements of other parts of the machine.

The shell-blank transporting device 1 consists of a head carrying rubber or other suitable glue applying stencil strips 7, (see also Figs. 8 and 11) adapted to apply the lines or zones of glue $e$, $m$, and $n$, (Fig. 14), or other suitable glue pattern, to the upper face of a shell blank, and a combined shell-blank support and stripper plate or ejector 8, (Figs. 8 and 11), mounted upon a rod 9, is adapted to be housed within the boundary of the stencil strips 7, and has a movement relative thereto, effected by any suitable means, such as a rack and pinion mechanism 10, 11 (Figs. 8 and 11). During the application of glue to the stencil strips, the ejector is retracted above the plane of the under face of the stencil strips, but it is also adapted to assume a position in substantially the plane of the stencil strips in order to support a shell blank when the latter is receiving glue over its entire under face, as in the manufacture of "tight-wrapped" boxes. It is also adapted to assume a position below the plane of the stencil strips, as during the operation of producing the box forming assembly at the assembly forming station, as will presently appear. The assembly carrier or transferring device which is also carried by the carriage and moves therewith, consists of a pair of grippers 12 of any suitable construction (pneumatic grippers in the present embodiment, as described hereafter), and which may be operated in any suitable way to cause them to grip the opposite end wings of the assembly after it has been formed, to carry the same into association with the box folding instrumentalities.

The shell blank supply station A in the present embodiment is constructed to hold a stack of shell blanks S, in the "flat", the stack being supported upon a follower or base 13, which is normally urged upward by any suitable means, so that as the blanks are taken from the stack, the uppermost blank thereof will always be at a proper level to adhere to the glue on the stencils 7 of the stenciling device forming a part of the transporting device 1. A rack and pinion mechanism such as 14, 15 (Fig. 4), is employed to quickly lower the follower 13 into a position to receive a new supply of blanks and to afterwards elevate the follower to the normal position.

The wrapper blank supply station C has a stack of wrapper blanks W supported on follower block or base 16, which is normally urged upward in the same manner as described with reference to follower 13, and a rack and pinion mechanism 17, 18, Fig. 4, is also employed to raise and lower the follower to replenish the supply of wrapper blanks.

As will be seen by referring to Figs. 1 and 4, the follower 16 is normally located on a plane below the normal plane of the shell blank support 13, and selecting mechanism is provided for successively taking single wrapper (cover) blanks from the top of the pack and bringing them into position where the shell blanks may be assembled therewith in the formation of the box forming assembly, the two blanks or assembly forming elements being preferably maintained in flat condition. This cover blank selecting mechanism in the instance shown, includes a suction head 19 journaled upon a shaft 20 carried by vertically sliding blocks 21, which move in guideways 22, at opposite sides of the wrapper blank support. Blocks 21 are connected by links 23 to an oscillating lever 24 for reciprocating the blocks in their guideways. The shaft 20 on which the suction head 19 is mounted, carries suitable means, such as a pinion 25, cooperating with a fixed rack 26, Figs. 8 and 9, operating as the suction head is moved upward with its selected wrapper blank to give the head a half turn and bring its suction face with the wrapper blank carried thereby into an upward-facing position, the said suction head with its blank being adapted to assume an elevated position to receive the shell blank carried by the transporting device 1, which at this moment in the operation of the machine occupies a position directly over the wrapper head.

When the parts are in this position, which is the initial assembling position for the shell and cover blanks, the assembly transferring device including the grippers 12, is in the dotted line position, Fig. 20, having carried a completed assembly to an initial position in the assembly folding instrumentalities.

The adhesive applying station B is situated between the blank supply stations A and C, and in the instance shown, the gumming mechanism consists of a tank or glue pot 27, mounted for oscillation at 28. As one means for oscillating the tank it is provided with a channel 29, defined by walls 30, Figs. 10 and 11, and a rotary cam 31 is located in the channel between the walls. The glue tank 27 in the instance shown is divided by a central partition 27$^a$, into two compartments, 33 and 34, each corresponding to one of two glue applying rolls 35 and 36. These rolls are rotated in opposite directions, the roll 35 rotating in an anti-clockwise direction and roll 36 operating in a clock-wise direction. The glue feed device, consisting of a surface 37 in part cylindrical form, and provided with a shaft or hub 38 located directly above the partition, is arranged to oscillate on the hub axis, and to alternately enter the glue compartments and transfer glue from them to the appropriate glue rolls.

The rolls are arranged to cooperate with the shell blank stenciling and transporting device 1, and the glue pot oscillating or tilting cam 31 is so timed as to cause the rolls 35 to contact with and apply glue to the stencils 7 during the movement thereof from the assembly forming station back to the shell-blank supply station, the position of the parts during this operation being illustrated in Fig. 11. The glue roll 36, is arranged to make contact with the under face of a shell blank carried by the transporting device 1 during its movement from the shell blank station to the assembly forming station, (Fig. 2). If there is glue in the tank compartment 34 corresponding to roll 36, the under face of the shell blank receives a coating of glue over its entire area (Fig. 29) as required in the manufacture of one form of "tight-wrapped" boxes. In the manufacture of "loose-wrapped" boxes, no glue is required on the under face of the shell blank; therefore, when manufacturing boxes of this style there is no glue in the tank compartment 34 corresponding to roll 36. The roll 36, however, exerts a rolling pressure upon the blank carried by the stencils 7, of the transporting device 1, moving thereover to insure a uniform application of the glue by the stencils. The position of the parts during this operation is shown in Fig. 2, said figure also showing the assembly transferring device 2 carrying a completed assembly over toward the assembly forming mechanism.

It will be seen from the foregoing that the glue applying device operates, according to one plan of operation, to apply glue to the face of the stencils as they move in one direction, and to exert pressure upon the transported shell blank during the movement thereof in the opposite direction; and this device also operates when doing another class of work, namely "tight-wrapped" work, to apply glue to the stencils during their movement in one direction and to apply glue over the entire under surface of the shell-blank during movement of the stenciled head in the opposite direction.

Where glue is placed in both the tank compartments, I prefer to employ a relatively strong and quick setting glue in the compartment 33 for roll 35, and a weaker and more slowly setting glue in the compartment 34 for roll 36, for the reason that parts of the stenciled portions of the blank are employed in the setting up or corner staying operation, thus requiring a strong glue; whereas a weaker glue is all that is necessary to adhesively connect the two blanks of the assembly, and besides, peeling of the end wings in the "offset" gluing operation as elsewhere herein described, is more readily accomplished where a weak and slow setting glue is employed.

The station C has located thereat the margin turn-in mechanism 40, i. e., devices for turning the margins f, of the wrapper blank W, (Figs. 14 and 15) over the opposite edges of and affixing them by pressure to the adhesively coated margins e of the shell side wings b. These margin turn-in devices, as shown in Figs. 1, 2, 4, 11 and 12, consist of a pair of fixed bars 41, with each of which is associated a pivoted or hinged presser bar 42, the latter being arranged with relation to the bars 41 so that as the bars 42 are rocked on their hinges or pivots 43, the free margins f of the wrapper blank of an assembly situated therebetween are turned over and adhesively affixed in to the glue coated margins e, of the shell side wings, as previously described. The pivoted bars 42 may be operated by any suitable means and by preference they are so mounted as to be adjusted laterally to operate upon blanks of different sizes. In the present instance each bar 42 is mounted upon trunnions 43 carried by suitable bearings and operated by suitable gear and link connections, as more fully explained hereafter. In this way at the proper moment the bars with their presser strips are inturned and fold over and secure cover margins f to the stenciled edges of the shell blank. During this margin turning operation, the assembly is supported from beneath by means of the suction head 19 and from above by means of the ejector plate 8, forming a part of the shell blank transporting device 1, as shown in Figs. 1, 11 and 12. Because the assembly is firmly held in a flatwise condition during the marginal edge turning-in operation, a more uniform and accurate turn-in is secured.

The space between bars 41 is less than the maximum corresponding dimension of the wrapper blank, but since these blanks are flexible, the bars 41 offer no obstruction to the passage of the wrapper blank between them, as the ends of the blank are simply deflected as they are carried upward between the bars by the suction head 19. This head is moved up by the links 23 and lever 24 until it meets a stenciled blank carried by the shell blank transporting device 1, whereupon the two blanks are brought together in initial assembled relation. Then the trackway 5 and carriage 3 move downward as a unit for a short distance and are then retracted, and at the same time the ejector plate 8 is caused to move, by means of the rack and pinion mechanism, out of its housed relation to the stencils 7, the ejector 8 and suction head 19 being then brought to a position to hold the clamped assembly in the plane of the upper face of the fixed bars 41, this downward movement of the assembly causing the free marginal portions f, of the cover blank to engage the edges of the movable turn-in bars 42, so as to fold the free margins f, of the cover blank up at right angles to the body of the assembly, as more clearly shown in Fig. 11, after which the turn-in bars 42 are rocked to properly bend and affix the wrapper blank margins to the glued margins of the shell blank, completing the assembly, which is then at the proper moment grasped by the assembly transferring grippers 12 to carry off the assembly over to the box forming instrumentalities, while the blank transporting device 1 is bringing a fresh shell blank into position to be applied to a fresh wrapper blank. While the assembly transferring device and the shell blank transporting and stenciling device are operating to deliver a completed assembly and bring over a fresh shell blank, the suction head 19 has descended to select a fresh wrapper blank and carry it to assembly position.

While I prefer to combine the assembly forming mechanism with a box forming mechanism of some kind, such as the instrumentalities located at the stations D, E, F and G, now to be described, the invention is not limited to such a combination, as it is apparent that the assembly forming mechanism is a machine complete in itself. Nor is the invention limited to an arrangement wherein the shell blanks and wrapper blanks are supplied from packs or stacks, as at stations A and C, as they may be otherwise supplied without departing from the broad spirit of the invention. Also, the invention is not limited to the specific means illustrated for applying adhesive to the blanks or for delivering the finished assemblies, as means for this purpose may be varied within wide limits. In the broader aspect of the forming mechanism, blank assemblies, however produced, having suitable characteristics for formation into complete covered boxes by the general plan of the present forming mechanism, are supplied to the initial position of the forming mechanism and are thereafter, operated upon in the manner hereinafter described. From this point of view the assembly forming mechanism is only one example of means for producing and presenting suitable box blank assemblies to the box forming mechanism. In short, I believe that I am a pioneer in the broad features of the herein described mechanisms, and am, therefore, entitled to commensurate protection.

The box forming mechanism and its location with respect to other parts of the machine is indicated generally by the letters D, E, F and G. After reading the following description, it will be evident that more important parts of the forming mechanism are located at stations D and E, these mechanisms being sufficient, in the present particular embodiment, to produce a completed box part, and the mechanisms located at subsequent stations may in some cases be dispensed with, although they are useful in many cases for performing additional operations.

According to the present plan of operation of this mechanism, the box forming assembly is carried by the transferring device 2 and suction grippers 12 to a position directly above a pair of vertical wing bending plates 45 and below a forming block or plunger 46 carried by a reciprocating rod 47. The plunger is desirably expansible laterally of the machine, and for this purpose is made in two parts 48, Fig. 21. The plunger with its two parts retracted is caused to descend and engage the body portion $a$ of the assembly after the latter has been properly positioned, and carries the assembly through the forming instrumentalities located at this station, first holding up the side wings $b$ of the assembly, and then folding in or up the corner laps $c$ and end wings $d$, or other end portions in an order and manner depending upon the style of box. In the case of the first form of box described in my copending application, and illustrated herein in Figs. 14 to 16, the corner laps are first turned in, and slightly thereafter or substantially concurrently, the end wings are turned up, and when cover margins $g$ at the sides of the shell end wings are provided, these margins are turned over upon the upper (inner) faces of the shell wings, this turning action being desirably performed substantially concurrently with the up-turning of the wings. In the case of the second form of loose-wrapped box, illustrated herein in Figs. 20 and 23 to 25, the shell end wings are first turned up while the cover wings remain in extended position; the combined shell and cover corner laps are then turned in against the shell end wings, and the cover end wing portions are then turned up. In the case of the third form of box, made by the tight-wrapped method, illustrated herein in Figs. 29 to 36, the shell end wings which were adhesively secured to the cover end wing portions in the process of assembly, by adhesive applied between these portions, are separated from the cover end wings by suitable devices while the cover wings remain or are retained in extended position, and while the adhesive is still moist, and the cover end wings are turned up vertically against the forming plunger; the corner laps are turned in, and the cover end wings are then turned up. In each case, the described operations leave marginal portions of the cover material extending upward at the ends of the box, above the upper edges of the shell; and in final operations, conveniently performed in the present specific embodiment as the box moves away from station D and at a subsequent station E, these margins are turned horizontally inward, and then down and secured against inner surfaces of the end wall structure. The box is now completed for many purposes, and may be discharged from the machine; but it is in many cases desired to additionally shape it, or perform other operations upon it, and such other operations may be performed at subsequent stations such as F and G. Thus, for example, as shown in the present embodiment at station F, the side walls are pressed inward to remove the outward bulge which they frequently have when previous operations are completed; and at this station the box end walls may also be pressed by complemental inner and outer pressing members to squeeze and secure parts of the end structure in position; the side walls may then be again pressed or bent inward and the ends again pressed at the subsequent station G; and provision is made in the present machine for turning the box through part of a rotation at one or both of the last stations for reasons explained hereafter, this turning mechanism being arranged so that it may be made inoperative at will.

In moving downward into the assembly folding instrumentalities at station D the plunger 46 first carries the assembly between the opposite side plates 45, these serving to fold up the side wings of the assembly about the opposite sides of the plunger, so that the assembly assumes the form shown in Fig. 31. The corner laps and end wing portions of the assembly project beyond the ends of the forming plunger. The carriage 3 with its assembly transferring device, may be arranged to move down for a short distance with the plunger, the grippers of the transferring device retaining, until the proper moment for release, their hold on the end wings of the shell blank. The grip of the assembly transfer device on the shell end wings may be retained in some cases as the carriage rises to lift or assist in lifting the shell end wings. The moment at which the assembly transfer grippers release their hold on the assembly may be regulated in a simple way by properly arranging the cam which operates the appropriate air valve controlling these suction devices. At a suitable moment the grippers release the assembly, and the carriage returns to an upward position, and moves forward to perform its next assembly-forming operations.

The side folding plates are mounted to move convergently, and as the plunger reaches the just-described position, its parts are separated, to closely correspond to the longitudinal inner dimension of the box, and quickly thereafter the plates 45 are moved convergently to clamp the side wings against the sides of the plunger, and so retained with suitable force during next-ensuing operations.

At a suitable point at the first forming station, the assembly may be engaged and supported by vertically movable longitudinal strips or rails 50, which engage beneath end portions of the assembly to retain it in proper relation to the forming plunger, and these supports 50 are also desirably arranged so that they yield downward while retaining the assembly on the plunger as the assembly is moved downward in subsequent operations to the bottom of the vertical folding channel, such yielding support being provided in this instance by rods 51 connected to pistons moving in pneumatic cylinders 52. Air pressure or suction is applied to the cylinder to elevate the supporting strips 50 at the proper time and the strips move downward against the force exerted in the cylinder as the plunger moves the assembly downward after operations at the upper station D are completed.

The corner laps are now infolded by two pairs of opposed corner lap "turn-in" members or "fingers," each consisting of a metal blade 53, Figs. 1, 2, 5, and 20, each pair of blades being adjustably mounted on a bar 54, Figs. 20 and 21. The blades are moved in and out by suitable means, to cause them to approach each other in the act of turning in the corner laps at the ends of the box. Suitable means, such as pivoted plates 55, Fig. 22 are also provided at the ends of the box for turning up end wing portions of the assembly, immediately after, or substantially concurrently with the infolding of the corner laps, and in some cases "bellows" folds are formed in the cover end wings and adjacent cover material, as shown in Fig. 26, or in some cases marginal portions $g$ of the cover end wings are turned over adjacent edges of the shell end wings, by mechanisms such as shown in Figs. 37 and 39 to 42. In the latter case, in making boxes of the type shown in Figs. 38 and 43 to 45, the free portions of the wrapper blank at the ends of the box adjacent the corners thereof are folded so as to lie in between the corner laps and the shell end wings, portions of the wrapper blank covering the adjacent raw edges of the shell end wings. In the former instance, in making boxes of the style of Figs. 14 to 16, the "gusset" or "bellows" folds, made as shown in Fig. 26, produce a neat, "finished" appearance of the wrapper at the ends of the box.

An important feature of the mechanism is that the corner lap turn-in blades 53 are caused to retain their hold on the corner laps while the end wings are being folded up to position, thus greatly facilitating the folding and setting up operation, the blades 53 being retracted just as the end wings assume their final position.

The box is now covered over its entire exterior and is complete except for the operations of folding over and affixing the upstanding marginal edges of the wrapper blanks to inner walls at the ends of the box.

The side plates 45 are now retracted and the plunger 46 carries the box supported by movable rails 50, downward until the strips are in line with the forward ends of other rails 58, this position being shown in Figs. 5 and 20. Here the box lies between movable end pressing plates 60, Figs. 5, 20, 21, 22, etc., and these plates are moved convergently to press the box ends against the ends of the plunger. The plates are then retracted, and the forming plunger members are retracted, freeing the plunger, which is withdrawn to its upper position.

Box gripping and feeding devices are arranged to move between rails 50 and 58, these consisting in the present embodiment of suction devices 61, a plurality of pairs of such devices being located on a reciprocating feed bar 62, the interval between the pairs of suction devices being equal to the distance between the forming station. Leading away from the lower position of station D is a channel, the longitudinal sides of the channel being defined by plates 63, carrying cover margin folding devices 64—65. The folding devices operate during movement of the box between stations D and E to fold the projecting margins of the cover horizontally inward over the edges of the shell end walls. The feed bar 62 is reciprocated at the proper times a distance equal to the station interval by suitable mechanism such as a toothed rack 66 secured to the bar and a segment gear 67.

After passing the margin folders 64—65 the box is brought beneath a second forming plunger 68 mounted upon a vertically reciprocating rod 69, and between end pressing plates, consisting in the present instance of rearward portions of plates 63, and the plunger then descends and enters the box, carrying with it the cover end margins, which are thus turned down against inner surfaces of the box end wall structure. The end pressing plates 63 are then moved inward to squeeze the upper portions of the end walls, including the inturned margins, against the plunger, and the cover margins are caused to adhere to the shell structure by reason of the adhesive stripes previously applied, this adhesive remaining moist and sticky during the very brief time required to perform the described operations. The end plates are then retracted and the plunger is moved upward out of the box and the whole series of boxes is advanced, bringing the foremost box beneath a shaper at station F. This shaper comprises opposite beveled side wall bending blocks 70, Figs. 1, 5 and 49 and desirably also, opposite end wall retaining plates 71, the box shaping structure being carried by a vertically reciprocating bar 72. The bending blocks 70 take out the outward bulge of the side walls and at the same time outward deformation of the end walls is prevented by the retaining plates 71. The retaining plates 71 also desirably cooperate with outwardly movable inner pressing members 73, Figs. 5 and 49, to squeeze the box end walls and retain the multiple parts thereof in position. Means are desirably provided at this point for turning the box a part rotation in the same horizontal plane, specifically in the present case one-quarter turn, so that whereas the box previously advanced "sidewise" it will now be again seized by the feed gripper and advanced "endwise" to place the box in a more favorable delivery position or for other reasons. The box may be delivered from the machine at this point by further movement of the feed bar. In some cases, however, an additional forming or shaping station G is provided at which is located suitable box manipulating, forming or shaping mechanism, exemplified in the present instance by side pressing blocks 70 and end pressing devices 71 and 73, similar to those previously described with reference to station F, and carried by a similar vertically reciprocating bar 72. When the mechanism at station F is arranged so that the turning mechanism is operative, the shaping mechanism at station G is appropriately arranged, as shown, so that the side pressing blocks are in position to press the sides of the box as it is positioned upon arriving at the last station, as shown in Fig. 1. The turning mechanism at station F may be rendered inoperative by simple means, for instance by disconnecting a driving part, and in that case the pressing mechanism at station G will be positioned in accordance with the mechanism shown at station F. Evidently turning mechanism may be provided in connection with the box manipulating mechanism at station G if desired, whether or not turning mechanism is provided at the previous station; and in that case the box may be suitably positioned at station G for delivery. The boxes are desirably supported and guided in their movement away from station E and adjacent to stations F and G, by rails 75 positioned in line with the rails 58, previously mentioned.

The mechanism so far described includes the principal and essential parts for carrying out the invention in one representative way. Evidently an almost unlimited number of driving and "timing" devices may be provided for operating the different parts in the proper relation and sequence, the designing of such mechanical details being within the skill of persons familiar with this art. In a broad aspect of the invention, therefore, no significance is attached to the specific mechanism for driving and "timing" the principal parts of the mechanism.

I have, however, devised complete mechanisms for all the purposes of the invention including the driving and timing devices and all other essential features, and I will now describe with reference to the drawings one representative embodiment, including certain adjustments and certain parts which may be substituted for others to adapt the machine for work upon boxes of the different representative styles selected for illustration. It will be evident as to this driving and "timing" mechanism and other details now to be described that an immense number of variations may be made, too numerous to mention in detail.

All parts of the machine are desirably arranged to be driven from a single driving member, mainly by gear, shaft, lever and link connections, and also by cams connected to various parts which are to be operated in timed relation by suitable lever and link or other connections.

The cams for operating and controlling the action of various parts of the mechanism are mainly arranged in groups on a lower forward and rearward cam shaft and on an upper cam shaft, as elsewhere more particularly described. The functions of the cams are sufficiently explained in each case and since the provision of the cams to perform the desired functions is a simple problem of design according to well-known principles, it is not attempted to show in detail the contours of all the cams, especially since the specific cam contours will vary in many instances in accordance with other conditions, as sufficiently explained elsewhere.

In the present embodiment of the machine liberal use is made of pneumatic pressure or "suction" for gripping and feeding the blanks and blank assemblies and also for operating other parts of the mechanism. While this mode of operation for such parts is satisfactory, evidently in the broader aspect of the invention I am not limited to the use of such devices and in most or all instances mechanical or other suitable devices may be substituted for the pneumatic devices shown.

In the present embodiment the pneumatic devices are arranged so that most or all of them may be energized from a single point, such as an exhaust pump or a tank in which low pressure is maintained by a pump, this low pressure acting, of course, in many cases in conjunction with atmospheric pressure exerted at the various operative positions. For the sake of simplicity in many instances the air devices will be described merely as acting by "suction."

The frame comprises various upright bars 80, transverse bars 81 and longitudinal bars 82, and mainly for structural convenience most of these bars are round and secured together at various intersections by tubular fittings such as 83. Secured to upright bars 80 near the front end of the machine are side plates 84 and secured to upright bars near the rear of the machine are side plates 85. At one side of the machine, as best shown in Fig. 7, a driving pulley 86 is rotatably mounted on a shaft 87 carried in bearings 88. This pulley may be driven in any convenient way, for instance by a belt from a countershaft or by an electric motor. The pulley is connected to a pinion 89, and this pinion engages planetary pinions 90 carried by a spider 91 also rotatably mounted on shaft 87. Also rotatably mounted on the shaft is a spider 92 carrying an internal gear 93 engaging the planetary pinions, and this spider also carries a flange 94 engaged by an expanding brake shoe 95 operated by a cam 96 carried by a stub shaft 97 mounted in a fixed arm 98. The stub shaft has an arm 99 connected by a link 100 to an arm 101 on the lower end of an upright control staff 102 mounted in bearings 103 at the right-hand side of the machine. One face of the drive pulley is formed with an internal clutch surface 104 engaged by a shiftable cone clutch 105 splined on shaft 87, and urged to engagement by a spring 106. The clutch is retracted by a shifting yoke 107 engaging a groove 108 and this yoke is carried by a rod 109 mounted to reciprocate in sleeves 110. The rod is also provided with a collar 111 engaged by the toe of a lever 112 carried by a transverse rock shaft 113 extending across the machine and provided at the right hand side of the machine with an arm 114, connected to a link 115, which is operated by a cam 116 near the lower end of the control staff. At the upper end of the control staff is a handle 117 moving over a sector 118 provided with notches 119 and the handle is provided with a latch 120 to engage the notches, and the latch is operated by a latch handle 121 adjacent to the controlling handle. All operative parts of the machine are driven from shaft 87, and by moving the controlling handle to appropriate positions the machine may be driven at low speed by expanding brake band 95 to hold drum 92 stationary, or at high speed by permitting the cone clutch 105 to engage with the driving pulley; or the machine may be stopped by bringing the lever to central position. The provision of means for driving the machine slowly by reduction gearing, such as the planetary gearing shown, is valuable in the original adjustment of the machine or in arranging it for new work or in running it slowly while any improper functioning is corrected.

At its forward end shaft 87 carries a worm 125 engaging a worm wheel 126 on a transverse cam shaft 127 carrying a series of cams for controlling various functions of the machine. At a point between the worm and the main clutch a bevel gear 128 is rotatably mounted on shaft 87, and this is operatively connected to a driven clutch member 129 which cooperates with a cone clutch 130 slidably splined on the shaft and urged to engagement by a spring 131. This clutch is for driving the glue mechanism and the reciprocating blank carriage. The clutch is withdrawn at suitable intervals by a shifting yoke 132 engaging in annular groove 133 in the driving clutch member. The yoke is carried by a reciprocating rod 134 and the rod is moved by a lever arm 135 carried by a rock shaft 136 provided with an upstanding arm 137 having a cam roller 138 engaging a cam 139 formed on the periphery of cam body 140. The cam is contoured so that at the beginning of each cycle of the machine the clutch is withdrawn, permitting the carriage to remain stationary for certain operations; the clutch is then engaged and the carriage is driven rearward; the clutch is then withdrawn and the carriage remains stationary while certain other operations are performed, and the clutch is then again engaged and the carriage driven forward, and the cycle is then repeated. Bevel gear 128 engages another bevel gear 141 on vertical shaft 142, and this shaft also carries a bevel gear 143 engaging a similar gear 144 on a short horizontal shaft 145, from which the carriage and glue mechanism are driven as hereafter described. While the gluer and carriage driving mechanism up to the described point always turn in the same direction, the reversal of carriage movement is accomplished by mechanism associated with the glue roll mechanism as will later appear.

Near its end shaft 87 carries a bevel gear 146 engaging a bevel gear 147 on a vertical shaft 148 and this shaft carries near its upper end a worm 149 engaging a worm gear 150, on a transverse shaft 151 carried in bearings 152 above upper longitudinal bars 82. This transverse shaft carries a cam drum 153 for controlling various pneumatic devices and other devices later described. This cam drum carries a series of circumferential cams 154 each of which operates a cam roller 155 carried by a valve stem 156 arranged to reciprocate in a sleeve 157 in a valve box 158 carried by a stationary frame member 159. The box has a main air chamber 160 connected by an opening at 161 to an air exhaust pump or to a tank (not shown) in which low pressure is maintained by a pump. Each valve is provided with an air port 162 co-operating with fixed ports 163 and 164 and each upper fixed port is provided with a nipple 165 to which a flexible pipe 166 is connected, each of these pipes leading to an appropriate "air" mechanism of the machine. The valve stems are urged outward, that is toward the drum, by springs 167. Each cam may have one, or a plurality of separated raised portions, so that the corresponding air valve is opened and closed one or more times in each cycle of the machine for the proper actuation of the corresponding pneumatic device. Since the cams may be designed in accordance with well known principles, it is unnecessary to describe in detail the cam arrangement for each "air" or "suction" apparatus.

Between the reduction gearing and bevel gear 146 shaft 87 carries a worm 170 engaging a worm gear 171 on a transverse cam shaft 172 which carries a series of cam bodies for controlling various functions, mainly of the box forming mechanisms.

Since blanks or blank assemblies are occasionally "jammed" in progress through the machine, obstructing different parts of the mechanism, which might cause injury to the parts directly operating on the boxes or to other parts of the machine, means are provided for interrupting the drive of various parts of the machine upon the occurrence of such obstructions or if the movements of such parts of the machine are impeded for any other reason. These protective or safety devices may be provided at various points, particularly in the present embodiment, between the main drive shaft and cam shafts 127, 151 and 172. The worm gear, such as gear 150 for the upper cam shaft 151, for driving each of these shafts is mounted revolubly on its shaft and is provided with a socket 173 in which is inserted a pin 174 of cast iron or other suitable material, which will break when a certain amount of strain is thrown upon it. The shaft adjacent to the hub of the worm gear is provided with a rigidly connected hub 175 from which extends an arm 176 provided with a sleeve 177 through which the frangible pin may also be inserted and secured by a stud set screw 178. Ordinarily the respective cam shaft and the parts driven by it are driven through the frangible pin and when an overload occurs for any reason, including the reasons mentioned, the pin snaps and the driven parts are released.

Rails 5 upon which the blank carriage is mounted are carried by a frame work supported by vertical bars 6 arranged to reciprocate in sleeves 180 secured to transverse frame bars 81$^a$ and 81$^b$. Near the forward vertical bar 6 a rock shaft 181 is mounted in bearings 182, and near the rear vertical bar 6 another rock shaft 183 is mounted in suitable bearings. Each of these rock shafts has an arm 184 connected by a link 185 to the adjacent vertical bar 6, and each rock shaft also has an upwardly extending arm 186, these arms being connected by a link 187. The forward rock shaft 181 also has near the right hand side of the machine a lever arm 188 connected by a link 189 to a bell crank lever 190, fulcrumed at 191 and provided with a cam roller 192 engaging a cam groove 193 in a cam body 194, on the forward cam shaft 127. The cam groove is contoured to oscillate the bell crank and impart to the carriage frame the necessary vertical movements, as sufficiently described hereafter. To enable the blank carriage to be elevated above its normal position at certain times and especially to lift it sufficiently to clear the glue rollers in certain cases, for instance, when the carriage moves back and forth in the absence of a shell blank, and to avoid in that case the improper application of glue to certain parts such as the ejector located within the shell blank stencil head, the link 189 is connected to arm 188 by an eccentric pin 195 and the arm is also provided with a sector 196, and a crank arm 197 connected with the eccentric pin is provided with a spring pressed plunger 198 traveling over the sector and engaging upper and lower notches 199 thereon. By releasing the spring plunger and moving the crank arm the eccentric pin is rotated so as to in effect lengthen the link connection and raise the carriage frame for the purposes described.

The oscillating mounting of the glue trough has been mentioned in the general description of the machine. The eccentric cam 31 which oscillates the trough is provided with a pinion 200 engaged by a segment gear 201 carried on one arm of a bell crank 202 fulcrumed at 203. The movement of the segment gear is limited by adjustable stops 204. The short arm of the bell crank is connected to a vertical link 205 which passes through an eye 206 carried by an arm 207 mounted on a transverse shaft 208, and this shaft has another arm 209 connected by a link 210 to the depending arm of a bell crank 211 pivoted on a transverse shaft 212 and the other arm of this bell crank is provided with a cam roller 213 engaging a cam groove in the left side, as viewed in Fig. 6, of circular cam body 194 located on the forward cam shaft 127. The connection of arm 207 to the vertical link 205 is by means of springs 215 located between the eye 206 and collars 216 secured to the link 205 so that as shaft 208 is oscillated by its driving means the gear segment 201 is moved first in one direction against the stop 204 and then more firmly against the stop 204 by the compression of one of the springs and is then moved the other way in engagement with the other stop and similarly held by the other spring. In this way the glue trough is tilted first one way and then the other in each cycle of the machine.

The glue rolls 35 and 36, previously mentioned, are carried respectively by shafts 220 and 221. Shaft 220 carries a pinion 222, and shaft 221 carries a pinion 223, these pinions being arranged to engage a rack 224 on a bar 225 arranged to reciprocate in a stationary guide frame provided with a lower guide flange 226 and also provided with upper flanged rollers 227 to guide the bar 225 and take up its upward thrust. The rack bar is provided with an upwardly extending arm 228 provided with a vertical slot 229 and in this slot is located a roller 230 carried by an arm 231 extending laterally from the blank assembly and transfer carriage, so that the blank carriage is free to move vertically as it is impelled to and fro by the rack bar. The glue roll pinions 222 and 223 are continuously driven in opposite directions, whenever the carriage drive clutch 130 is engaged, in the following way: Pinion 222 is narrower than pinion 223, which has quite a wide face, as best shown in Figure 10. Pinion 222 engages an idler pinion 222ª mounted on a stud shaft 222ᵇ, which may be located on the adjacent end wall of the glue trough, and this idler engages a pinion 232, which also engages and drives the other roll pinion 223. Pinion 232 is operatively integral with a gear 233, both of these gears being mounted to revolve together on a shaft 234, which is the tilting axis of the glue trough. Gear 233 engages a gear 235, fixed on shaft 145 previously mentioned. The driving connection from this shaft to the clutch has been explained.

For supplying glue to the glue rolls, a glue feed device is provided consisting in the present instance of a "dipper" 37 in the form of an oscillating part-cylindrical shell carried by stub shafts 236 and 237, one of which has a bearing in a transverse trough member 238, and the other passes through a bearing in the left-hand end wall 239 of the trough. The dipper shell is connected to a hub 38 previously mentioned, in which the ends of the stubs shafts are secured. This hub is located close above the trough partition 27ª. The left-hand stub shaft carries a gear 240 engaging gear 200 of the trough oscillating cam 31, previously mentioned. Due to the relative locations of the trough tilting axis, the axis of gear 240, and the axis of pinion 200, the movement of the lower teeth of gear 240 in engagement with the teeth of pinion 200 causes the tooth-pitch contact to vary somewhat, that is to say the teeth will mesh deeper when the trough is in central position, and will be withdrawn slightly when the tank is in either tilted position. The tooth depth and the relative arrangement of the gears is such that this varying tooth contact is permitted and proper driving contact is maintained.

In this way the dipper is oscillated simultaneously with the oscillations of the glue trough, but with greater amplitude of movement, and at each oscillation one portion of its outer surface, that is a strip of the surface from one edge toward the center of the dipper surface, dips into the appropriate glue compartment 33 or 34, and in the opposite movement carries glue to the appropriate glue roll 35 or 36 for application to the stencil surfaces, or to the bottom of a shell blank, as the case may be. As previously stated, in making loose-wrapped boxes, or in any case where it is not desired to deposit glue on the under side of the shell blank, glue is omitted from the forward glue compartment, and no glue will then be supplied to roll 36, and the latter acts merely as a pressure roll, in the manner previously explained.

At each oscillation of the glue trough, one of the pinions 222, 223, is freed from rack 224, and the other pinion is engaged with it; and consequently the blank carriage, by its described connection with the rack, is in each cycle of the machine driven first back, and then, after a rest, forward again, where it pauses, and the cycle is then repeated. The engagement of clutch 130 may be arranged so that the pinions start to move slightly before the trough is tilted to bring the pinion which is about to drive the carriage into engagement with the rack; or by another arrangement or adjustment, the pinion may be first engaged, or at least brought into operative position in the pitch-line of the rack, and the clutch then engaged, to drive the carriage and glue rolls.

To avoid difficulties involved in stopping the carriage at each end of its stroke, and for other reasons, the described gearing may be arranged so that the carriage drive is discontinued slightly before it reaches end-stroke position, and various means may be provided to insure proper completion of the stroke. Such means are sufficiently exemplified in the present case in the following mechanism: Near its forward end the carriage is provided with a stud 245 and near its rear end is a similar stud 246.

These studs cooperate with substantially similar carriage positioning jaws 247 and 248, each of which has a straight cam surface 249 to engage the appropriate stud. The jaws are formed as angular extensions of arms 250 mounted to oscillate on transverse frame bars 81$^b$ and 81$^c$. To the hub of each arm 250 is connected another arm 251, and these arms are connected by links 252 and 253 to a lever arm 254 fulcrumed on a transverse shaft 255 and operatively connected to another arm 256, which is connected by a link 257 to a bell crank 258 fulcrumed at 259, and this bell crank is connected by a link 260 to another bell crank 261 fulcrumed on shaft 212 previously mentioned. Bell crank 261 has a cam roller 262 engaging a cam groove in a cam body 263 mounted on forward cam shaft 127. The cam groove is contoured so that normally the jaws 247 and 248 are held up, out of the path of movement of the carriage studs 245, 246, that is, in the position shown in Fig. 4. As the carriage approaches the end of its travel in either direction, and at about the moment that the carriage drive through its gearing is discontinued, the jaws descend, and one of the cam surfaces 249 engages the stud which is positioned below it, and by the downward, angular movement of the jaw this cam draws the carriage to the end of its stroke. Desirably the carriage is positively checked and located at either end of the stroke by stops, such as screws 265 seated in carriage supporting frame end members 266, and secured in adjusted positions by lock nuts 267. The heads of the screws are arranged to engage lugs 268 on the carriage, which may be provided with cushion blocks 269. The jaws 247 hold the carriage firmly against the stop screws at each end of its stroke, during the carriage rest period, while blank-selecting and assembly forming operations are performed.

It is desirable also in some cases to provide means for gradually bringing the carriage to rest, without undue shock to its associated parts, or other parts of the machine. For this purpose, in the present instance, the following dash-pot mechanism is provided: The carriage-supporting frame end members 266 are formed with dash-pot cylinders 271, in each of which is a piston 272, the two pistons being connected by rods 273, one located along each side of the carriage. The carriage has eyes 274 slidably embracing the rods. At each end of its stroke the carriage engages the end of one of the pistons, and its movement is thus gradually checked and cushioned, and as the piston in question is moved inward by the movement of the carriage, the other piston is drawn outward by rods 273, ready for a checking action at the end of the next carriage movement.

The shell-blank selecting and stenciling head 1 is secured at the lower end of a sleeve-member 277 secured centrally in the carriage near its forward end. The head may be substantially of box form, and on the lower edges of its side walls the stencil strips 7, of rubber composition of other suitable material, are secured. Other stencil strips may be secured to pieces 278 detachably secured to ends of the head 1 (Figs. 4 and 8), and various other arrangements may be made, to provide any desired stencil pattern. The ejector 8 is located within the stencil head. While this element may sometimes be designated for convenience as an ejector, in the present embodiment it performs several other functions, namely, it serves as a suction gripper for the shell blanks, to firmly grasp, lift and retain the blanks, in addition to the blank seizing, lifting and retaining function of the adhesively coated stencil strips; although the blank gripping function of the stencil strips is sufficient in some cases, such as in handling blanks of small area, and in that case the gripping function of the ejector may be omitted. The ejector also serves to eject or strip the blank from the stencil head after the shell blank is brought in contact with the cover blank, and to retain the former in contact with the latter during completion of the assembly-forming operation; and the ejector also serves as a support or abutment for the shell blank during application of adhesive to the under surface of the blank by the "tight-wrap" glue roll, or during the pressing engagement of the roll in absence of glue, to insure contact of all parts of the blank margins with the glued stencil surfaces.

The ejector head 8 is secured at the lower end of a tubular bar 9, which is mounted to reciprocate in sleeve 277. The head is secured to a fitting 280, provided with a socket to receive the lower end of bar 9, and a long bolt 281 passing through the bore of the bar, with an air passage 282 surrounding the bolt, secures the fitting to the reciprocating bar. The upper end of the bolt stem fits closely in the hollow bar, and this, with the bolt head engaging the upper end of the bar, and with suitable packing when necessary, closes the upper end of the air passage. Surrounding the threaded bolt end 283, fitting 280 is provided with air holes 284, giving communication between passage 282 and a central aperture 285 in the head; and in this aperture is inserted a plate 286 provided with air holes 287 to distribute the "suction" effect exerted upon the blank.

The ejector bar 9 is provided with a toothed rack 10, previously mentioned and this is engaged by segment gear 11 carried by a shaft 290 mounted in bearings 291 in the carriage frame. (See Fig. 10.) A spring 292 is located about the shaft, in engagement with the frame at 293 and also engaged with a hand knob 294 on the end of the shaft. The spring is tensioned to urge the bar, and the ejector head, upward. During the rearward carriage movement the ejector head is held against the action of spring 292, so that its lower surface is flush with the under surfaces of the stencil strips, by a cam-pawl 295 pivotally mounted on a pin 296 carried by an upward extension 297 of the carriage. The cam-pawl 295 has a cam surface 298 and a detent recess 299, both of these cooperating with a roller 300 revolubly mounted on one side of the ejector bar 9, near its upper end. Connected to the cam-pawl is an arm 301, and a spring 302 tensioned between the arm and the carriage at 303, urges the arm into engagement with a stop 304 when recess 299 is freed from roller 300. On traverse bar 81b, previously mentioned, which carries carriage locating jaw 247, is fixed an arm 310, and adjustably inserted in the end of this arm is a screw 311, secured by a lock nut 312. The upper end of the screw is arranged to lie below arm 301 when the carriage is in forward position, as shown in dotted lines in Fig. 11.

Ejector bar 9 also carries a lug 313, which when the carriage is in rearward position, cooperates with a detent 314 adjustably secured to a detent plate 315, mounted to oscillate on a transverse shaft or frame bar 316. The plate has a toe or stop 317 which engages a transverse frame bar or shaft 255, previously mentioned, and normally the plate is held in this position, as shown in full lines in Fig. 11, by a spring 318. On the side of plate 315 opposite to detent 314 is an adjustable lug 319, having a rounded corner 320 to cooperate with a roller 321 secured to the carriage frame extension 297 at 322.

When the carriage moves forward, the ejector head is held in uppermost position, with its lower surface above the under surfaces of the stencil strips, by spring 292 acting through the segment gear and rack, and cam-pawl 295 is at this time in idle position, as shown in full lines, Fig. 11, that is, with arm 301 held against stop 304 by spring 302, and with the detent recess 299 free from roller 300. As the carriage nears the foremost position arm 301 is brought above the end of screw 311, and as the carriage moves downward arm 301 is raised in relation to the carriage by the screw 311, and cam surface 298 acts on roller 300 and forces the ejector plunger down against the action of spring 292, until detent recess 299 "snaps" into engagement with the roller 300. The detent cam is then retained in position by the upward urgency of spring 292 until positively displaced, and the lower face of the ejector head is maintained in position flush with the lower faces of the stencil strips, ready to pick up a blank when "suction" is applied before the carriage starts to move rearward, and is so maintained during the passage of the blank over glue roll 36, for reasons sufficiently explained above. As the carriage nears its rearmost position, while the carriage is still elevated, detent plate 315 is moved back by engagement of lug 313 with the vertical face of the detent 314, the detent turning on its pivot, and when the carriage descends so that the upper edge of lug 313 clears the corner of detent 314 the detent plate is snapped back to normal position by its spring, and detent 314 is then located as shown in solid lines, Fig. 11, above lug 313. The stencil and ejector heads are then in position to apply the shell blank to the cover blank positioned to receive it, by the upwardly moving cover selector head 19. The blank carriage is then raised, the ejector head being retained in the stated position by detent 314 to clamp the blanks between the ejector head and the cover selector head, and this condition continues while the cover margins are turned and secured. During the rise of the carriage, spring 292 is additionally tensioned. At the proper point in the carriage movement, roller 321 strikes the rounded corner of lug 319 and the detent plate is retracted, freeing detent 314 from lug 313, and the ejector head is then quickly raised by its spring. At the first upward movement of the carriage, detent recess 299 of the cam-pawl 295 was released from roller 300, and the cam pawl promptly moved out of the way of roller 300 by spring 302, so that the ejector bar is free to rise to uppermost position, with the ejector head elevated. "Suction" is cut off before the head is elevated. The carriage again moves forward in a new cycle of operations.

The blank assembly transfer device 2, exemplified in the present embodiment by suction grippers 12, are best shown in Figs.

1, 2, 4 and 37. The suction heads proper 12, are relatively long and narrow, and are carried by vertical supports 2, which are secured for adjustment lengthwise of the machine to carriage frame extensions 325. These extensions or struts are secured for lateral adjustment to a transverse carriage frame bar 326. The suction heads are suitably hollowed out to provide air passages 327 connected by flexible tubes 328 to one of the air valves 156 controlled by cam drum 153. Suction is applied to the heads when they are positioned above a blank assembly held by the margin turning devices 40 while the carriage is in forward, depressed position. The carriage then rises, and the transfer suction heads raise the blank, which has then been released from the margin turning devices, and the assembly is transported to the first "forming" station D and located below the forming plunger at that station, and "suction" is then released at the proper moment before return movement of the carriage.

The stack of shell blanks S at station A is carried by a base 13 and this is carried by a vertical rack-bar 330 mounted to reciprocate in a sleeve 331 secured to a horizontal frame plate 332. The rack 14 on rack bar 330 is engaged by pinion 15, as previously explained. The pinion is carried by a transverse shaft 333, mounted in bearings 334. The shaft has a squared end 335 to fit the socket of a hand-crank 336, which may be loosely mounted on the shaft end, so that it may be quickly applied and removed when it is desired to raise or lower the stack. The stack is automatically elevated to properly position the blanks, by the following means: Revolubly mounted on shaft 333 is a gear 337, driven by a worm 338 on shaft 339 turning in bearings 340, and shaft 339 is driven from forward cam shaft 127 by suitable connections, such as bevel gears 340ª, pulleys and a belt 341. Gear 337 is connected to shaft 333 by frictional means, such as a "slip" clutch 342, comprising a friction drum 343 secured to the gear, and an expansible clutch band 344 expanded by springs 345, and carried by a spider 346 secured to the shaft. The clutch is adjusted so that the pinion 15 will slowly elevate the stack, and will support its normal weight. Thus, as blanks are removed by the selector mechanism, the uppermost blank is maintained in sufficiently elevated position for proper contact with the blank engaging members. In order to insure proper blank contact, the stack is normally elevated at a slightly greater rate than is indicated by the rate of removal of the blanks. At each descending movement of the blank gripping devices, the stack is depressed slightly, and when this depression is greater than can be accommodated by the natural "give" of the blanks, the entire stack with its base 13 is depressed, the elevating pinion 15 turning "backward," and the friction clutch slipping to a corresponding extent. When it is desired to lower the stack to replenish the blank supply, the hand crank is applied to the shaft and turned "left-handed" as viewed in Figs. 3 or 4, until the stack is low enough to receive the new supply, the friction clutch slipping "backward" in this operation. The new supply being positioned, by hand or by special devices now to be described, the stack is again elevated to proper position by moving the crank "right-handed" and automatic feed proceeds as before. The replenishing operation may be performed, by quick manipulation, while the machine is running at moderate speed, or if necessary the machine may be slowed down for a brief time, and run on low speed by proper manipulation of the control handle 117, as previously described.

The stack is guided by a "back" plate 350, having a base 351 located in guide in horizontal frame plate 332; and the base has a depending lug 352 engaged by a screw 353 mounted in a bearing 354 and rotated by a hand knob 355 to adjust plate 350 in proper contact with the stack. The stack is also guided by side plates 356, having bases 357 movably mounted in guides in frame plate 332, and simultaneously adjusted to fit the stack by a screw 358 mounted in bearings 359 and engaging lugs 360 depending from the plate bases. The screw is provided with a crank handle 361, which may be affixed in place, or made readily detachable, as in the case of crank handle 336. To hold an upper part of the stack in proper feed position while the stack base is lowered to replenish the stack, yieldable blank supports 365 may be provided. These are carried by spring arms 366 secured to the side plates 356 and and back plate 350, and have rounded or angular blank engaging faces 367, which permit the blanks to move vertically in the normal feeding action, but engage a blank located a considerable distance below the top of the stack, with sufficient firmness to support this upper stack section and maintain the feed when the stack base with any lower portion of the stack, is lowered. The supports or clips 365 may be arranged in various ways, to engage different parts of the blanks. In the present instance they are arranged to engage outer edges of the side wings, and side edges of the end wings. When the stack is replenished and run up, the upper cards enter between the angular lower faces of the spring clips, until the "new" stack is united with the stack portion held above the clips.

To aid in renewing the stack, a "renewal" stack of blanks S' is desirably located adjacent to the active stack. In the present instance, the renewal stack rests partly on ledges 370 formed as extensions of sideplate bases 357, and to laterally support and hold this stack in shape, the side plates are extended so that they overlap the ends of the blanks in the "renewal" stack. The forward end of the stack also rests on a ledge 371 formed in the base of a stack carrier 372, this base being provided with wheels 373 running on tracks 374 provided on the frame plate 332, and being retained against tilting by strips 375 overlying the wheels. The carrier base also has a vertical plate 376 forming a guide support for the front of the renewal stack. By the described arrangement, an area of the bottom blank equal to the area of stack base 13 is left free. When the main stack is to be renewed, its base is lowered to a point below the side ledges 370, and handle 377 on carrier 372 is grasped and the carrier is moved toward the rear of the machine, carrying the renewal stack into position over base 13, and the base is then run up, lifting the new stack from ledges 370 and 371 and into operative position.

In some cases it is desirable to provide means to prevent the lifting of more than one blank at a time from the top of the shell stack. For this purpose, in the present instance, blades or "points" 380 are provided, located in upper portions or extensions of the side plates 356, these points being arranged to slightly overlap suitable parts of the upper blank, for instance, ends of the corner laps $c$, at places where no adhesive is to be applied to the blank margins. When the upper blank is seized and raised by the selecting devices, these corner laps easily bend downward sufficiently to pull out from under the points, and there is no tendency to bend the next underlying corner laps, which remain in extended positions and are engaged by the points, preventing any tendency of the second blank of the pile to lift away from the stack as the first blank is removed.

When the selector head 1 is positioned over the stack S, as shown in Fig. 4, its stencil surfaces are coated with glue, applied by roll 35, and the head then descends and the glued stencil strips are firmly pressed against corresponding marginal portions of the upper blank. This adhesive engagement of the selector is sufficient in some cases to properly lift and secure the blank for transfer. But, especially in the case of a large or "limber" blank, additional blank gripping means are provided, which may be used or not, as may be necessary. In the present embodiment, as previously described, the ejector head is equipped as a suction gripper, and when the selector or stencil head 1 engages the blank, the ejector head simultaneously engages, and suction is applied by the appropriate valve control device 156, and the central portion of the blank is firmly grasped by the suction gripper. The two heads then rise together, along with the carriage, and carry the blank over the glue trough, which is now in the position shown in Fig. 2, with roller 36 elevated. When glue is in trough compartment 34 glue is applied to the under surface of the blank, for tight-wrap operations, but for loose-wrap operations glue is absent from the compartment, and the roll simply presses marginal portions of the blank firmly against the stencil strips, to insure application of glue at every intended point. The carriage movement continuing rearward then brings the blank to station C, ready to descend for association with a cover blank to form the initial blank assembly.

The cover or wrapper blanks W at station C are carried by a base 16, provided with a rack bar 385, and this is raised and lowered by a pinion 18 on shaft 386, in substantially the same way as described with reference to the shell stack support. The stack is guided by front and rear plates 387 secured to bases 388 movably mounted in guides on a horizontal frame plate 389, and these bases have depending lugs 390 through which passes a screw 391, so that by rotating the screw the guide plates may be simultaneously adjusted to fit and properly locate the blank stack in position. The stack is also guided and located by an end plate 392 carried by a base 393 slidably mounted in guides 394, in frame plate 389, and a screw 395, provided with a crank handle 396 engages a depending lug 397 of the base, 393 to properly adjust the guide plate.

Additional guiding and supporting devices for the wrapper blanks carried by base 16 are also desirably provided, consisting of clips 400 adjustably secured on longitudinal bars 401. These clips are arranged to engage edges of the blank side wing portions adjacent to the end wings, or they may be adjusted to engage at the intersections of the end and side wings. The inner vertical faces of these clips are straight and smooth so that the blanks move up freely between them. The two side bars may be simultaneously adjusted laterally of the machine by screw 402 operated by a hand knob 403.

Guide plate bases 393 are provided with ledges, or inwardly projecting flanges 410, and extensions 411, of these provide supports for a replacement stack W', of cover blanks, which may be moved to position over the main stack base 16 by an end board 412 provided with a handle 413, in a way similar to that described with reference to the shell blanks.

The wrapper blanks are automatically elevated to maintain the top blank in proper position with relation to the cover selector or suction gripper, and this may be accomplished by mechanism generally similar to that employed for the shell blanks. However, owing mainly to the fact that the wrapper blanks are usually much thinner than the shell blanks, requiring more delicate manipulation and positioning, important differences are incorporated in their elevating mechanism in the present embodiment. The pinion shaft 386 is provided with a ratchet wheel 415, Figs. 3 and 8, engaged by a weighted detent pawl 416 and by a feed pawl 417 pivoted on the upper end of an arm 418, mounted to oscillate on shaft 386. This arm is moved to and fro in every cycle of the machine by a link 419 actuated by a cam 420 on the right-hand outer end of forward cam shaft 127. The feed pawl is weighted or spring pressed to normally engage the ratchet wheel, but this engagement is controlled by a rail 421 engaging a roller 422 carried by a forward extension of the pawl. The rail is supported by parallel levers 423, pivoted to the rail and to stationary frame plate 84. The position of rail 421 is controlled by a link connection 424 to an element of the sheet selecting mechanism, as explained hereafter.

When the cover feed suction head descends it grips the top sheet and lifts it from the stack in the descending movement of the head. Owing to the thinness of the sheets and their consequent close contact, preventing free separation of the sheets as the top one is lifted, (due to partial vacuum, static electrical conditions and the like) special means are desirably provided to separate the top sheet, or a portion of it, from the stack, and to hold down the next lower sheet as the upper one is removed. Such mechanism is best shown in Figs. 4 and 17 to 19. A framework supported adjacent to the front of the wrapper stack includes side members 430 providing guide-ways for slides 431 which are provided with racks 432. These racks are engaged by segment gears 433 mounted to oscillate on a frame member 434; and the gears are oscillated by links 435 connected to a lever 436 fulcrumed at 437 and provided with a cam roller 438 engaging a cam groove 439 in a cylindrical cam body 440 (see also Fig. 7) carried by a shaft 441, which is driven by bevel gears 442 from a shaft 443, which is connected by sprockets and a chain 444 to forward cam shaft 127. Slides 431 have upward-extending flanges 445, between which a suction roller arm 446 is pivoted on a pin 447. This arm is provided at its free end with downwardly directed extensions 448 and in these extensions are journaled sleeve shafts 449, on the inward portions of which a suction roll 450 is mounted. Vertical movement of the suction roll is controlled by a cam 451 located on one of the frame members 430, cooperating with a cam roller 452 on arm 446. A segment of the roll is cut away centrally at 453, to accommodate cover sheet holding fingers 454 secured to a shaft 455 mounted to oscillate in bearings 456. The sheet engaging ends of these fingers are quite thin, and are provided on their upper surfaces with projections or "horns" 457, which, when the fingers are in engagement with the stack beneath the upper sheet (wrapper) cause the forward edge of the wrapper to assume an irregular or sinuous formation, to facilitate its removal by the suction head. Shaft 455 is oscillated to move the sheet gripping fingers, by an arm 458 connected by a link 459 to a lever 460 fulcrumed at 461 and provided with a cam roller 462 engaging a cam groove 463 in cam body 440, previously mentioned. The suction roll, at each side of aperture 453 is provided with suction openings 464 communicating with the air passages provided by sleeve-shafts 449; and these passages are connected by suitable holes 465 bored in the sleeves, with air passages 466 extending through the rear end of arm 446 and through the arm extensions 448. A central portion of the arm air passage 466 is connected by a nipple and flexible pipe 467 to one of the suction control valves operated by cam drum 153. The outer end of one of the sleeve-shafts 449 is closed by the inserted end of a shaft 470 which extends laterally of the machine to a convenient point, where it is provided with a pinion 471. This pinion engages a rack cut on a rack bar 472 which is supported slidably in engagement with the pinion by a fitting 473 pivotally mounted on the shaft. The forward end of the rack bar is pivotally and adjustably secured at 474 to a stationary frame member 475. Thus the rack bar is permitted to oscillate in accordance with the vertical movements of the suction roll, but is fixed against longitudinal movement, so that as the roll is moved to and fro by slides 431 the roll is caused to rotate, first in one direction and then the other by engagement of pinion 471 with the rack. When the slides are retracted, arm 446 and the suction roll are raised by cam 451, and at the end of the retracting movement the suction roll is away from the sheet stack, so that it does not interfere with the descent of the suction head. In the advance movement of the slides, the cam roller 452 drops off the rounded end of cam 451, and roll 450 descends into contact with the top sheet of the stack, near its forward edge. Suction holes 464 are at this time directed downward, and suction is applied, causing the sheet edge to adhere to the roll. In the continued advance movement, rotation of the roll causes the marginal portion of the sheet to be curled up about the roll, somewhat further than indicated in Fig. 18, where the sheet-separating action of the roll is partly completed. Just before suction engagement of the roll with the sheet is effected, the gripping fingers 454 are withdrawn to the position shown in Fig. 18, and so remain until the sheet edge lifting action of the roll is completed. The fingers then descend and grip the edge of the next underlying sheet. Suction is then cut off from the roll passage, and the roll is retracted, permitting the elevated margin of the top sheet to fall again upon the gripping fingers, separated, however, from the next lower sheet by the fingers and their horns 457, as previously explained.

Pivotally mounted on a shaft 455' in line with shaft 455, at a point laterally removed from the forward portions of the cover stack, that is, beyond the ends of the cover side wings, is a hub 480 provided with a prong 481, curved slightly upward, and arranged to cooperate with a roller 482 carried by an arm 483 rigidly fixed to suction roll arm 446. Shaft 455' carries an arm 484, Fig. 3 which is connected to the upper end of link 424, previously mentioned, to control the positioning of rail 421, which in turn controls the engagement of feed pawl 417. When the top of the stack is at the proper level, as the suction roll drops toward the upper sheet, it is kept by contact with the sheet at sufficient elevation to prevent contact between cam roller 482 and prong 481. Rail 421 is thus permitted to remain in its lower position, and in this position it engages pawl roller 422 and elevates the tooth of the pawl, so that movement of lever 418 is ineffective to rotate ratchet wheel 415 and elevate the sheet stack. But when a certain number of sheets have been removed from the stack by the wrapper suction head, the number depending on the thickness of the sheets and the adjustment of the mechanism, at the next advance of the suction roll, it is permitted to drop, by the lowered position of the upper sheet of the stack, far enough for cam roller 482 to engage prong 481; this engagement takes place during a rearward (right hand) movement of lever 418, as viewed in Fig. 3; prong 481 is depressed by roller 482 and through link 424 rail 421 is raised, and the feed pawl is permitted to engage with the ratchet wheel, so that in the advance movement of lever 418 the wheel is turned a fraction of a rotation, and through the shaft and pinion 18 the stack is elevated a short distance. The pawl may remain in active condition during one, two, or more successive strokes of lever 418, until the top of the stack has been restored to normal level; but with a preferred arrangement and adjustment of the machine, the pawl is held inactive during several successive strokes of the lever, during which time the level of the stack top gradually recedes; the stack feed control devices then operate to make the feed pawl active during one lever stroke, which is sufficient to restore the stack to proper position; several idle strokes are then made, then one active stroke, and so on.

With the described automatic feed, when the stack is lowered by hand to replenish the blanks, or for other reasons, as described with reference to the shell-blank stack, pawls 416 and 417 are first released and the stack may then be lowered; the replacement stack is positioned substantially as in the case of the shell stack, and the pawls may then be replaced in operative positions, and the stack is run up by the hand crank to the proper level. Replenishment of the cover stack is required, however, only at relatively infrequent intervals, on account of the thinness of the blanks; and quite a long run, even with the machine working at good speed, may be made before renewal is required.

The cover blank selecting or positioning device, in this case the suction head 19 is usually of substantially rectangular outline, substantially of the same area as that of the body portion $a$ of the shell blank. It is secured on one side to a chambered plate 490, and this has a hub 491 through which passes a tubular shaft 492, and the hub is rigidly secured to the shaft. The hub has a chamber about the shaft, to provide an air space communicating with the chamber in plate 490, and holes 494 are cut in the shaft to connect the shaft passage with chamber 495. Near its ends, the shaft passes through bearings in slide blocks 496, which are mounted in vertical guide-ways 498 near the sides of the machine. One end of the tubular shaft is closed, and at the other end is a swivel air connection 500, from which a pipe 501 extends vertically to a convenient point, where it is connected by a flexible pipe to one of the air control devices previously mentioned. The suction face of the wrapper suction head is provided with suction apertures 502 arranged in line near one edge, these communicating with the chamber 495 of plate 490; and in each opening is inserted a plate 503 provided with radiating apertures 504 to distribute the "suction" effect, and when desired a flexible cupped washer 505 of rubber composition may be inserted under plate 503. Adjacent to the right-hand guideway 498, the shaft has a pinion 25, previously mentioned, engaging rack teeth 26 cut on a vertical rack bar 510, the length of the toothed rack being equal to one-half the pitch-circumference of the pinion, so that as shaft 20 moves up and down, at the proper point in its travel the pinion engages the rack and is rotated one-half turn, this movement being communicated to the shaft and suction head.

Near the other guide-way, the shaft is provided with a "tumbler" or positioning device 511, in the form of a plate of moderate length, with rounded ends. This moves in a channel guide-way 512, one side wall of which is interrupted to provide an opening 513, positioned horizontally opposite rack 26. When the tumbler is opposite the opening, the shaft is rotated by the rack and pinion, and the tumbler swings out through the opening, as shown in dotted lines Fig. 9, and then passes into the uninterrupted upper or lower portion of its guide-way, assuming either an upward or a downward-pointing position, as shown in full and dotted lines in the same figure, thus retaining the gripping face of the suction head in either upward or downward facing position during the upper and lower portions of its travel, respectively. Vertical movement is imparted to the suction head by links 23 pivotally connected to slide blocks 21, and to lever arms 24, previously mentioned, on transverse shaft 515 mounted in bearings in the upper frame-work of the machine. This shaft has an arm 516, connected by a link 517 to a bell-crank lever 518 fulcrumed at 519 and provided with a cam roller 520 engaging a cam groove in cam body 140, previously mentioned, on forward cam shaft 127. The cam groove is contoured to raise and lower the wrapper suction head at the proper time with relation to other parts of the machine, and at the proper speed, and with rests of proper duration between its movements.

Also at station C, the cover-margin turning mechanism 40 is located, consisting of duplicated instrumentalities, each comprising a fixed bar 41 detachably secured to a sleeve 520 adjustably mounted on a fixed, horizontal frame bar 521, these frame bars being located at opposite ends of the blank-position. Each opposite pair of sleeves also carries a movable turner bar 42, the ends of the bar being secured to stub shafts or trunnions 43, mounted in bearings on sleeves 520. The inner sides of the trunnions, in the position shown in Fig. 12, are cut away, to avoid interference with the blanks or the blank locating heads. The fixed bars are provided on their upper faces with compressible presser-strips 521ª, and the movable bars are provided with detachably connected strips 522, on the active faces of which are secured compressible presser strips 523. The movable margin turning and pressing bars are operated by pinions 525 secured to the outer ends of trunnions 43, and engaged by segment gears 526 mounted to oscillate at 527 on sleeves 520. An arm 528 is connected to each segment gear, and these arms are connected by links 529 to bell-crank levers 530 fulcrumed at 531, the opposite bell crank levers 530 being in relatively reversed positions, and the two levers being connected together by a link 532. To one of the bell crank levers is connected an arm 533, which is connected by a link 534 to a bell-crank lever 535 fulcrumed at 212, and provided with a cam roller 536 engaging a cam groove on one side of cam body 140 carried by a forward cam shaft 127. The cam groove is contoured so that after the initial blank assembly is properly positioned in relation to the fixed turner bars, the movable bars are moved inward and then downward (in an arcuate path) and finally press the cover blank margins f firmly upon adjacent margins on the upper shell blank surface.

It is desirable in some cases to provide means for punching thumb or finger notches at the edges of the assembly side wings so that the notches will come in the proper position when the assembly is in folded box-top form, to facilitate opening the box. Such means is associated in the present embodiment with the margin turning and pressing mechanism, Figs. 12 and 13. Inserted centrally in the fixed bars 41 are punches 540, the presser strips being interrupted to accommodate these punches; and the movable bars 42 are provided with inserted punch sleeves 541, secured by set screws 542, to cooperate with the punches. This punching mechanism may be provided at one or both sides of the blank assembly. When the movable bars are turned over to the position shown in Fig. 12 the punches enter the punch sleeves and bite out semi-circular segments of the combined shell and cover material, forming notches r, Fig. 16.

It is desirable in some cases to provide means at station C for supporting laterally projecting or end portions of the blanks and especially of the wrapper blank and also to support the assembly consisting of the superposed blanks, at the time when the assembly is engaged and gripped by the suction grippers 12. For this purpose supporting plates or blades 720, Fig. 8, may be provided on the ends of piston stems 721 connected to pistons 722 in air cylinders 723 secured to side frame members. The pistons are urged forward by springs 724 until checked by collars 725 on stems 721 and are retracted by air suction supplied through pipes 726 connected to the cylinders near their outer ends. The pipes are connected to one of the air control valves previously mentioned. Normally the supporting blades 720 are retracted, but they are extended by relaxation of suction behind the pistons 722 to the position shown in dotted lines in Fig. 8, after the cover blank is brought to assembly position, that is just above the level of the blades 720, as viewed in Fig. 8. The blades then support end portions of the wrapper blank and keep the wrapper up close to the shell material along a central transverse line and thereafter when the suction grippers 12 descend to grip the completed assembly the blades 720 support the assembly for the gripping action. This mechanism may be employed in any case where it is necessary or desirable, but it is especially advantageous in the case of very large blanks where without some central longitudinal support the cover and shell might not remain in proper contact or where the assembly might not be sufficiently supported by the cover margin turning devices for seizure by the transfer grippers.

When the wrapper suction head 19 is in the position shown in Fig. 4, suction is applied, and the suction apertures cause the rearward portion of the blank, which has been separated from the stack in the manner previously explained, and lies on the horns of the stack gripping fingers 454, to adhere firmly to the rearward portion of the head surface. The head then rises, and the blank is lifted from the stack without tendency to disturb the next underlying blank. At an intermediate point in its travel the head is turned to upward position by the rack and pinion mechanism, this rotation being in a right-hand direction, as viewed in Fig. 4, so that the blank "trails" from its point of adhesion, without tendency to separate from the head surface. The blank then lies flat on the upwardly presented face of the head, and as the blank passes between the stationary presser bars, extending portions of the wrapper side wings are bent downward and then spring back to normal position as the blank comes to a level slightly above the presser strips. A shell blank carried by the combined shell blank stencil head and ejector head, and suitably glued, is now brought into facial contact with the wrapper, this forming the initial blank assembly. The assembly is now located substantially at the level of the upper faces of the fixed presser bars, and the margin turning and pressing operations are performed, as sufficiently described above. The wrapper suction head remains in position during retreat of the carriage, and until the completed assembly is seized by the transfer grippers. Suction is then cut off from the wrapper suction head, and the head descends, reversing its position on the way down, and the cycle is repeated.

The blank assemblies may be discharged by the transfer mechanism for utilization in any suitable way, the mechanism as so far described constituting a complete machine for the formation of such blank assemblies, as previously explained. But desirably the transfer devices carry the assemblies successively to box shaping or forming mechanisms, located at station D, and subsequent positions, which are operated automatically in proper relation to the assembly mechanism and to each other.

Adjacent to box forming stations D and E movable frame side plates 550 are provided for supporting various parts of the mechanism and these side plates may be adjusted toward and away from the center line of the machine to properly position various devices for working on boxes of different dimensions. For this purpose the side plates are provided with base flanges formed with projections 552 which fit in guide grooves 553 on transverse frame bars 554. The movable side plates also have depending lugs 555 (Fig. 5) in which a screw 556 has threaded engagement, and this screw is provided with bearings on fixed side plates 85 in the main frame and with a hand wheel 557 by which it is rotated to adjust the movable frame plates.

The side wing folding and box clamping "boards" or plates 45 at station D (see Figures 5 and 21) are provided with pins 560 engaging in holes formed in side flanges 561, on the inward ends of cylinders 562 secured beneath transverse frame members 563. Each plate is also connected to a piston 564 (Fig. 21) located in the adjacent cylinder. An air pipe 565 passes through each piston from the rear and communicates with the cylinder, and these pipes may be joined together and connected by suitable piping to one of the air control valves previously mentioned. Normally the pistons are urged outwardly, that is away from the box position, by springs 564ª, but when suction is applied the pistons are moved inwardly, that is toward the box, and the pressure plates 45 are in this way pressed against the sides of the box. Other arrangements, such as mechanical devices, may be provided for moving the plates convergently at the proper times, or the pneumatic control devices may be arranged so that suction is applied to move the plates inward instead of outward. The necessary plate movement is quite small.

When the box assembly is brought to station D the presser plates are in retracted position. The body portion of the blank assembly is positioned above the vertical channel provided between the presser boards, and forming plunger 46 is located above the body portion $a$ of the assembly, as shown in Figs. 5 and 20. Desirably the upper inner edges of the pressing and folding boards, are rounded as at 567 to facilitate the movement of the blank assembly between them as the side wings are folded up.

The forming plunger, as previously explained, is made in two parts 48. These members are carried by vertical parallel rods 47 arranged to reciprocate in sleeves 568 carried by a vertical frame member 569.

A cross piece 570 having undercut guide grooves 571 is secured to the lower ends of the rods 47 and the plunger sections are provided with T-shaped heads 572 fitting in the guide grooves. Between the supporting rods 47 is a plunger expanding rod 573. At its lower end this rod is shaped to provide an oval cam 574 engaging between the inner ends of the plunger blocks. The cam rod is rotated by a pinion 575 slidably splined on the rod and retained in fixed vertical position by a bearing sleeve carried by frame member 569. The pinion 575 is driven by a suitable connection including bevel gear 580, an arm 581, a link 582 and a cam yoke 583 carried by the link and embracing upper cam shaft 151. The cam yoke has a cam roller 584 engaging a cam groove in one side of a cam body 586 mounted on the cam shaft. The cam acts, by rotation of the cam rod, after the plunger descends between presser boards 45, to spread the two plunger sections 48. The sections are retracted by springs 590. The plunger is moved vertically by a yieldable link 595 pivotally connected to a cross head 596 which is secured to the upper ends of the two vertical bars 47. The other end of this link is connected to a lever arm 597 fulcrumed on a transverse shaft 598, and this shaft is provided with another arm 599 connected by a link 600 to a bell crank lever 601 fulcrumed at 602 and provided with a cam roller 603 engaging a cam groove in a cam body on the rear cam shaft 172. The cam groove is contoured to impart the proper vertical movements to the forming plunger, as will be sufficiently understood from further description of operations. Downward movement of the plunger is limited by a stop screw 605 (Fig. 5) adjustably engaging a lug 606 on the cross head 596 and secured in adjusted position by a lock nut.

The lower end of the screw 605 (Fig. 5) encounters a projecting pin 612 on a lever 612ª carried by a short shaft which also carries a short lever 613 connected by a link 613ª to a bell crank 614, which has a cam roller operated by cam 614ª on shaft 151. As the forming plunger descends the stop pin 612 is in position to check the plunger at the proper point and position it in relation to the end shaping devices and any slight excess movement of arm 597 and the connected linkage which operates the plunger is taken up in the yieldable link 595. After the end forming operations are completed the bell crank 612ª is operated to withdraw the stop pin 612 from below the screw 605 and the plunger is then moved further down by its operating linkage.

The yieldable link 595 comprises a spring 607 compressed between a collar 608 on a stem 609 connected to arm 597 and engaging against the bottom of a U-shaped link 612, the upper ends of which are pivoted at 611 to the cross head 596.

To retain corner lap portions of the blank assembly in extended position during preliminary folding operations in some cases, corner lap retaining devices, such as the substantially U-shaped metal strips 615, are provided, one of these being located a short distance outward from each end of the forming plunger. The cross piece 616 of each retaining member is connected to the stem 617 of a piston located in a cylinder 619, and these cylinders are adjustably secured by screws 620 passing through slots 621 in a fixed cross piece 622 secured to a convenient frame member, such as 569. The upper ends of the cylinders are connected by air tubes 623 to one of the air valves previously mentioned. Each of the retaining devices has an inwardly projecting arm 624 provided with an adjustable screw 625 arranged to rest on the upper surface of one of the plunger members, as best shown in Fig. 27. When these retaining devices are used they are allowed to descend by gravity with the screws resting on the plunger sections, as shown in Fig. 27, until the vertical blades 626 of the retaining devices are in position, as shown in Figs. 22 or 28, to hold the corner laps in extended position while other parts, such as shell end wings are folded up between them. At the proper moment the retaining devices are withdrawn by applying suction to the cylinders. The downward movement of the retaining devices may be limited by engagement of their pistons with the lower ends of the cylinders, or in other ways.

As the assemblies are moved down to the initial folding position between the side boards 45 they are supported by the longitudinally arranged heads or strips 50 on the upper ends of plunger 51 connected to pistons 629 in air cylinders 52, secured to suitably located frame members. Air tubes 630 are connected to the upper ends of the cylinders and at their lower ends the cylinders are provided with vents or leak valves 631, the valve openings being provided with adjustable screws 632 having tapered points confronting the openings. As the box moves to the described position the plungers are raised by applying suction, this being controlled by one of the air valves, previously mentioned, and the piston is permitted to rise by leakage through the leak valve. The upper end of each plunger then encounters the bottom of the box blank, near one end, and supports it, as shown in Fig. 22, and after operations at this position are performed the plungers remain in contact with the blanks and prevent their dropping away from the forming plunger as the blanks are moved down to the lower position in the vertical folding channel.

When the blanks are in the first (upper) folding position between the presser boards 45, their extended end wing portions rest upon end-wing folding plates 55, each of which is carried by a shaft 635 pivoted in arms 636 extending from the upper edges of frame plates 637. Each of the shafts is provided with an arm 638 connected by a link 639 to a vertically movable rod 640 suitably guided by a frame arm 641, and the rods are provided with racks 642 engaged by segment gears 643 carried by a transverse shaft 644. On this shaft is an arm 645 connected by a link 646 to a bell crank lever 647 fulcrumed at 648 and having a cam roller 649 engaging a cam formed on the periphery of a circular cam body on rear cam shaft 172. At the proper time in the series of operations, depending on the style of box being made, the folding plates are turned up on their pivots by the described mechanism, and the end wing structure of the assembly or end wing portions of the cover blanks, as the case may be, are up against the ends of the forming plunger or against the other end portions of the box structure which may have been previously positioned over the plunger ends. The folding plates are then retracted.

Means are provided adjacent to the box ends in the upper position, station D, for turning in the corner laps. This mechanism may vary greatly, but in the present instance it comprises corner lap turning blades 53 carried by arms 655 pivoted at 656 on reciprocating slides 657. These slides are mounted in guides in adjustable blocks 659 located on transverse frame members 54, previously mentioned, and are secured in adjusted position by set screws 660. Each slide has on its under surface a rack 661 engaged by a pinion 662 carried by a short shaft 663 mounted in bearings in the block. Extensions 664 of these shafts extend outward and are provided with bevel pinions 665, the two bevel pinions of the two shafts for opposite pairs of folding plates being engaged by bevel pinions 666 on a longitudinal shaft 667 mounted in bearings 668 and provided with a spur pinion 669 engaged by a rack 670 on a vertical rack bar 671 arranged to reciprocate in a sleeve bearing 672 on adjustable frame plate 550. Another rack 673 is formed on the lower end of this rack bar and this is engaged by a segment gear 674 on a transverse shaft 675, and this shaft has an arm 676 connected by a link 677 to a bell crank lever 678 fulcrumed at 679 and provided with a cam roller 680 engaging a cam groove in one side of a circular cam body on the rear cam shaft 172. By the described mechanism the two folding blades near each end of the box are moved convergently at the proper time in relation to other folding operations to turn in the corner laps. In some cases the vertical rod 671, forming a part of the linkage just described may be interrupted and the two parts connected yieldably together, for instance by a sleeve 685, Fig. 37, this sleeve being positively connected to one section of a rod and slidably embracing the other section. A spring 686 enclosed in a sleeve bears against the ends of the two rod sections and urges the upper rod section yieldingly upward and provides a certain amount of lost motion in the linkage when that is desirable.

One object of the described yieldable sleeve arrangement is to enable the operator to limit the movement of the corner lap folding blades 53, by a set screw 671$^a$, mounted in a bracket directly over the end of rack bar 671. This gives a definite movement of the corner lap folding blades regardless of the precise amount of cam movement.

This reciprocating movement may be sufficient in some cases, but it is desirable that the blades shall engage the corner laps at some distance outwardly from the fold lines along which the corner laps are connected to the upturned side wings $b$, to prevent improper bending or breaking of the corner laps and for other reasons. It is desirable also that thereafter, when the corner laps have been turned in partially, the folding blades shall move in toward the ends of the forming plunger to press the corner laps closely into final position. For this purpose the pivoted arms 655 which carry the folding blades are provided with cam rollers 690 moving along a cam track 691 on the adjacent block 659, this cam track having a straight portion 692 and an inwardly curved portion 693. Blade arms 655 are retracted by springs 696. During the first part of the inward movement of the folding plate its cam roller travels along the straight portion of the cam track and during that movement the active edge of the plate is located outward from the corner lap fold line, and so strikes the corner lap at a favorable point and begins to fold it inward, and then the cam roller strikes the curved cam portion 693 and forces the corner lap close against the plunger or other parts of the box end structure, as shown in Fig. 26.

Other box forming or folding instrumentalities may also be located at the upper folding position of station D and it is to be understood that the machine is designed so that without disturbing the general plan of operations suitable different instrumentalities may be located at this position to operate upon boxes of different styles including those chosen for illustration herein, and many others. An important feature of the invention is the provision of adjustable or interchangeable devices for the purposes described. For turning up the shell end wings in one style of loose-wrapped box, mechanism illustrated in Fig. 22 is provided. This comprises an end wing lifting member or blade 700 formed as the inner end of a lever fulcrumed at 701 on a cross piece 702 secured to the end of a piston rod 703 which is connected to a piston moving in an air cylinder 704 secured to a frame member 705 which is adjustably located on one of the adjustable frame side plates 550. The cylinder is provided with an air connection 706 at one or both ends and these air connections lead to suitable control valves, previously described, or a single air connection may be provided at one end of the cylinder to move the piston one way and the piston may be moved in the other direction by a spring. "Leak" valves may also be provided in the cylinders, when necessary, substantially as described, with reference to cylinders 52. Various other pneumatic or mechanical operating devices for the wing lifting device may be provided. In the present instance the outer end of the lifting lever is provided with an angular portion 707 engaging a cam groove 708 formed in a plate 709 secured in fixed relation to the cylinder. This cam groove has a straight portion 710 and a hump 711, and an outer descending portion 712 beyond the hump. When the blank assembly is positioned for action by the end wing lifter, the piston is at the outward end of the cylinder and the lever offset is in the outer portion 712 of the cam groove. The inward end of the lever constituting the point of the lifting device proper is thus held down near the level of the cover blank end wing. In the first inward movement the end of the lifter is depressed and runs under the edge of the shell wing being forced down into sufficiently close engagement with the cover sheet by the cam hump 711. In some cases the assembly-transfer suction grippers 12 may be retained in suction engagement with the shell end wings, while the grippers rise a short distance, to lift or assist in lifting the end wings, and at the proper point, suction is cut off to release the wings.

The lever offset is then depressed as it passes toward the straight cam portion 710 and the point of the lifter is correspondingly elevated, raising the shell end wing until finally it is held up close to the end of the forming plunger, as shown in Fig. 22. The lifting device is then retracted. When the shell end wing lifter is employed, as above described, the corner lap retainer 615 is usually employed as previously described and as illustrated in Fig. 22. After the shell end wing has been elevated and the lifter retracted, the corner lap retainer is elevated and the corner lap folding blades are moved in the previously described manner and the corner laps are retained by them while the pivoted end wing folding plates raise the extended cover end wing portions to final position overlying the corner laps. While the action of the corner lap folders and pivoted cover end wing folders have been described as occurring in sequence, these actions actually take place approximately simultaneously, the cover end wing portion coming in place as the corner lap folders complete their movement and the corner lap plates are then withdrawn while the cover end wing plates hold the blank members in position.

For tight-wrapped boxes where the blank assembly arrives at the described folding position with the shell end wings secured to the cover end wing portions by moist adhesive, blank manipulating devices shown in Figs. 28, 31, 32 and 34 are desirably provided. Shell end wing elevators are provided, substantially as described with reference to Fig. 22. Instead of pivoted end folding plates previously described, end folding rollers 715 mounted between arms 716 secured to one of the frame plates 550, are provided. Adjacent to the assembly end wing structure are cover end wing grippers comprising fixed gripping members 717 and pivoted gripping fingers 718 mounted on a shaft 719 provided with an arm 719$^a$, and this arm is connected by a link 719$^b$ to any suitable operating device, for instance 640, and linkage similar to that which in another arrangement of the machine operates the pivoted folding plates 55. Corner lap retaining devices 615, as previously described, are also pivoted for this tight-wrap operation. When the blank assembly comes into position the pivoted gripping fingers are raised and are then moved to grip the extended margins of the cover end wings against the fixed grippers, 717. The end wing lifter 700 then moves inward in substantially the same manner as previously described, and engages under the outward end of the shell end wing and strips the wing away from the adjacent cover portion and finally lifts the shell wing into position against the end of the forming plunger.

The corner lap retainer is then removed and the corner laps are turned in as previously described. The box is then moved down by the plunger and in the downward movement the extended wing portions of the cover are rolled up into position by the folding rollers 715, the movable grippers 718 being retracted at about this time. Figs. 31 and 35 show successive conditions of the box as acted upon by the described instrumentalities.

Where the blank assembly includes portions of the wrapper extending beyond the side edges of the shell end wings, in one form of loose wrapped box, and where these margins are to be folded over upon the shell end wing, as sufficiently indicated in Fig. 38, additional devices may be provided for folding over these cover margins, this operation being desirably performed in conjunction with the turning up of the end wing structure as a whole. Mechanism for this purpose is shown in Figs. 37 and 39 to 41. An end wing lifting and folding frame, comprising side plates 730 and a middle plate 731 is pivotally mounted on sleeves 732. The folding frame as a whole is oscillated about the sleeve axis by a link 733 connected to central plate 731 and also connected to a lever arm 734 on a shaft 735 mounted in bearings in fixed frame members, such as arms 636, previously mentioned, and the shaft also has an arm 736 connected by a link 737 to vertically movable rod 640, previously mentioned. Along the outer edges of each plate is located a margin folding blade 740, these blades being provided with trunnions 741 mounted in bearings 742 on plate 730, and the trunnions are provided with pinions 743 engaged by segment gears 744, carried by shafts 745 secured in bearings 746 at the undersides of plates 730. At the inward end of each shaft 745 is a pinion 747 engaging rack teeth 748 cut on a rack bar 749 arranged to reciprocate within sleeve 732. An outer end of the rack bar is free from the sleeve and is provided with a cam roller 750 engaging a fixed cam groove 751. A blank assembly of the type of Fig. 38 is shown in Fig. 37 descending to the first folding position. It is, of course, in flat condition and the extending margins of the cover are bent upward slightly by the upper edges of the folding blades, as the main portion of the end wing structure is laid on plates 730, the folding frame being then in its outward or nearly horizontal position, as shown in Fig. 37. The frame is then oscillated about the center of the sleeve and at the same time cam roller 750 following cam groove 751 moves the rack bar 749 so that the folding blades 740 are rotated inward, turning the cover margins over the adjacent edges of the shell end wings, this folding being completed as the entire folding frame reaches vertical position. The described mechanism operates in connection with corner lap folding blades of the nature previously described, and these blades operate in substantial unison with the end wing folding mechanism, but so that the corner laps are folded in first, and then the end wing structure comprising the shell end wings and cover paper with margins turned over, as described, comes into position. The parts are then retracted and the folded condition of the assembly is maintained by pressing it downward into the next folding position between end squeezing plate 60.

In connection with end folding mechanism of the character just described, devices similar to the corner lap retainers 615 previously described, may be provided, but operating in a different manner and for a different purpose. These devices 755, as indicated in Figs. 37 and 38, are arranged so that the lower ends of the vertical arms 756 engage the shell end wings at a short distance outward from the fold line, and force the end structure down into proper position on the folding frame 730, 731, insuring the proper initial turn-up of cover margins $g$ along the edges of the shell wings.

In Fig. 26 the corner lap folding blades 53 are shown in the act of forming a tuck or bellows fold in the cover end wing material. This cover wing portion lies on a pivoted wing turning plate, such as 55, Fig. 22. Such a fold may be formed in the cover material about an outwardly extending shell wing portion of suitable width, or it may be formed in the cover material when the shell wing has been previously upturned. As the folding blades move inward to turn in the corner laps $c$ they simultaneously turn over margins $g$ of the cover material forming tucks or bellows folds, and substantially simultaneously the pivoted end wing folding plates rise and complete the formation of the folds and hold the cover material up in position for final pressing at subsequent positions.

After the folding operations at the top of the folding channel at station D have been completed, the clamping boards 60 are retracted and the forming plunger moves the box down to the (lower) position in the vertical channel, where it rests on longitudinal supporting strips 50. The box ends now come between end pressing plates 60 which are at this time in retracted position. These plates are now moved inward with suitable force to press the box ends and insure the adhesive connection of their parts. For this purpose the plates 60 are mounted to slide on transverse frame members 760 and they are operated by toggle links 761 and 762. The outer toggle link is connected to a bell crank 763 fulcrumed at 764 and having its horizontal arm urged up against an adjustable stop 765 by a spring 766. By suitably adjusting the stop the effective action of the toggle linkage may be regulated. The pivot 767 connecting the toggle links is also connected to a vertical link 768, the lower end of which is connected to one arm of a bell crank lever 769 on transverse shaft 770, the other arm being connected to a link 771 which is in turn connected to a bell crank 772 fulcrumed at 648 and provided with a cam roller engaging a cam groove in the side of a circular cam body on rear cam shaft 172. The cam groove is contoured so that the end pressing action will be performed at the proper time as sufficiently explained above.

In the description just above a single continuous movement of the forming plunger from the upper, that is from the end forming position, to the lower position, has been assumed. However, by suitably arranging the cam which impels the plunger, the downward movement of the plunger from the end folding position between the upper portions of plates 45, may be in two stages as follows: After the end structure formation, the plunger moves down to a point near the lowermost position, and at that time the box ends are squeezed by inward movement of the plates 60 and the sides of the box are still retained close to the plunger by the side plates 45. After the box is released by the end pressing plates 60 the plunger completes its downward stroke and in this way brings the sides of the box under the lower edges of the plates 45, which move inward sufficiently, or the box sides spring outwardly sufficiently, so that the upper edges of the box sides are engaged by the plates 45 as the plunger rises again, and in this way the side plates act as strippers to positively remove the box from the plunger.

When the end pressing plates 60 are retracted the box is completed, except that marginal portions of the cover extend above the shell limits at the ends of the box, these marginal portions comprising the cover end wing margins $h$, sometimes with portions folded over as in the structure shown in Fig. 26, and sometimes with upstanding tabs or blanks $h'$, Fig. 20. However the upstanding margins may be composed, the box is now moved along rails or strips 50 and then over the alined rails 58, to the second forming station E, and desirably in this movement the cover margins are turned horizontally inward. Any suitable mechanism may be provided for forwarding the boxes from one forming station to another. In the present embodiment combined mechanical and pneumatic mechanism is provided for this purpose as follows (Figures 3, 5 and 10).

A feed bar 62 is mounted to reciprocate in guides 780 located below and centrally in relation to rails 50, 58 and 75. This feed bar is provided with a rack 66 engaged by a segment gear 67 mounted on a shaft 781; and also fixed on the shaft is a pinion 782 engaged by another segment gear 783 carried by an arm 784 mounted to oscillate at 785; and this arm is operatively connected to another arm 786 which is connected by a link 787 to a lever 788 fulcrumed on shaft 602 and provided with a cam roller 790 engaging a cam groove in one side of a cam body on rear cam shaft 172. At intervals equal to the forming station interval the rack bar is provided with pairs of suction grippers 61, the grippers of each pair being in line in the transverse direction of the machine. Each gripper comprises (Figs. 46 to 48) a flanged head 795 formed on the upper end of a hollow stem 796. The suction grippers proper may consist of cupped rubber washers 797, and these are secured to the flanged heads 795 by inner flanged fittings 798 provided with perforations 799. These perforations communicate with the interior of the stem. The stems of each pair of grippers are mounted to reciprocate in close fitting apertures formed in the upper wall 800 and a central horizontal wall 801 of a housing or air head 802 secured to the feed bar. An air chamber 803 is provided in the air head above the partition 801, this chamber extending entirely across the head. Below the partition a cylinder 804 is formed in each end of the head. In each cylinder is a piston 805 secured to the lower end of one of the stems 796 by a screw 806. A spring 807 within the cylinder acting against the piston urges the suction head downward. The cylinder communicates by means of a passage 808 with a vertical air passage 809 formed in the air head and registered with an air passage 810 in the feed bar, this in turn communicating with a longitudinal air passage 811 in the bar and a flexible pipe connection 812 leads from this air passage to one of the air control valves previously mentioned. Whenever suction is applied to the main air passage in the feed bar, air is exhausted from the cylinders and the pistons are raised, bringing the suction heads up into active position, ready for engagement with a box bottom, whenever a box is in proper position above the grippers. Suction is maintained while the feed bar is moving rearward, to grip the box and transfer it to the next station. Suction is then cut off, the grippers drop and the feed bar returns ready for another action. The mechanism as so far described is sufficient for the purpose, except that in the absence of a box, outside air will rush into the gripper holes 799 in such volume that in some cases the operation of other pneumatic devices would be interfered with. While this can be overcome by providing a separate exhaust system for the feed bar, this complication is desirably avoided by providing means to shut off connection between the suction grippers and the feed bar air passage whenever there is a failure to position a box above the grippers at the proper moment. Centrally arranged in the air head is a chamber 815 forming a part of chamber 803. A hole 816 is drilled laterally through the casing intersecting chamber 815 and one end of this is closed by a recessed screw plug 817 and in the other end is inserted a guide sleeve 818. A hole 819 bored in the guide sleeve affords communication between chamber 815 and the main air passage through the apertures 809 and 810, previously mentioned. A valve stem 820 is mounted to move endwise in the guide sleeves and this carries a circular flange 821 constituting a valve member located in chamber 815 and it also carries another flange 822 located in another chamber 823 communicating with chamber 815 by means of clearance about the stem at 824. A spring 825 located in the hollowed portion of the screw plug bears against the adjacent end of the stem. Chamber 823 communicates with the main air passage 811 through holes 826 and 827. Whenever suction is applied to the main air passage, if a box is passing above the suction heads, the springs 825, in connection with external air pressure acting through holes 799 and the hollow stems 796, acts without perceptible delay to move the valve stem 820 to the right, as shown in Fig. 48, so that flange 821 engages the inner end of guide sleeve 818 and closes the air passage at that point and flange 822 at the same time shuts off communication between the chamber 823 and chamber 815. The entry of external air is thus prevented and no demand is made upon the capacity of the air exhaust devices and there is no interference with other parts of the pneumatic system. As soon as a box is placed above the suction heads and external air is shut off, the pressure conditions previously established are unbalanced and suction in chamber 823 is sufficient to draw the stem to the left, that is to the position shown in Fig. 47, and communication is reestablished between the main air passage and the suction head and the box is firmly gripped by the suction heads and advanced as previously described and then released when suction is cut off.

As the box moves from station D to station E it passes between convergently movable end plates 63. These are provided with margin folding members consisting of blocks or strips 64 and 65 secured to inner faces of the plates. Margin turning strips 64 and 65 are adjustable vertically for boxes of different heights, by means of bolts 830 passing through vertical slots 831 in plates 63. The lower edges of these strips are slightly above and overlap the box shell end wings and at the forward ends of these strips they are provided with rounded and beveled surfaces 835 to initially engage and turn inward horizontally the projecting cover margins, and then the straight under surfaces of the strips retain these margins in position until the box arrives at station E.

At station E the box is positioned under the second forming plunger 68, which is carried by a vertical bar 69 and this is arranged and operated substantially in the same way as the first plunger 46. The second plunger may be expansible or it may be of non-expansible construction. It is desirably provided with central, side recesses 840 to accommodate stripper fingers 841, which overlie upper side edges of the box and are secured to the end pressing plates 63. Pressing plates 63 are supported in substantially the same way as plates 60, previously described, and may be operated by a similar toggle linkage, including a link 845, arms 846 on a shaft 847, link 848, bell-crank lever 849 fulcrumed at 679, and a cam roller engaging a cam groove in one side of a cam body on rear cam shaft 172.

When forming plunger 68 moves down into the box, it carries with it the horizontally extending cover margins, and these are turned down against inner surfaces of the box-end structure. The end pressing plates 63 are then moved in by their toggle linkage, and upper end portions of the box are pressed against the ends of the plunger, pressing the box parts firmly together and insuring proper adhesive connection. The end plates are then retracted, and the plunger is withdrawn, the stripper fingers 841 engaging the upper side edges of the box and preventing it from moving upward with the plunger. The box is now substantially completed for many purposes, and may in some cases be discharged from the machine at this point.

When it is desired to further shape the box, or to perform other operations upon it, it is forwarded by the feed mechanism along rails 75 to the next "forming" station F, where, in the present embodiment mechanism is located for inbending the box sides to remove outward bulge. This mechanism includes a vertical shaft 72, arranged to rotate and also to move vertically in sleeve bearings 855 located in arms 856 of a frame member 857. Shaft 72 is of angular cross section, and rotary motion is imparted to it by means of a gear 860 on the lower one of sleeve bearings 855, this gear being operated by suitable connections including bevel pinions 861, arm 862, and link 863, which is provided with a cam yoke 864 embracing upper cam shaft 151, and also having a cam roller 865 engaging cam body 586 on the shaft. The angular shaft 72 is moved vertically by a sleeve 870 positioned between collars 871 and having a lug 872 connected by a link 873 to a bell crank 874 fulcrumed on a transverse shaft 875, and this is in turn connected by a link 876 to another bell-crank 877 fulcrumed on shaft 878, the last-named crank being connected by a link 879 to a sleeve 880, rotatably engaging vertical bar 69 of forming plunger 68, so that in the present arrangement the forming plunger and the box shaping mechanism carried by vertical shaft 72 are operated simultaneously, by interconnected linkage. The entire linkage system just described is operated by means of an arm 880ª on the right-hand end of shaft 878, connected by a link 881 to a lever in horizontal alinement with lever 601, previously described (see Fig. 3) and fulcrumed at 602 and provided with a cam roller 883 engaging a cam groove in a cam body on rear cam shaft 172.

Secured on the lower end of shaft 72 is a head 890 supporting oppositely extending squared rods 891 on each of which is slidably mounted a sleeve 892 secured to a plate 893; and to the under side of the plate is secured box-side pressing block 70, which is adjustable by means of screws 894 passing through plate-slots 895. The plates are moved by links 896 connected to sleeves 892, and also connected to levers 897 fulcrumed at 898 on the head 890; and the upper ends of the levers are provided with rollers 899 arranged to be spread by a pointed cam 900. This cam is secured on the lower end of a bar 901 slidably mounted in a recess provided for it in one side of angular shaft 72. At its upper end this bar has an off-set to bring it in line with the vertical shaft axis, and this portion of the bar is provided with collars 889 forming an annular shifting groove, in which is located a shifting fork 904 carried by a short shaft 905 mounted to oscillate in a bearing on a frame arm 907. Shaft 905 has another arm 909, connected by a long vertical link 910 with a lever 911, fulcrumed at 789 and provided with a cam roller engaging a cam groove in a cam body on rear cam shaft 172. The various cams and other operating mechanisms are so arranged that as the pressing mechanism descends, the pressing blocks are substantially parallel to the box sides, and the blocks are in their extended, or outward positions. The blocks have angular, or beveled, box engaging faces 915, and the ends of these faces are also curved or rounded outward, as at 916. When the blocks come into position opposite the box side walls, they are moved inward by the cam 900 and linkage, and press the box sides inward, to form approximately as shown in Fig. 49, the upper and central portions of the walls being inbent more than the lower and end portions. This bending "takes out" or counteracts the outward bulge which is often imparted to the box sides in preceding operations.

To prevent bulging the end walls in the described pressing operation, the head 890 is also desirably provided with two other oppositely extending rods 920, these being located at a right-angle to rods 891. On rods 920 are adjustably located box-end retaining plates 922. These plates are connected to sleeves 923 having squared holes fitting rods 920, and the sleeves are secured in adjusted position by set screws 924. It is desirable also in some cases to provide means, in association with the other devices at this station, for additionally pressing the box end structure, to insure adhesion of the parts in the positions in which they were previously placed. For this purpose plates 930 are slidably mounted on rods 920 by means of sleeves 931, and to these plates are adjustably secured other plates 932, having horizontal portions 933 and depending flanges 934, and end pressing blocks 73 are secured in the angle formed by plate portions 933 and 934. The pressing blocks are moved outward, in opposition to end plates 71 by a toggle linkage 940, best shown in the pressing mechanism at station G, the pivot connection of the toggle links being connected to an eye formed in the lower end 941 of the vertically reciprocating bar 901, this lower end being bent to bring it in line with the rotative axis of angular shaft 72. Thus when bar 901 moves down to operate the side pressing blocks, the toggle linkage at the same time spreads the inner end pressing blocks, which press the box ends against the outer end plates 71. At the end of the pressing operation, and while the box is still held by the pressing members, the pressing head is rotated one-quarter turn by the previously described gearing and linkage, so that the box is then in position with its longer axis in line with the longitudinal axis of the machine. When the box is so repositioned at this point, the rearward portions of rails 75 may be bent or inwardly extended to provide a proper support for the box in its further movements. The pressing devices are now released from the box and the entire pressing structure moves upward, clear from the box; and the box is moved on to the next station G, by the feed devices.

When desired, the turning of the box at station F may be omitted, by simply disconnecting a part of the rotating mechanism, such as link 863, or one of the engaging gears; and if necessary, the vertical shaft may be secured against rotation in any convenient way, for instance by locking gear 860.

Various mechanisms for operating upon the box may be located at station G. In the present instance, pressing and turning mechanism substantially similar to that already described in relation to station F is provided at station G. Similar parts of this mechanism are similarly numbered, and detailed description is unnecessary, except with regard to certain operating connections. (See Figures 3 and 5.) Arm 945 which reciprocates bar 901 at station G is moved by a link 946 connected to a short arm 947 on shaft 905, which also operates similar bar 901 at station F. Sleeve 870 for moving shaft 72 vertically is connected to a bell crank 950, and this is connected by a link 951 to an arm 952 on shaft 875 of the linkage which also operates the similar sleeve of mechanism at station F. Turning mechanism at station G is not shown in the drawings, but may be easily supplied, when necessary or desirable.

The box is additionally pressed at the last station, in substantially the same manner as described with reference to station F, and it may then be discharged along rails by further actions of the feed bar and suction grippers. Evidently other box manipulating stations may be arranged, in line with the stations described, to perform various other operations upon the boxes, such as inserting paper " lace " in box bodies (bottom section) as set forth in the pending application above identified. But the described mechanisms sufficiently exemplify a plurality of box forming or manipulating mechanisms, located at a series of stations, and arranged to operate in orderly relation, to automatically form or make boxes in the general manner described.

Variations in the set-up or arrangement of the machine for making boxes of various styles will be sufficiently understood from the foregoing explanation. Evidently when boxes of simplified form are to be made, in which some of the structural features provided for herein are omitted, corresponding parts of the mechanism may be omitted, or rendered inoperative by simple means, such as disconnecting operative parts, or in other ways, and no attempt will be made to describe in detail such variations, which are practically unlimited in number.

What I claim is:—

1. A box making machine comprising means for associating and adhesively connecting individual body and cover blanks in substantially flat form to produce a substantially flat assembly, and means for subsequently bending and folding the associated blanks into covered box form.

2. A machine for making covered boxes comprising means for bringing together a sheet of shell material and a sheet of cover material in substantially flat assembly contact, means for folding the assembly into box form, and means acting during the folding operations to insert parts of the assembly end structure between other parts of the end structure.

3. A machine for making covered boxes comprising means for bringing together a sheet of shell material and a sheet of cover material in substantially flat assembly contact, means for securing the sheets together, means for folding the assembly into box form, and means acting during the folding operations to insert parts of the assembly end structure between other parts of the end structure.

4. A machine for making covered paper boxes, comprising means for associating a piece of shell material and a piece of cover material in substantially flat assembly contact, means for turning over marginal portions of the cover upon margins of the shell, and means for subsequently shaping the assembly into box form.

5. A machine for making covered paper boxes, comprising means for associating a piece of shell material and a piece of cover material in substantially flat assembly contact, means for turning over and securing marginal portions of the cover to margins of the shell, and means for subsequently shaping the assembly into box form.

6. A machine for making covered boxes comprising means for associating a piece of shell material and a piece of cover material in substantially flat and accurately registered assembly contact, and means for folding up side and end portions of the assembly to produce a complete externally covered box.

7. A machine for making covered boxes comprising means for associating a piece of shell material and a piece of cover material in substantially flat, accurately registered assembly contact, means for advancing the assembly, means for folding up side portions of the assembly to position the covered box sides, and means for folding up end portions of the assembly to produce covered box ends.

8. A machine for making covered boxes comprising means for bringing a shell blank and a cover blank into substantially flat assembly contact, means for securing the blanks in assembly contact, means for subsequently folding up side portions of the assembly to produce covered box sides, and means for folding and pressing the assembly end structure by stage operations to produce multiply covered end walls.

9. A machine for making covered boxes comprising means for moving a shell blank and a cover blank into substantially flat assembly contact, means for securing the blanks in assembly contact, means for forwarding the assembly, means for turning up assembly side wings, means for turning in assembly corner laps, and means for turning up assembly end portions including portions of the cover blank exterior to the corner wings.

10. A machine for making covered boxes comprising means for assembling a shell blank and a cover blank, means for turning up assembly side wings, means for turning in assembly corner laps, means for turning up assembly end portions including portions of the cover blank exterior to the corner laps, and means for pressing in position the end structure so produced.

11. A machine for making covered boxes comprising means for moving a shell blank and a cover blank into substantially flat assembly contact, means for securing the blanks in assembly contact, means for forwarding the assembly, means for turning up assembly side wings, means for turning in assembly corner laps, means for turning up assembly end portions including portions of the cover blank exterior to the corner wings, and means for pressing in position the end structure so produced.

12. A machine for making covered paper boxes comprising means for associating a shell blank and a cover blank in substantially flat assembly contact, means for folding side and end portions of the assembly into approximate box form with marginal portions of the cover material protruding upward at the ends, and means for turning in and securing the cover margins against the inner box end structure.

13. A machine for making covered paper boxes comprising means for associating a shell blank and a cover blank in substantially flat assembly contact, means for securing the blanks in assembly contact, means for folding side and end portions of the assembly into approximate box form with marginal portions of the cover material protruding upward at the ends, and means for turning in and securing the end margins against the inner end box structure.

14. A machine for making covered paper boxes comprising means for associating a shell blank and a cover blank in substantially flat assembly contact, means for securing the blanks in assembly contact, means for forwarding the assembly, means for folding side and end portions of the assembly into approximate box form with marginal portions of the cover material protruding upward at the ends, and means for turning in and securing the end margins against the inner end box structure.

15. A machine for making covered paper boxes comprising means for associating a shell blank and a cover blank in substantially flat assembly contact, means for folding up side portions of the assembly, and means for folding up assembly end portions with certain parts inserted between other parts of the end structure.

16. A machine for making covered paper boxes comprising means for associating a shell blank and a cover blank in substantially flat assembly contact, means for folding up side portions of the assembly, means for folding up assembly end portions with certain parts inserted between other parts of the end structure, and with end margins of the cover extending above the shell limits, and means for turning in and securing the cover margins.

17. Box blank assembly mechanism comprising means for associating a piece of shell material and a piece of cover material in substantially flat assembly contact, with margins of the cover material extending beyond adjacent limits of the shell material, and means for folding over and securing the cover margins to the shell.

18. Box blank assembly mechanism comprising means for associating a piece of shell material and a piece of cover material in substantially flat assembly contact, with margins of the cover material extending beyond adjacent limits of the shell material, means for applying adhesive stripes to one of the blanks to secure the cover margins, and means for folding over and pressing the cover margins on the shell.

19. Box blank assembly mechanism comprising means for associating a piece of shell material and a piece of cover material in substantially flat assembly contact, with margins of the cover material extending beyond adjacent limits of the shell material, means for applying adhesive along outward shell margins corresponding to the cover margins, and means for folding over and securing the cover margins to the shell.

20. Box blank assembly mechanism comprising means for supplying box shell material, means for supplying covering material, means for applying a pattern of adhesive to one side of the shell material, means for applying adhesive to the other side of the shell material, and means for moving the two materials to assembly contact to form a box blank assembly.

21. Box blank assembly mechanism comprising a shell blank supply station, a cover blank supply station, means for selecting single shell blanks, means for applying glue stripes to one face of the selected blank, means for applying glue to areas of the other side of the selected blank, means for selecting single cover blanks, and means for bringing a glued shell blank in assembly contact with a selected cover blank.

22. Box blank assembly mechanism comprising a shell blank supply station, a cover blank supply station, means for selecting single shell blanks, means for applying glue stripes to one face of the selected blank, means for applying glue to areas of the other side of the selected blank, means for selecting single cover blanks, means for bringing a glued shell blank in assembly contact with a selected cover blank with the glue striped surface of the shell blank outward, and means for turning over projecting cover margins to certain of the glue striped surfaces of the shell.

23. Box blank assembly mechanism comprising means for selecting a shell blank and a cover blank from supplies of the respective blanks and bringing them into flat contact throughout their opposed areas, means for supplying adhesive to one of the blanks, and means for turning over marginal portions of the cover and securing them to adjacent portions of the shell.

24. Box blank assembly mechanism comprising means for selecting a shell blank and a cover blank from supplies of the respective blanks and bringing them into close contact, means for supplying adhesive stripes to one of the blanks, and means for turning marginal portions of the cover over adjacent portions of the shell and pressing them in contact with certain of the adhesive stripes.

25. Box blank assembly mechanism comprising means for selecting a shell blank and a cover blank from supplies of the respective blanks and bringing them into flat contact throughout their opposed areas, means for supplying adhesive to one of the blanks prior to blank contact, and means for turning over marginal portions of the cover and securing them to adjacent portions of the shell.

26. Box blank assembly mechanism comprising means for selecting a shell blank and a cover blank from supplies of the respective blanks and bringing them into close contact, means for supplying adhesive stripes to one of the blanks prior to blank contact, and means for turning marginal portions of the cover over adjacent portions of the shell and pressing them in contact with certain of the adhesive stripes.

27. In box blank assembly mechanism, a shell blank supply station, a cover blank supply station, an adhesive applying station, means for selecting a cover blank and a shell blank from the respective stations, means for applying adhesive to one of the blanks at the adhesive station, and means for bringing the blanks together in substantially flat assembly contact.

28. In box blank assembly mechanism, a shell blank supply station, a cover blank supply station, an intermediate adhesive applying station, means for selecting a cover blank and a shell blank from the respective stations, means for applying adhesive to one of the blanks at the adhesive station, and means for bringing the blanks together in substantially flat assembly contact.

29. In box blank assembly mechanism, a shell blank supply station, a cover blank supply station, an adhesive applying station, means for selecting a cover blank and a shell blank from the respective stations, means for applying adhesive to one of the blanks at the adhesive station, means for bringing the blanks together in substantially flat assembly contact, and means for turning extended margins of the cover blank over edges of the shell blank and affixing the margins to the shell.

30. In box blank assembly mechanism, a shell blank supply station, a cover blank supply station, an intermediate adhesive applying station, means for selecting a cover blank and a shell blank from the respective stations, means for applying adhesive to one of the blanks at the adhesive station, means for bringing the blanks together in substantially flat assembly contact, and means for turning extended margins of the cover blank over edges of the shell blank and affixing the margins to the shell.

31. In box blank assembly mechanism, a shell blank supply station, a cover blank supply station, an adhesive applying station, means for selecting a cover blank and a shell blank from the respective stations, means for applying adhesive to one of the blanks at the adhesive station, means for bringing the blanks together in substantially flat assembly contact, and means adjacent to the point of blank contact for turning extended margins of the cover blank over edges of the shell blank and affixing the margins to the shell.

32. In box blank assembly mechanism, a shell blank supply station, a cover blank supply station, an intermediate adhesive applying station, means for selecting a cover blank and a shell blank from the respective stations, means for applying adhesive to one of the blanks at the adhesive station, means for bringing the blanks together in substantially flat assembly contact and means adjacent to the point of blank contact for turning extended margins of the cover blank over edges of the shell blank and affixing the margins to the shell.

33. In box blank assembly mechanism, a shell blank station, a cover blank station, means for selecting a shell blank from its station, means for selecting a cover blank from its station, means for bringing the blanks together in approximately flat assembly contact, and means for applying adhesive to one of the blanks.

34. In box blank assembly mechanism, a shell blank station, a cover blank station, means for selecting a shell blank from its station, means for selecting a cover blank from its station, means for bringing the blanks together in approximately flat assembly contact, means for applying adhesive to one of the blanks, and means for securing the blanks in assembled relation.

35. In box blank assembly mechanism, a shell blank supply station, a cover blank supply station, means for selecting a single shell blank, means for applying adhesive to the shell blank, means for selecting a single cover blank, and means for bringing the blanks into substantially flat assembly contact.

36. In box blank assembly mechanism, a shell blank supply station, a cover blank supply station, means for selecting a single shell blank, means for applying marginal adhesive stripes to the shell blank, means for selecting a single cover blank, and means for bringing the blanks into substantially flat assembly contact.

37. In box blank assembly mechanism, a shell blank supply station, a cover blank supply station, means for selecting a single shell blank, means for applying adhesive to the shell blank, means for selecting a single cover blank, means for bringing the blanks into substantially flat assembly contact, and means for overturning and securing marginal portions of the cover blank to the shell blank.

38. In box blank assembly mechanism, a shell blank supply station, a cover blank supply station, means for selecting a single shell blank, means for applying marginal adhesive stripes to the shell blank, means for selecting a single cover blank, means for bringing the blanks into substantially flat assembly contact, and means for overturning and securing marginal portions of the cover blank to adhesively striped portions of the shell blank.

39. In box blank assembly mechanism, a shell blank supply station, a cover blank supply station, a shell blank selector, a cover blank selector, means for bringing the selectors relatively together to associate the respective blanks in assembly contact, means for supplying adhesive to one of the blanks, and means for securing the blanks in assembly contact with portions of one blank engaging adhesively coated portions of the other.

40. In box blank assembly mechanism, a shell blank supply station, a cover blank supply station, a shell blank selector, a cover blank selector, means for bringing the selectors relatively together to associate the respective blanks in assembly contact, and means for supplying adhesive to one of the blanks prior to assembly contact.

41. In box blank assembly contact, a shell blank supply station, a cover blank supply station, a shell blank selector, a cover blank selector, means for bringing the selectors relatively together to associate the respective blanks in assembly contact, means for supplying adhesive to one of the blanks prior to assembly contact, and means for securing the blanks in assembly contact with portions of one blank engaging adhesively coated portions of the other.

42. In box blank assembly mechanism, a shell blank station, a cover blank station, a blank transfer carriage, a selector head on the carriage for selecting individual blanks from one station, another selector head for selecting individual blanks from the other station, means for moving the carriage to bring the selector heads together with their respective blanks in assembly contact, and means for applying adhesive to one of the blanks.

43. In box assembly mechanism, a shell blank station, a cover blank station, a blank transfer carriage, a selector head on the carriage for selecting individual blanks from one station, another selector head for selecting individual blanks from the other station, means for moving the carriage to bring the selector heads together with their respective blanks in assembly contact, and means for applying adhesive to the shell blank.

44. In box blank assembly mechanism, a shell blank station, a cover blank station, a blank transfer carriage, a selector head on the carriage for selecting individual blanks from one station, another selector head for selecting individual blanks from the other station, means for moving the carriage to bring the selector heads together with their respective blanks in assembly contact, and means for applying adhesive to both surfaces of the shell blank.

45. In box blank assembly mechanism, a shell blank station, a cover blank station, a blank transfer carriage, a selector head on the carriage for selecting individual blanks from one station, another selector head for selecting individual blanks from the other station, means for moving the carriage to bring the selector heads together with their respective blanks in assembly contact, means for applying adhesive to one of the blanks prior to assembly contact, and means adjacent to the assembly position for turning over marginal portions of the cover blanks and securing them to adjacent faces of the shell blanks.

46. In box blank assembly mechanism, a shell blank station, a cover blank station, a blank transfer carriage, a selector head on the carriage for selecting individual blanks from one station, another selector head for selecting individual blanks from the other station, means for inverting the last named head, means for moving the carriage to bring the selector heads together with their respective blanks in assembly contact, and means for applying adhesive to one of the blanks prior to assembly contact.

47. In box blank assembly mechanism, a shell blank station, a cover blank station, a blank transfer carriage, a selector head on the carriage for selecting individual blanks from one station, another selector head for selecting individual blanks from the other station, means for inverting the last named head, means for moving the carriage to bring the selector heads together with their respective blanks in assembly contact, and means for applying adhesive to the shell blank prior to assembly contact.

48. In blank assembly mechanism, a shell blank station, a cover blank station, a blank transfer carriage, a selector head on the carriage for selecting individual blanks from one station, another selector head for selecting individual blanks from the other station, means for inverting the last named head, means for moving the carriage to bring the selector heads together with their respective blanks in assembly contact, and means for applying adhesive to both surfaces of the shell blank prior to assembly contact.

49. In box blank assembly mechanism, a shell blank station, a cover blank station, a blank transfer carriage, a selector head on the carriage for selecting individual blanks from one station, another selector head for selecting individual blanks from the other station, means for inverting the last named head, means for moving the carriage to bring the selector heads together with their respective blanks in assembly contact, means for applying adhesive to one of the blanks prior to assembly contact, and means adjacent to the assembly position for turning over marginal portions of the cover blanks and securing them to adjacent faces of the shell blanks.

50. In box blank assembly mechanism, a shell blank supply station, a blank transfer carriage, means for moving the carriage to and fro in two directions substantially at a right angle to each other, a shell blank selector head on the carriage, an ejector and blank support within the selector head, a cover blank selector head, and means for moving the latter to a point adjacent to the shell selector head at one of its positions to bring the respective blanks into assembly contact.

51. In box blank assembly mechanism, a shell blank supply station, a cover blank supply station, a blank transfer carriage, means for moving the carriage to and fro in two directions substantially at a right angle to each other, a shell blank selector head on the carriage, an ejector and blank support within the selector head, a cover blank selector head, means for moving the latter to a point adjacent to the shell selector head at one of its positions to bring the respective blanks into assembly contact, and means adjacent to the assembly position for securing the blanks in assembly contact.

52. In box blank assembly mechanism, a shell blank supply station, a cover blank supply station, a blank transfer carriage, means for moving the carriage to and fro in two directions substantially at a right angle to each other, a shell blank selector head on the carriage, an ejector and blank support within the selector head, a cover blank selector head, and means for inverting and moving the latter to a point adjacent to the shell selector head at one of its positions to bring the respective blanks into assembly contact.

53. In box blank assembly mechanism, a shell blank supply station, a cover blank supply station, a blank transfer carriage, means for moving the carriage to and fro in two directions substantially at a right angle to each other, a shell blank selector head on the carriage, an ejector and blank support within the selector head, a cover blank selector head, means for inverting and moving the latter to a point adjacent to the shell selector head at one of its positions to bring the respective blanks into assembly contact, and means adjacent to the assembly position for securing the blanks in assembly contact.

54. In box blank assembly mechanism, a shell blank station, a cover blank station, an adhesive station between the blank stations, two glue applying instrumentalities at the adhesive station, means for making the gluing instrumentalities operative and inoperative alternately, a shell blank selector, means for moving the selector to and fro in operative relation to the glue applying instrumentalities, a cover blank selector, and means for bringing the selectors together to make an assembly of the respective blanks.

55. In box blank assembly mechanism, a shell blank station, a cover blank station, an adhesive station between the blank stations, two glue applying instrumentalities at the adhesive station, means for making the gluing instrumentalities operative and inoperative alternately, a shell blank selector, means for moving the selector to and fro in operative relation to the glue applying instrumentalities, a cover blank selector, means for bringing the selectors together to make an assembly of the respective blanks, and means for securing the blanks in assembly contact.

56. In a box blank assembly mechanism, a shell blank station, a cover blank station, an intermediate glue station including a glue roll and another roll, a shell blank selector, means for moving the selector to and fro between the blank stations and past the glue station, means for rendering the glue roll operative during travel of the selector toward the shell blank station to apply adhesive to the selector, means for rendering the other roll operative during travel of the selector toward the cover blank station to engage a shell blank carried by the selector, and means for selecting a cover blank from the cover blank station and for bringing it in assembly contact with the shell blank.

57. In a box blank assembly, a shell blank station, a cover blank station, an intermediate glue station including two glue rolls, a shell blank selector, means for moving it to and fro between the blank stations and past the glue station, means for rendering one of the glue rolls operative during travel of the selector toward the shell blank station to apply adhesive to the selector, means for rendering the other glue roll operative during travel of the selector toward the cover blank station to engage a shell blank carried by the selector, a cover blank selector, and means for bringing the selected blanks together to form a box blank assembly.

58. In a box blank assembly mechanism, a shell blank station, a cover blank station, an intermediate glue station including a glue roll and another roll, a shell blank selector, means for moving the selector to and fro between the blank stations and past the glue station, means for rendering the glue roll operative during travel of the selector toward the shell blank station to apply adhesive to the selector, means for rendering the other roll operative during travel of the selector toward the cover blank station to engage a shell blank carried by the selector, a cover blank selector adjacent to the cover blank station, and means for moving the cover selector to bring a cover blank into assembly contact with a shell blank carried by the shell selector.

59. In a box blank assembly, a shell blank station, a cover blank station, an intermediate glue station including two glue rolls, a shell blank selector, means for moving it to and fro between the blank stations and past the glue station, means for rendering one of the glue rolls operative during travel of the selector toward the shell blank station to apply adhesive to the selector, means for rendering the other glue roll operative during travel of the selector toward the cover blank station to engage a shell blank carried by the selector, a cover blank selector adjacent to the cover blank station, and means for moving the cover selector to bring a cover blank into assembly contact with a shell blank carried by the shell selector.

60. In a box blank assembly mechanism, a shell blank station, a cover blank station, an intermediate glue station including a glue roll and another roll, a shell blank selector, means for moving the selector to and fro between the blank stations and past the glue station, means for rendering the glue roll operative during travel of the selector toward the shell blank station to apply adhesive to the selector, means for rendering the other roll operative during travel of the selector toward the cover blank station to engage a shell blank carried by the selector, a cover blank selector adjacent to the cover blank station, means for moving the cover selector to bring a cover blank into assembly contact with a shell blank carried by the shell selector, and means acting after assembly contact to turn over and fix the margins of the cover to adjacent adhesively coated margins of the shell.

61. In a box blank assembly, a shell blank station, a cover blank station, an intermediate glue station including two glue rolls, a shell blank selector, means for moving it to and fro between the blank stations and past the glue station, means for rendering one of the glue rolls operative during travel of the selector toward the shell blank station to apply adhesive to the selector, means for rendering the other glue roll operative during travel of the selector toward the cover blank station to engage a shell blank carried by the selector, a cover blank selector adjacent to the cover blank station, means for moving the cover selector to bring a cover blank into assembly contact with a shell blank carried by the shell selector, and means acting after assembly contact to turn over and fix the margins of the cover to adjacent adhesively coated margins of the shell.

62. Box blank assembly mechanism comprising a shell blank station, a cover blank station, a glue roll and a pressing roll between the stations, means for rendering the rolls operative alternately, a blank assembly carriage, means for moving the carriage to and fro, a shell blank head on the carriage, having stencil surfaces adapted to receive glue from the glue roll in one direction of carriage movement, the pressing roll being adapted to press a selected blank in the other direction of carriage movement, and means for selecting a cover blank and bringing it in substantially flat assembly contact with a shell blank carried by the shell blank selector.

63. Box blank assembly mechanism comprising a shell blank station, a cover blank station, a glue roll and a pressing roll between the stations, means for rendering the rolls operative alternately, a blank assembly carriage, means for moving the carriage to and fro, a shell blank stencil head on the carriage, having stencil surfaces adapted to receive glue from the glue roll in one direction of carriage movement, the pressing roll being adapted to press a selected blank in the other direction of carriage movement, a cover blank selector, and means for moving the latter to and fro to select a blank and bring it in substantially flat assembly contact with a shell blank carried by the shell blank selector.

64. Box blank assembly mechanism comprising a shell blank station, a cover blank station, a glue roll and a pressing roll between the stations, means for rendering the rolls operative alternately, a blank assembly carriage, means for moving the carriage to and fro, a shell blank stencil head on the carriage, having stencil surfaces adapted to receive glue from the glue roll in one direction of carriage movement, the pressing roll being adapted to press a selected blank in the other direction of carriage movement, means for selecting a cover blank and bringing it in substantially flat assembly contact with a shell blank carried by the shell blank selector, and means for securing the blanks in assembly contact.

65. Box blank assembly mechanism comprising a shell blank station, a cover blank station, a glue roll and a pressing roll between the stations, means for rendering the rolls operative alternately, a blank assembly carriage, means for moving the carriage to and fro, a shell blank stencil head on the carriage, having stencil surfaces adapted to receive glue from the glue roll in one direction of carriage movement, the pressing roll being adapted to press a selected blank in the other direction of carriage movement, a cover blank selector, means for moving the latter to and fro to select a blank and bring it in substantially flat assembly contact with a shell blank carried by the shell blank selector, and means for securing the blanks in assembly contact.

66. Box blank assembly mechanism comprising a shell blank station, a cover blank station, a glue applying instrumentality and a pressing instrumentality between said stations, a blank transfer carriage, a shell blank selector thereon, a cover blank selector, and means for moving the two selectors convergently to bring respective blanks in assembly contact.

67. Box blank assembly mechanism comprising a shell blank station, a cover blank station, a glue applying instrumentality and a pressing instrumentality between said stations, a blank transfer carriage, a shell blank selector thereon, a cover blank selector, means for inverting the last named selector, and means for moving the two selectors convergently to bring respective blanks in assembly contact.

68. In box blank assembly mechanism, a blank transfer carriage, a blank selector thereon, means for supplying single blanks to the selector at one carriage position, another blank selector, means for supplying single blanks to the second selector, means for bringing the two selected blanks in assembly contact, and assembly transfer means on the carriage for carrying the assembly away from assembly position.

69. In box blank assembly mechanism, a blank transfer carriage, a blank selector thereon, means for supplying single blanks to the selector at one carriage position, another blank selector, means for supplying single blanks to the second selector, means for bringing the two selected blanks in assembly contact, means for securing the blanks in assembly, and assembly transfer means on the carriage for carrying the assembly away from assembly position.

70. In box making mechanism, means for producing a flat covered blank assembly having side wings, corner laps and end wings with extended cover margins, and means for shaping the assembly into box form with the side wings upturned, the corner laps inturned and the end wings upturned, and with the cover margins inturned and affixed to inner margins of the box end structure.

71. In box making mechanism, means for producing a substantially flat assembly consisting of shell material and contacting cover material, means for forwarding the assembly, means for folding up the covered side portions of the assembly to form box sides, means for folding up end portions of the assembly with certain of them inserted between other end portions, and means for folding projecting cover end margins down and in against inner faces of the box-ends.

72. In box making mechanism, means for producing an assembly consisting of shell material and contacting cover material, means for folding up covered side portions of the assembly to form box sides, means for folding up end portions of the assembly with certain of them inserted between other end portions to produce the box ends, and means for pressing the end structure to secure it in position.

73. In box making mechanism, means for producing a substantially flat assembly consisting of shell material and contacting cover material, means for forwarding the assembly, means for folding up the covered side portions of the assembly to form box sides, means for folding up end portions of the assembly with certain of them inserted between other end portions, means for folding projecting cover end margins down and in against inner faces of the box-ends, and means for pressing the end structure to secure it in position.

74. In a box machine, means for producing a substantially flat assembly consisting of a shell blank and a cover blank in flatwise contact and having side wings, corner laps, and end wings with projecting cover margins and with marginal portions of the cover turned over and secured to outer margins of the shell side wings, means for forwarding the assembly, means for turning up the side wings, and means for turning in the corner laps and turning up end wing portions of the associated blanks.

75. In a box machine, means for producing a substantially flat assembly consisting of a shell blank and a cover blank in flatwise contact and having side wings, corner laps, and end wings with projecting cover margins and with marginal portions of the cover turned over and secured to outer margins of the shell side wings, means for forwarding the assembly, means for turning up the side wings, means for turning in the corner laps and turning up end wing portions of the associated blanks, and means for turning in and adhesively securing projecting margins of the cover to inner margins of the box end structure.

76. In a box machine, means for producing a substantially flat assembly consisting of a shell blank and a cover blank in flatwise contact and having side wings, corner laps, and end wings with projecting cover margins and with marginal portions of the cover turned over and secured to outer margins of the shell side wings, means for forwarding the assembly, means for turning up the side wings, means for turning in the corner laps and turning up end wing portions of the associated blanks, and means for pressing the end structure in position.

77. In a box machine, means for producing a substantially flat assembly consisting of a shell blank and a cover blank in flatwise contact and having side wings, corner laps, and end wings with projecting cover margins and with marginal portions of the cover turned over and secured to outer margins of the shell side wings, means for forwarding the assembly, means for turning up the side wings, means for turning in the corner laps and turning up end wing portions of the associated blanks, means for turning in and adhesively securing projecting margins of the cover to inner margins of the box end structure, and means for pressing the end structure in position.

78. A box machine comprising means for producing a substantially flat assembly including a shell blank and a cover blank and having side wings, corner laps and end wings, means for folding up the side wings, and means for turning in the corner laps and concurrently turning up end wing portions to form the box end structures.

79. A box machine comprising means for producing a substantially flat assembly including a shell blank and a cover blank and having side wings, corner laps and end wings having projecting cover end margins, means for folding up the side wings, means for turning in the corner laps and concurrently turning up end wing portions to form end structures with upwardly projecting cover margins, means for turning in the cover margins and means for pressing them against inner marginal portions of the end structure.

80. A box machine comprising means for producing a substantially flat assembly including a shell blank and a cover blank and having side wings, corner laps and end wings having projecting cover margins, a forming plunger, side wing folding members, means for placing the assembly under the plunger and above the side wing folders, means for moving the plunger down to carry the assembly between the side wing folders, means for turning end portions of the assembly up against the plunger ends, means for advancing the partly formed box, means for turning in upwardly projecting cover margins, means for turning down the cover margins, and means for pressing them against inner margins of the box-end structure.

81. A box machine comprising means for producing a substantially flat assembly including a shell blank and a cover blank and having side wings, corner laps and end wings having projecting cover end margins, a forming plunger, side wing folding and clamping members, means for placing the assembly under the plunger and above the side wing folders, means for moving the plunger down to carry the assembly between the side wing folders, means for expanding the plunger, means for moving the folding members to the assembly sides against the plunger, means for turning end portions of the assembly up against the plunger ends, means for compressing the end structure against the plunger, means for advancing the partly formed box, means for turning in upwardly projecting cover margins, means for turning down the cover margins, and means for pressing them against inner margins of the end structure.

82. A box machine comprising means for forming an assembly consisting of a shell blank and a cover blank, means for shaping the covered assembly into box form, and means for bending opposite vertical walls of the box to remove outward bulge.

83. A box machine comprising means for forming an assembly consisting of a shell blank and a cover blank, means for shaping the covered assembly into box form, means for bending opposite vertical walls of the box to remove outward bulge, and means for partly rotating the box.

84. A box machine comprising means for forming an assembly consisting of a shell blank and a cover blank, means for shaping the covered assembly into box form, and associated means for inbending opposite side walls of the box and for pressing other opposite side walls.

85. A box machine comprising means for forming an assembly consisting of a shell blank and a cover blank, means for shaping the covered assembly into box form, associated means for inbending opposite side walls of the box and for pressing other opposite side walls, and means for partly rotating the box to reposition it for subsequent operations.

86. In a box machine, means for turning up side wing portions of an assembly consisting of a shell blank and a cover blank, means for turning up shell end wings of the assembly, means for turning in assembly corner laps, and means for turning up cover end wing portions against the inturned corner laps.

87. In a box machine, a box forming station and located thereat means for turning up side wing portions of an assembly consisting of a shell blank and a cover blank, means for turning up shell end wings of the assembly, means for turning in assembly corner laps, and means for turning up cover end wing portions against the inturned corner laps.

88. In a box machine, means for turning up side wing portions of an assembly consisting of a shell blank and a cover blank, means for turning up shell end wings of the assembly, means for turning in assembly corner laps, means for turning up cover end wing portions against the inturned corner laps, and means for turning in and securing upwardly projecting margins of the cover against inner surfaces of the box end structure.

89. In a box machine, a box forming station and located thereat means for turning up side wing portions of an assembly consisting of a shell blank and a cover blank, means for turning up shell end wings of the assembly, means for turning in assembly corner laps, means for turning up cover end wing portions against the inturned corner laps, a second forming station and means thereat for turning in and securing upwardly projecting margins of the cover against inner surfaces of the box end structure.

90. In a box machine, means for turning up side wing portion of an assembly consisting of a shell blank and a cover blank, means for turning up shell end wings of the assembly, means for turning in assembly corner laps, means for turning up cover end wing portions against the inturned corner laps, means for turning in and securing upwardly projecting margins of the cover against inner surfaces of the box end structure, and means for pressing the box ends to retain the parts in position.

91. In a box machine, a box forming station and located thereat means for turning up side wing portions of an assembly consisting of a shell blank and a cover blank, means for turning up shell end wings of the assembly, means for turning in assembly corner laps, means for turning up cover end wing portions against the inturned corner laps, a second forming station, means thereat for turning in and securing upwardly projecting margins of the cover against inner surfaces of the box end structure, and means for pressing the box ends to retain the parts in position.

92. In a box machine, means for producing an assembly consisting of a shell blank and a cover blank adhesively secured thereto with end wing margins of the shell provided with adhesive stripes and the cover end wings having adjacent projecting margins, means for shaping the assembly into approximate box form with the cover end wing margins projecting upward, and means for turning the cover margins in and securing them against the shell wing adhesive stripes.

93. In a box machine, means for producing an assembly consisting of a shell blank and a cover blank adhesively secured thereto with end wing margins of the shell provided with adhesive stripes and the cover end wings having projecting margins at sides and ends of the shell end wings, means for shaping the assembly into approximate box form with the cover wing side margins folded over the shell end wings and with the end margins projecting upward and means for turning the cover end margins in and securing them against the shell end wing adhesive stripes.

94. Box forming mechanism for operating upon composite blank assemblies, comprising an expansible forming plunger, means for expanding the plunger, box-side bending and pressing members associated with the plunger, and box-end forming mechanism adjacent to the plunger.

95. Box forming mechanism for operating upon composite blank assemblies comprising an expansible forming plunger, means for expanding the plunger, box-side bending and pressing members associated with the plunger, box-end forming mechanism adjacent to the plunger, and box-end pressing means cooperating with the plunger at a point removed from the first active plunger position.

96. Box forming mechanism for operating upon composite blank assemblies comprising an expansible forming plunger, means for expanding the plunger, box-side bending and pressing members associated with the plunger, box-end forming mechanism adjacent to the plunger, and means for inturning projecting cover margins of the partly formed assembly.

97. Box forming mechanism for operating upon composite blank assemblies comprising an expansible forming plunger, means for expanding the plunger, box-side bending and pressing members associated with the plunger, box-end forming mechanism adjacent to the plunger, means for inturning projecting cover margins of the partly formed assembly, a second forming plunger, means for positioning the partly formed box below it, and means for moving the plunger into the box to fold the cover margins down against inner surfaces of the box structure.

98. Box forming mechanism for operating upon composite blank assemblies comprising a first forming station, mechanism at that station for shaping the blank assembly into approximate box form, means for moving the box away from that station, means for turning projecting cover margins during the box movement, a second forming station, and means at the second station for turning the cover margins down against under faces of the box ends.

99. Box forming mechanism for operating upon composite blank assemblies, comprising a forming plunger, means for moving the plunger, box-side bending members associated with the plunger, box-end forming mechanism adjacent to the plunger, means for inturning projecting cover margins of the partly formed assembly, a second forming plunger, means for positioning the partly formed box below it, and means for moving the second plunger into the box to fold the cover margins down against inner surfaces of the box structure.

100. Box forming mechanism for operating upon composite blank assemblies, comprising a forming station, mechanism at that station for shaping the blank assembly into approximate box form, means for moving the box away from that station, and means for turning projecting cover margins during the box travel.

101. Box forming mechanism for operating upon composite blank-assemblies, comprising two box forming stations, means at the first station for folding up side and end portions of the blank assembly, means for advancing the box to the second station, means at the second station for pressing the box end structure, and means acting during movement of the box from the first to the second forming station to inwardly bend projecting assembly cover margins.

102. Box forming mechanism for operating upon composite blank assemblies, comprising two box forming stations, means at the first station for folding up side and end portions of the blank assembly, means for pressing the box-ends, means for advancing the box to the second station, means at the second station for pressing the box end structure, and means acting during movement of the box from the first to the second forming station to inwardly bend projecting assembly cover margins.

103. Box forming mechanism comprising a plurality of forming stations arranged in series, means at certain of the stations for folding a covered box shell assembly into approximate box form, and means at a subsequent station for inbending opposite sides of the box.

104. Box forming mechanism comprising a plurality of forming stations arranged in series, means at certain of the stations for folding a covered box shell assembly into approximate box form, means at a subsequent station for completing the box formation, and means at another subsequent station for inbending opposite sides of the box.

105. Box forming mechanism comprising a plurality of forming stations arranged in series, means at certain of the stations for folding a covered box shell assembly in approximate box form, and means at a subsequent station for pressing opposite multiply box walls.

106. Box forming mechanism comprising a plurality of forming stations arranged in series, means at certain of the stations for folding a covered box shell assembly into approximate box form, means at a subsequent station for completing the box formation, and means at another subsequent station for pressing opposite multiply box walls.

107. Box forming mechanism comprising a plurality of forming stations arranged in series, means at certain of the stations for folding a covered box shell assembly into approximate box form, and means at a subsequent station for inbending two opposite walls of the box, and for concurrently pressing other opposite walls.

108. Box forming mechanism comprising a plurality of forming stations arranged in series, means at certain of the stations for folding a covered box shell assembly into approximate box form, means at a subsequent station for completing the box formation, and means at another subsequent station for inbending two opposite walls of the box, and for concurrently pressing other opposite walls.

109. Box forming mechanism for operating upon composite blank assemblies, comprising a series of box forming stations, a conveyor for advancing boxes along the series of stations, certain of the earlier stations having means for shaping a box blank assembly into approximate box form, and means located at a subsequent station for repositioning a box in relation to the conveyor.

110. Box forming mechanism for operation upon composite blank-assemblies, comprising a series of box forming stations, a conveyor for advancing boxes along the series of stations, certain of the earlier stations having means for shaping a box blank assembly into approximate box form, and means located at a subsequent station for pressing and repositioning the box in relation to the conveyor.

111. In a box blank assembly machine, means for bringing a shell blank in contact with a cover blank having projecting margins, with adhesive applied to corresponding shell margins, and means for turning the cover margins over and securing them to the adhesive shell margins.

112. In a box blank assembly machine, means for bringing a shell blank in contact with a cover blank having projecting margins, means for applying adhesive to corresponding shell margins, means for supplying adhesive to contacting blank faces, and means for turning the cover margins over and securing them to the adhesive shell margins.

113. In a box blank assembly machine, means for bringing a shell blank in contact with a cover blank having projecting margins, with adhesive applied to corresponding shell margins, a pair of margin pressing devices, and means to operate them to secure the cover margins to the adhesive shell margins.

114. In a box blank assembly machine, means for bringing a shell blank in contact with a cover blank having projecting margins, means for applying adhesive to corresponding shell margins, a pair of pressing devices, and means for operating them to secure the cover margins to the adhesive shell margins.

115. In a box blank assembly machine, means for bringing a shell blank in contact with a cover blank having projecting margins, with adhesive applied to corresponding shell margins, a pair of fixed presser bars, a pair of cooperating movable presser bars and means for moving the movable bars to turn and press the cover margins upon the adhesive margins of the shell.

116. In a box blank assembly machine, means for bringing a shell blank in contact with a cover blank having projecting margins, with adhesive applied to corresponding shell margins, a pair of fixed presser bars located beneath side portions of the assembly, a pair of cooperating movable presser bars, compressible presser strips on the bars, and means for moving the movable bars to turn and press the cover margins upon the adhesive margins of the shell.

117. In box assembly mechanism, a cover blank selector, means for moving the selector into contact with a cover stack and for inverting the selector, means for selecting a shell blank from a stack and positioning it on the cover held by the inverted cover selector to produce a blank assembly, means for adhesively coating opposite margins of the shell, and means adjacent to the assembly contact position for turning projecting cover margins, and securing them to the adhesively coated shell margins.

118. In box assembly mechanism, a cover blank selector, means for moving the selector into contact with a cover stack and for removing the selector and inverting it, means for selecting a shell blank from a stack and positioning it on the cover held by the inverted cover selector to produce a blank assembly, means for adhesively coating opposite margins of the shell, and means adjacent to the assembly contact position for turning projecting cover margins, and securing them to the adhesively coated shell margins.

119. In box blank assembly mechanism, a blank transfer carriage, means for reciprocating the carriage, and means for locking the carriage at one end of its travel.

120. In box blank assembly mechanism, a blank transfer carriage, means for reciprocating the carriage and means for moving and locating the carriage at ends of its travel.

121. In box blank assembly mechanism, a blank transfer carriage, means for reciprocating the carriage, stops to limit the carriage movement, and means for locking the carriage at one end of its travel.

122. In box blank assembly mechanism, a blank transfer carriage, means for reciprocating the carriage, stops to limit the carriage movement, and means for moving and locating the carriage at ends of its travel.

123. In box blank assembly mechanism, a blank transfer carriage, means for reciprocating the carriage, means to yieldingly check the carriage, and additional means for locking the carriage at one end of its travel.

124. In box blank assembly mechanism, a blank transfer carriage, means for reciprocating the carriage, means to yieldingly check the carriage near the ends of its travel, and means for moving and locating the carriage at ends of its travel.

125. In box blank assembly mechanism, a reciprocating blank carriage, means for driving the carriage to and fro throughout the greater part of its travel, a stop to limit the carriage movement, a jaw movable to engage and draw the carriage against the stop, and means to yieldingly check the carriage near the end of its stroke.

126. In box blank assembly mechanism, a reciprocating blank carriage, means for driving the carriage to and fro throughout the greater part of its travel, stops to limit the carriage movement, jaws movable to engage and draw the carriage against the corresponding stop at each end of its movement, and means to yieldingly check the carriage near each end of its stroke.

127. Box blank assembly mechanism comprising a blank carriage, a guide-way on which the carriage is mounted to reciprocate, means for raising and lowering the guideway, means for positively reciprocating the carriage throughout a greater part of its travel, additional means for positively moving the carriage near each end of its travel, and positive stops to limit carriage movement.

128. Box blank assembly mechanism comprising a blank carriage, a guide-way on which the carriage is mounted to reciprocate, means for raising and lowering the guideway, means for positively reciprocating the carriage throughout a greater part of its travel, additional means for positively moving the carriage near each end of its travel, positive stops to limit carriage movement, and means for yieldingly checking carriage movement.

129. In box forming mechanism, instrumentalities located at a box end forming station and operated in timed relation and comprising means for turning in box assembly corner laps, means for lifting box shell end wings, and means for folding box cover end wing portions.

130. In box forming mechanism, instrumentalities located at a box end forming station and operated in timed relation and comprising means for turning in box assembly corner laps, means for lifting box shell end wings, and means for folding box cover end wing margins about box shell end wings.

131. In a box machine, blank selecting and handling mechanism comprising a carriage, a selector head thereon having a blank engaging face, and a blank engaging device movably mounted within the head.

132. In a box machine, blank selecting and handling mechanism comprising a carriage, a selector head thereon having blank engaging stencil faces, and a blank engaging device movably mounted within the head.

133. In a box machine, blank selecting and handling mechanism comprising a carriage, a selector head thereon having a blank engaging face, and a blank engaging device movably mounted within the head, said blank engaging device being provided with blank gripping means.

134. In a box machine, blank selecting and handling mechanism comprising a carriage, a selector head thereon having blank engaging stencil faces, and a blank engaging device movably mounted within the head, said blank engaging device being provided with a suction blank gripper.

135. In a box machine, blank selecting and handling mechanism comprising a carriage, a selector head thereon having a blank engaging face, a blank engaging device movably mounted within the head, and means for raising and lowering said blank engaging device in relation to the selector head and in timed relation to blank transferring movements of the carriage.

136. In a box machine, blank selecting and handling mechanism comprising a carriage, a selector head thereon having blank engaging stencil faces, a blank engaging device movably mounted within the head, means for raising and lowering said blank engaging device in relation to the selector head, and means for retaining it in a plurality of different positions.

137. In a box machine, shell blank selecting and transfer mechanism comprising a carriage, ways on which the carriage is mounted for blank transfer movement, a blank selector head on the carriage provided with a blank engaging surface, a blank supporting, gripping and ejecting head within the selector head, and arranged for relative movement, means urging the ejector head upward, means for holding it substantially flush with the blank engaging selector surface, and means for releasing said holding means.

138. In a box machine, shell blank selecting and transfer mechanism comprising a carriage, ways on which the carriage is mounted for blank transfer movement, a blank selector head on the carrage provided with downwardly presented blank engaging stencil surfaces, a blank supporting, gripping and ejecting head within the selector head, and arranged for relative vertical movement, means urging the ejector head upward, means for holding it substantially flush with the blank engaging selector surfaces, means for releasing said holding means, and other means for holding the ejector head in a position below the stencil surfaces.

139. In a box machine of the character described, a reciprocating blank carriage, a rack on the carriage, a pinion support, two pinions thereon, means for oscillating the support to engage the pinions alternately with the rack to reciprocate the carriage, and means for driving the pinions in opposite directions.

140. In a box machine of the character described, a reciprocating blank carriage, a rack on the carriage, a pinion support, two pinions thereon, means for oscillating the support to engage the pinions alternately with the rack to reciprocate the carriage, and means for intermittently driving the pinions in opposite directions with relation to each other.

141. In a box machine, in combination with means for selecting and transporting a box blank, gluing mechanism comprising a glue trough, two glue rolls, means for supplying glue from the trough to the rolls, and means for moving the glue rolls to alternately cooperate with the blank transfer mechanism.

142. In a box machine, in combination with means for selecting and transporting a box blank, gluing mechanism comprising a glue trough, two glue rolls, means for driving them, means for supplying glue from the trough to the rolls, and means for moving the glue rolls to alternately cooperate with the blank transfer mechanism.

143. In a box machine, in combination with means for selecting and transferring a box blank, a glue trough, two glue rolls rotatably mounted thereon, means for driving the rolls in opposite directions, and means for oscillating the trough to render the glue rolls alternately operative.

144. In a box machine, in combination with means for selecting and transferring a box blank, a glue trough, two glue rolls rotatably mounted thereon, means for intermittently driving the rolls in opposite directions, and means for oscillating the trough to render the glue rolls alternately operative.

145. In a box machine, in combination with means for selecting and transferring a box blank, a glue trough, two glue rolls rotatably mounted thereon, means for driving the rolls in opposite directions, means for oscillating the trough to render the glue rolls alternately operative, and an oscillating glue dipper for supplying glue from the trough to the rolls.

146. In a box machine, in combination with means for selecting and transferring a box blank, a glue trough, two glue rolls rotatably mounted thereon, means for intermittently driving the rolls in opposite directions, means for oscillating the trough to render the glue rolls alternately operative, and an oscillating glue dipper for supplying glue from the trough to the rolls.

147. In a box machine, in combination with blank selecting and transferring mechanism, a glue trough having two glue compartments, two glue rolls adjacent to the trough, and means for supplying glue from each glue compartment to its corresponding glue roll.

148. In a box machine, in combination with blank selecting and transferring mechanism, a glue trough having two glue compartments, two glue rolls adjacent to the trough and an oscillating dipper for supplying glue from each glue compartment to its corresponding glue roll.

149. In a box machine, glue supply mechanism comprising an oscillating trough having two glue compartments a part cylindrical dipper arranged for oscillation in relation to the trough so that its dipping surface alternately enters the two compartments, two glue rolls rotatably mounted on the trough above the dipper, means for driving the rolls in opposite directions, and means for oscillating the trough.

150. In a box machine, a reciprocating blank carriage, a box blank selector thereon, an oscillating glue trough, two glue rolls mounted for rotation thereon, means for supplying glue from the trough to the rolls, means for oscillating the trough, a pinion connected to each glue roll and a rack on the carriage arranged to be alternately engaged by the pinions as the trough is oscillated.

151. In a box machine, a reciprocating blank carriage, a rack thereon, an oscillating pinion carrier, two pinions rotatably mounted thereon and arranged to be alternately engaged with the rack, means for oscillating the pinion carrier, a main driving member, a clutch and connections thereon for driving the pinions simultaneously in opposite directions whenever the clutch is engaged.

152. In a box machine, means for forming and positioning a substantially flat blank assembly consisting of two blanks in face contact, means for pressing a margin of the assembly, and means associated with the pressing means for punching a finger notch in an assembly margin.

153. In a box machine, means for forming and positioning a substantially flat blank assembly consisting of two blanks in face contact, means for pressing margins of the assembly, and means associated with the pressing means for punching finger notches in assembly margins.

154. In a box machine, assembly pressing and cutting mechanism comprising stationary presser bars, movably mounted presser bars, a punch carried by one of the stationary bars and a cooperating punch member carried by the cooperating movable bar to punch a thumb notch in a margin of the assembly when the presser bars are operated to press the assembly.

155. In a box machine, assembly pressing and cutting mechanism comprising stationary presser bars, pivotally mounted presser bars, means for moving the pivotal bars, punches carried by certain of the bars and cooperating punch members carried by other of the bars to punch thumb notches in margins of the assembly when the presser bars are operated to press the assemblies.

156. In a box machine for forming substantially flat blank assemblies, each consisting of a shell blank and a cover blank, cover blank feed mechanism comprising a support for a stack of cover blanks, a blank gripping head, a shaft carrying the head, guides and slide blocks therein pivotally supporting the shaft, means for raising and lowering the slide blocks, and means for rotating the shaft a part turn during the to and fro movements of the gripping head.

157. In a box machine for forming substantially flat blank assemblies, each consisting of a shell blank and a cover blank, cover blank feed mechanism comprising a support for a stack of cover blanks, a blank selecting suction head, a shaft carrying the head, guides and slide blocks therein pivotally supporting the shaft, means for raising and lowering the slide blocks, means for rotating the shaft a part turn during the to and fro movements of the suction head, and suction gripping means on the suction head.

158. In a box machine, a plurality of blank and box manipulating devices, a driving member and driving connections from the driving member to said devices, including change speed gearing and control means for driving the various instrumentalities at high and low speeds.

159. In a box machine, a plurality of blank and box manipulating devices, a driving member and driving connections from the driving member to said instrumentalities, including change speed gearing and clutch means for stopping, starting and driving the machine at relatively high and low speeds.

160. In a box making machine, a plurality of box forming stations and means for forwarding boxes from one station to another comprising a reciprocating feed bar, means for reciprocating the bar, and pneumatic box grippers arranged on the bar at intervals corresponding to the forming station intervals.

161. In a box making machine, a plurality of box forming stations and means for forwarding boxes from one station to another comprising a reciprocating feed bar, means for reciprocating the bar, pneumatic box grippers arranged on the bar at intervals corresponding to the forming station intervals, and means for raising the grippers to box engaging position during advance movement of the feed bar and for lowering them during return movement.

162. In a box making machine, a plurality of box forming stations and means for forwarding boxes from one station to another comprising a reciprocating feed bar, means for reciprocating the bar, and pairs of pneumatic box grippers arranged on the bar at intervals corresponding to the forming station intervals.

163. In a box making machine, a plurality of box forming stations and means for forwarding boxes from one station to another comprising a reciprocating feed bar, means for reciprocating the bar, pairs of pneumatic box grippers arranged on the bar at intervals corresponding to the forming station intervals, and means for raising the grippers to box engaging position during advance movement of the feed bar and for lowering them during return movement.

164. In a box making machine, a plurality of box forming stations and means for forwarding boxes from one station to another comprising a reciprocating feed bar, means for reciprocating the bar, pneumatic box grippers arranged on the bar at intervals corresponding to the forming station intervals, the grippers being provided with air passages in communication with an air passage in the feed bar, means for drawing air from the feed bar air passage, and means for shutting off connection between the feed bar air passage and the individual grippers in absence of a box.

165. In a box making machine, a plurality of box forming stations and means for forwarding boxes from one station to another comprising a reciprocating feed bar, means for reciprocating the bar, pairs of pneumatic box grippers arranged on the bar at intervals corresponding to the forming station intervals, the grippers being provided with air passages in communication with an air passage in the feed bar, means for drawing air from the feed bar air passage, and means for shutting off connection between the feed bar air passage and the individual grippers when suction is applied in absence of a box.

166. In a machine for making box forming assemblies, each assembly consisting of a flat shell blank and an attached wrapper blank, a plurality of stations arranged in series, two of which stations constitute shell blank and cover-blank supplies respectively, one of said stations having devices thereat for performing assembly forming operations, and means for simultaneously transferring assembly elements from a plurality of said stations.

167. In a machine for making box forming assemblies, each assembly consisting of a flat shell-blank and an attached cover blank, a plurality of assembly forming stations each having means thereat for performing an assembly forming operation, a movable carriage, a plurality of transferring devices mounted on the carriage, means for imparting horizontal reciprocating movements to the carriage, and means for imparting vertical reciprocating movements thereto in directions toward and from the several stations to cause the said devices to pick up and transfer assembly elements.

168. In a machine for making box forming assemblies, a shell blank supply station, a cover blank supply station, a glue applying device intermediate said stations, and a combined stenciling and transporting device movable back and forth between said stations and operable to take a supply of glue from the gluing device in its movement thereover and then apply the same to the face of a shell blank.

169. In a machine for making box forming assemblies, a support for a shell blank, a support for a cover blank spaced therefrom, a glue applying roll intermediate said supports, and a combined stenciling and transporting device movable back and forth between the said supports and operable to take glue from said roll in its movement thereover and apply the same to the face of a shell blank.

170. In a machine for making box forming assemblies, a support for a shell blank, a support for a cover blank spaced therefrom, a glue applying roll intermediate said supports, and a combined stenciling and transporting device movable back and forth between the said supports and operable to take glue from said roll in its movement thereover and apply the same to the face of a shell blank, and also operable to pick up and transfer the stenciled blank away from its support.

171. In a machine for making box forming assemblies, a support for a shell blank, a support for a cover blank spaced therefrom, a glue applying roll intermediate said supports, and a combined stenciling and transporting device movable back and forth between the said supports and operable to take glue from said roll in its movement thereover and apply the same to the face of a shell blank; and also operable to pick up and transfer the stenciled blank away from its support and deposit it flatwise onto an ungummed cover blank.

172. In a machine for making box forming assemblies, a shell blank support, a cover blank support, a glue applying member intermediate said supports, a combined stenciling and transporting device movable back and forth between said supports and operable to take a supply of glue from the gluing member in its movement thereover and apply the same to the face of a shell blank, and mechanism for inturning marginal edges of the cover blank over opposite edges of and affixing them to the adhesively coated portions of the shell blank, the said stenciling and transporting device being operable to deliver the stenciled shell blank onto a cover blank.

173. In a machine for making box forming assemblies, a support for a shell blank, a support for a cover blank spaced therefrom, a pair of glue applying rolls intermediate said supports, a combined stenciling and transporting device movable back and forth between said supports, and means for causing said stenciling device to contact with one of said rolls during its movement in one direction and for making contact with the other roll during its movement in the opposite direction.

174. In a machine for making box forming assemblies, a support for a shell blank, a support for a cover blank spaced therefrom, a glue applying roll intermediate said supports, a combined stenciling and transporting device movable back and forth between the supports and operable to take glue from said roll in its movement thereover and apply the same to the face of a shell blank, and an assembly transferring device connected to move in unison with the combined stenciling and transporting device.

175. In a machine for making box forming assemblies, a support for a shell blank, a support for a cover blank spaced therefrom, a glue applying device intermediate said supports, a combined stenciling and transporting device movable back and forth between said supports and operable to take glue from said device in its movement thereover and apply the same to the face of a shell blank, an assembly folding mechanism for forming the assembly into box form, and an assembly transferring device operative to transfer the assembly to the assembly folding mechanism.

176. In a machine for making box forming assemblies, a plurality of assembly forming stations including a station for shell blanks, a source of supply of adhesive located between adjacent stations, and an adhesive applying device movable back and forth between said stations and in cooperative relation with said adhesive source, said adhesive applying device operating to transport box forming blanks from one station to another successively.

177. In a machine for making box forming assemblies, a plurality of assembly forming stations, each provided with a blank support, and an adhesive applying device movable back and forth and toward and from said supports, said adhesive applying device operating to transfer a blank from one support to a position above the other support.

178. In a machine for making box forming assemblies, a plurality of assembly forming stations, one of which is a shell blank supply station, an adhesive applying device having stencils movable back and forth and toward and from the stations, operable to transport shell blanks from the supply station to an adjacent station, and means for transferring assembly elements from one of the stations.

179. In a machine for making box forming assemblies from flat blanks, a plurality of assembly forming stations, means for associating a body and a cover blank in substantially flat assembly contact at a first assembly forming station, means at that station for folding marginal edges of the cover blank over edges of and affixing the same to the body blank.

180. In a machine for making assemblies from which covered paper boxes may be made, means for transporting a flat shell blank and depositing it onto a flat wrapper blank to provide an assembly, means for folding marginal edges of the wrapper blank over and adhesively attaching them to the opposite marginal edges of a shell blank while the assembly is supported in a flat condition, and means for transferring the assembly.

181. In a machine for making flat assemblies from which covered paper boxes may be made, means for applying adhesive to opposite faces of a substantially flat shell blank, means for superposing a flat shell blank onto a flat wrapper blank, and means for folding marginal edges of the wrapper blank over and adhesively attaching them to opposite marginal edges of the shell blank to provide a substantialy flat assembly.

182. In a machine for making box forming assemblies from a shell blank and a cover blank, means for applying adhesive to the shell blank and for transporting the same, means for selecting and positioning a wrapper blank for application thereto of the shell blank, said transporting and selecting means being adapted to support the blanks from opposite faces thereof, and means for turning marginal edges of the wrapper blank over and affixing them to the shell blank while the two blanks are thus supported to provide a substantially flat assembly.

183. In a machine for making box forming assemblies from a wrapper and a superposed shell blank, a support for the shell blank, a support for the wrapper blank, an invertible selector operable to lift the wrapper blank from its support and maintain it flatwise, and means for superposing thereon a shell blank having adhesive on one of its faces.

184. In a machine for making a box forming assembly from a shell blank and a wrapper blank, a support for the shell blank, a support for the wrapper blank, an invertible selector for taking the wrapper blank from its support and maintaining it flatwise in position to receive the shell blank, and means for applying adhesive to a face of the shell blank, said means also operating to transport the shell blank for its support to the position of the wrapper blank.

185. In a machine for making covered paper boxes, means for forming a flat assembly from a shell blank and a wrapper blank and wherein the marginal edges of the wrapper blank are inturned and adhesively affixed to a face of the shell blank, assembly folding instrumentalities for folding the assembly into box form, and means for inturning and affixing the remaining marginal portions of the wrapper blank to the inner walls of the formed box shell after the latter has been folded to box form.

186. In a machine for making covered paper boxes, means for producing an assembly consisting of a flat shell blank and a flat wrapper blank, and wherein marginal portions of the wrapper blank are inturned over and affixed to opposite marginal edges of the assembly leaving other marginal edges free, assembly folding instrumentalities for folding the assembly into box form, means for carrying the assembly through said instrumentalities, fixed folding wings for inturning the remaining free marginal portions of the wrapper blank, and means for advancing the formed box in association with said wings.

187. In a machine for making covered paper boxes, means for forming a flat assembly consisting of superposed shell and wrapper blanks, assembly folding instrumentalities, means for transferring an assembly from its forming means to the said instrumentalities, means for carrying the assembly through said instrumentalities to fold the same into box form, and means operable upon the vertical walls of the box to shape the same.

188. A machine for making covered boxes, comprising means for producing a substantially flat blank-assembly including a sheet of shell material and a sheet of cover material and positioning the assembly for folding, and folding mechanism including means for separating shell end wings from cover end wings of the assembly.

189. A machine for making covered boxes, comprising means for producing a substantially flat blank-assembly including a sheet of shell material and a sheet of cover material and positioning the assembly for folding, folding mechanism including means for separating shell and wings from cover end wings of the assembly, and means for turning assembly corner laps in between the shell and cover end wings.

190. A machine for making covered boxes, comprising means for producing a substantially flat blank-assembly including a sheet of shell material and a sheet of cover material and positioning the assembly for folding, folding mechanism including means for separating shell end wings from cover end wings of the assembly, means for turning assembly corner laps in between the shell and cover end wings, and means for bringing the shell and cover end wings and the corner laps in close contact and securing these parts together.

191. A machine for making covered boxes, comprising means for producing a substantially flat blank-assembly including a sheet of shell material and a sheet of cover material and positioning the assembly for folding, folding mechanism including means for separating shell end wings from cover end wings of the assembly, means for turning assembly corner laps in between the shell and cover end wings, means for bringing the shell and cover end wings and the corner laps in close contact, and means for folding in a projecting end margin of a cover end wing and securing said margin to an inner surface of the box end structure.

192. A machine for making covered boxes, comprising means for producing a substantially flat blank-assembly including a sheet of shell material and a sheet of cover material and positioning the assembly for folding, and folding mechanism including means capable of producing tuck folds in end wings of the cover sheet.

193. A machine for making covered boxes, comprising means for producing a substantially flat blank-assembly including a sheet of shell material and a sheet of cover material and positioning the assembly for folding, folding mechanism including means for separating shell end wings from cover end wings of the assembly, means for turning assembly corner laps in against the shell end wings, and means for turning up the cover end wings against the corner laps and producing tuck folds in the cover end wings.

194. A machine for making covered boxes comprising means for producing a substantially flat blank-assembly including a sheet of shell material and a sheet of cover material and positioning the assembly for folding, folding mechanism including means for bending in assembly corner laps, means for turning up end wings exterior to the corner laps, and means for completing the box end formation by turning in and adhesively securing end margins of the cover end wings to inner surfaces of the end structure.

195. A machine for making covered boxes, comprising means for producing a substantially flat blank-assembly including a sheet of shell material and a sheet of cover material and positioning the assembly for folding, folding mechanism including means for turning inward assembly corner laps and means for turning up assembly end wing portions exterior to the corner laps.

196. A machine for making covered boxes, comprising means for producing a substantially flat blank-assembly including a sheet of shell material and a sheet of cover material and positioning the assembly for folding, folding mechanism including means for turning inward assembly corner laps, means for turning up assembly end wing portions exterior to the corner laps, and means for completing the box end formation by turning in and adhesively securing end margins of the cover wings to inner faces of the end structure.

197. In a machine for making covered boxes in which a composite blank consisting of a shell blank and a cover blank adhesively connected and provided with cooperating end wing and corner lap formations is presented for folding, end folding mechanism comprising means for separating shell end wings from cover end wings, and means for turning assembly corner laps in between the shell and cover end wings.

198. In a machine for making covered boxes in which a composite blank consisting of a shell blank and a cover blank adhesively connected and provided with cooperating end wing and corner lap formations is presented for folding, end folding mechanism comprising means for separating shell end wings from cover end wings, means for turning assembly corner laps in between the shell and cover end wings, and means for bringing the shell and cover end wings in close contact with the interposed assembly corner laps.

199. In a machine for making covered boxes in which a composite blank consisting of a shell blank and a cover blank adhesively connected and provided with cooperating end wing and corner lap formations is presented for folding, end folding mechanism comprising means for separating shell end wings from cover end wings, means for turning assembly corner laps in between the shell and cover end wings, and means for bringing the shell and cover end wings in close contact with the interposed assembly corner laps and securing these parts together.

200. In a machine for making covered boxes in which a composite blank consisting of a shell blank and a cover blank adhesively connected and provided with cooperating end wing and corner lap formations is presented for folding, end folding mechanism comprising means for folding in a projecting end margin of a cover end wing and securing said margin adhesively to an inner surface of the box end structure.

201. In a machine for making covered boxes in which a composite blank consisting of a shell blank and a cover blank adhesively connected and provided with cooperating end wing and corner lap formations is presented for folding, end folding mechanism comprising means capable of separating shell end wings from cover end wings, means for turning assembly corner laps in between the shell and cover end wings, means for bringing the shell and cover end wings in close contact with the interposed assembly corner laps, and means for folding in a projecting end margin of a cover end wing and securing said margin adhesively to an inner surface of the box end structure.

202. In a machine for making covered boxes in which a composite blank consisting of a shell blank and a cover blank adhesively connected and provided with cooperating end wing and corner lap formations is presented for folding, and end folding mechanism comprising means for producing tuck folds in end wings of the cover sheet.

203. In a machine for making covered boxes in which a composite blank consisting of a shell blank and a cover blank adhesively connected and provided with cooperating end wings and corner lap formations is presented for folding, and end folding mechanism comprising means for turning in assembly corner laps and for then turning up assembly end wing portions exterior to the corner laps.

204. In a machine for making covered boxes in which a composite blank consisting of a shell blank and a cover blank adhesively connected and provided with cooperating end wing and corner lap formations is presented for folding, and end folding mechanism comprising means for turning in assembly corner laps and for then turning up assembly end wing portions exterior to the corner laps, and means for turning in and adhesively securing end margins of the cover end wings to inner surfaces of the end structure.

205. A machine for making covered paper boxes comprising means for automatically positioning successive composite blank assemblies for folding, each blank comprising a shell blank and a cover blank having cooperating end wing and lap formations, and mechanism at a folding station constructed and arranged to operate on the successive composite blanks, said mechanism comprising means for separating shell end wings from cover end wings of the composite blank.

206. A machine for making covered paper boxes comprising means for automatically positioning successive composite blank assemblies for folding, each blank comprising a shell blank and a cover blank having cooperating end wing and lap formations, mechanism at a folding station constructed and arranged to operate on the successive composite blanks, said mechanism comprising means for separating shell end wings from cover end wings of the composite blank, and means for turning assembly corner laps in between the shell and cover end wings.

207. A machine for making covered paper boxes comprising means for automatically positioning successive composite blank assemblies for folding, each blank comprising a shell blank and a cover blank having cooperating end wing and lap formations, mechanism at a folding station constructed and arranged to operate on the successive composite blanks, said mechanism comprising means for separating shell end wings from cover end wings of the composite blank, means for turning assembly corner laps in between the shell and cover end wings, and means for bringing the shell and cover end wings in close contact with the interposed assembly corner laps.

208. A machine for making covered paper boxes comprising means for automatically positioning successive composite blank assemblies for folding, each blank comprising a shell blank and a cover blank having cooperating end wing and lap formations, mechanism at a folding station constructed and arranged to operate on the successive composite blanks, said mechanism comprising means for separating shell end wings from cover end wings of the composite blank, means for turning assembly corner laps in between the shell and cover end wings, means for bringing the shell and cover end wings in close contact with the interposed assembly corner laps, and means for securing these parts together.

209. A machine for making covered paper boxes comprising means for automatically positioning successive composite blank assemblies for folding, each blank comprising a shell blank and a cover blank having cooperating end wing and lap formations, mechanism at a folding station constructed and arranged to operate on the successive composite blanks, said mechanism comprising means for separating shell end wings from cover end wings of the composite blank, means for turning assembly corner laps in between the shell and cover end wings, means for bringing the shell and cover end wings in close contact with the interposed assembly corner laps, and means for folding in a projecting end margin of a cover end wing and securing said margin adhesively to an inner surface of the box end structure.

210. A machine for making covered paper boxes comprising means for automatically positioning successive composite blank assemblies for folding, each blank comprising a shell blank and a cover blank having cooperating end wing and lap formations, mechanism at a folding station constructed and arranged to operate on the successive composite blanks, said mechanism comprising means for turning inward assembly corner laps and for then turning up assembly end wing portions exterior to the corner laps.

211. A machine for making covered paper boxes comprising means for automatically positioning successive composite blank assemblies for folding, each blank comprising a shell blank and a cover blank having cooperating end wing and lap formations, mechanism at a folding station constructed and arranged to operate on the successive composite blanks, said mechanism comprising means for turning inward assembly corner laps and for then turning up assembly end wing portions exterior to the corner laps, and means for turning in and adhesively securing end margins of the cover end wings to inner surfaces of the end structure.

212. A machine for making covered paper boxes comprising means for automatically positioning successive composite blank assemblies for folding, each blank comprising a shell blank and a cover-blank having cooperating end wing and lap formations, and mechanism at a folding station constructed and arranged to operate on the successive composite blanks, said mechanism comprising means capable of producing tuck folds in end wings of the cover sheet.

213. An automatic machine for making covered paper boxes, comprising means for automatically positioning substantially flat blank assemblies for folding, said blanks each comprising a shell blank and a cover blank adhesively secured together and having cooperating end wing and corner lap formations, operating means for blank-end forming instrumentalities, and means for interchangeably connecting different end forming instrumentalities for manipulating the end portions of the assemblies in different ways to produce different kinds of box end structures.

214. In an automatic machine for making covered paper boxes, means for presenting composite assembly blanks at a folding station, each blank comprising a shell blank and a cover blank having wing portions temporarily secured together by unhardened adhesive, and end folding and forming instrumentalities comprising means for separating the shell wings from the cover wings, means for inturning other adjacent portions of the blank between said wings, and means for pressing said wings in contact with the interposed blank portions.

215. In an automatic machine for making covered paper boxes, means for presenting composite assembly blanks, at a folding station, each blank comprising a shell blank and a cover blank having wing portions temporarily secured together by unhardened adhesive, and end folding and forming instrumentalities comprising means for separating the shell wings from the cover wings, means for inturning other adjacent portions of the blank between said wings, means for pressing said wings in contact with the interposed blank portions, and means for turning in and adhesively securing projecting cover wing margins on interior surfaces of the folded blank structure.

216. In an automatic machine for making paper boxes, in which successive blank assemblies, each consisting of a shell blank and a cover blank adhesively connected and having cooperating corner lap formations and also having cooperating end wings substantially in facial contact and secured together by unhardened adhesive, are positioned for folding, a folding station, and means thereat for separating the shell end wings from the cover end wings, means for turning in the corner laps, and means for pressing the assembly end wings against the interposed corner laps to cause adhesion of the adhesively-coated faces of the wings to the corner laps.

217. In an automatic machine for making paper boxes, in which successive blank assemblies, each consisting of a shell blank and a cover blank adhesively connected and having cooperating corner lap formations and also having cooperating end wings substantially in facial contact and secured together by unhardened adhesive, are positioned for folding, a folding station, and means thereat for grasping and holding and subsequently releasing the cover end wings, means for separating the shell end wings from the cover end wings, means for turning in the corner laps, and means for pressing the assembly end wings against the interposed corner laps to cause adhesion of the adhesively-coated faces of the wings to the corner laps.

218. In an automatic machine for making paper boxes, means for producing successive blank assemblies, each consisting of a shell blank and a cover blank adhesively connected and having cooperating corner lap formations and also having cooperating end wings substantially in facial contact and secured together by unhardened adhesive, means for positioning sucessive blank assemblies at a folding station, and means at the folding station for separating the shell end wings from the cover end wings, means for turning in the corner laps and positioning them between the shell and cover wings, and means for pressing the shell and cover end wings against the interposed corner laps.

219. In an automatic machine for making paper boxes, means for producing successive blank assemblies, each consisting of a shell blank and a cover blank adhesively connected and having cooperating corner lap formations and also having cooperating end wings substantially in facial contact and secured together by unhardened adhesive, means for positioning successive blank assemblies at a folding station, and means at the folding station for grasping and holding and subsequently releasing the cover end wings, means for separating the shell end wings from the cover end wings, means for turning in the corner laps and positioning them between the shell and cover wings, and means for pressing the shell and cover end wings against the interposed corner laps.

220. In a box making machine in which substantially flat blank assemblies, each consisting of a shell blank and an attached cover blank are presented at a folding station, means at the folding station for movably supporting the assembly, a forming plunger arranged to engage the assembly and hold it on the supporting means, means for successively folding different parts of the assembly end structure, and means for depressing the assembly to a position for its advance to a subsequent work-position.

221. In a box making machine in which substantially flat blank assemblies, each consisting of a shell blank and an attached cover blank are presented at a folding station, means at the folding station for movably supporting the assembly, a forming plunger arranged to engage the assembly and hold it on the supporting means, means acting while the assembly is so supported and held to position projecting corner lap members of the assembly, means for separating shell end wings from cover end wings and raising the shell wings to substantially vertical position, means for turning the corner laps in against the shell end wings, means for turning up the cover end wings against the corner laps, means for depressing the assembly, and means for pressing the assembly end structure.

222. In a box making machine in which substantially flat blank assemblies, each consisting of a shell blank and an atached cover blank are presented at a folding station, means at the folding station for movably supporting the assembly near its ends, a forming plunger arranged to engage the assembly and hold it on the supporting means, means for manipulating parts of the assembly end structure, and means for depressing the assembly and concurrently folding other parts of the assembly end structure.

223. In a box making machine in which substantially flat blank assemblies, each consisting of a shell blank and an attached cover blank are presented at a folding station, means at the folding station for movably supporting the assembly near its ends, a forming plunger arranged to engage the assembly and hold it on the supporting means, retractable means acting while the assembly is so supported and held to position projecting corner lap members of the assembly, means acting to separate shell end wings from cover end wings and raise the shell wings to substantially vertical position, means for turning the corner laps in against the shell end wings, means for turning up the cover end wings against the corner laps, means for depressing the assembly, means for pressing the assembly end structure, and means for advancing the assembly and turning in and securing projecting cover margins.

224. In a box making machine in which substantially flat blank assemblies, each consisting of a shell blank and an attached cover blank are presented at a folding station, assembly side wing folding members above which the assembly is positioned, a plunger for depressing the assembly between said members which turn up the side wings, supports engaging below the assembly, said supports being depressibly arranged, means for moving the side wing folders convergently to press the side wings against the plunger, means acting successively on different end members of the assembly to fold said members in approximately final end formation, means for depressing the assembly, and means for pressing the assembly end structure.

225. In a box making machine in which substantially flat blank assemblies, each consisting of a shell blank and an attached cover blank are presented at a folding station, assembly side wing folding members above which the assembly is positioned, an expansible plunger for depressing the assembly between said members which turn up the side wings, supports engaging below the assembly near its ends, said supports being depressibly arranged, means for moving the side wing folders convergently to press the side wings against the plunger, means acting successively on end members of the assembly to fold and temporarily secure said members in approximately final end formation, means for depressing the assembly, means for pressing the assembly end structure, means for advancing the assembly to another work-position, and means for turning in and securing projecting cover margins.

226. In a box making machine in which substantially flat blank assembles, each consisting of a shell blank and an attached cover blank are presented at a principal folding station, side wing folders at that station, a forming plunger located above the assembly when initially positioned at the folding station, assembly supports arranged for depression along with the plunger and assembly, means for moving the side wing folders convergently after the assembly is located between them, means for lifting shell end wings away from the cover end wings, means for turning in the corner laps, means for folding up the cover end wings, means for depressing the assembly, and means at a lower position of the assembly for pressing the end structure.

227. In a box making machine in which substantially flat blank assembles, each consisting of a shell blank and an attached cover blank are presented at a principal folding station, side wing folding and pressing plates at that station, a forming plunger located above the assembly when initially positioned at the folding station, assembly supports arranged for depression along with the plunger and assembly, means for moving the side wing folding plates convergently after the assembly is located between them, means for positioning projecting corner laps of the assembly, means for lifting shell end wings away from the cover end wings, means for retracting the corner lap positioning means, means for turning in the corner laps, means for then folding up the cover end wings, means for depressing the assembly, means at a lower position of the assembly for pressing the end structure, means for transferring the assembly to another folding station, means acting during the transfer of the assembly to turn projecting cover margins inward, and means at a subsequent folding station for turning down and securing the cover margins to inner faces of the box end structure.

228. In a box machine of the class described, a folding station, assembly blank holding and supporting means thereat, shell wing lifters arranged for convergent movement and also arranged for a downward and upward movement to engage shell wings and then lift them to approximately vertical position away from underlying cover end wings, means for turning in the corner laps, and means supporting the cover end wings and arranged for movement after the corner laps are turned in to bring the cover end wings up against the corner laps.

229. In a box machine of the class described, a folding station, assembly blank holding and supporting means thereat, shell wing lifters arranged for convergent movement and also arranged for a downward and upward movement to engage shell wings and then lift them to approximately vertical position away from underlying cover end wings, means for temporarily positioning projecting assembly corner laps, means for turning in the corner laps, and a pivoted plate supporting the cover end wings and arranged for movement after the corner laps are turned in to bring the cover end wings up against the corner laps.

230. In a box machine of the class described, a folding station, assembly corner lap folding means at the folding station comprising turning fingers, arms carrying the fingers, slides on which the arms are pivotally mounted, means for moving the slides, and means acting on the arms during slide advance to move the arms toward the box assembly after the ends of the turning fingers have encountered the assembly corner laps, to turn and press the corner laps inward in relation to other parts of the box end structure.

231. In a box machine of the class described, a folding station, assembly corner lap folding means at the folding station comprising turning fingers, arms carrying the fingers, slides on which the arms are pivotally mounted, blocks supporting the slides and adjustably supported to suit different box-lengths, means for moving the slides, and a cam and cam follower acting during slide advance to move the arms toward the box assembly after the ends of the turning fingers have encountered the assembly corner laps, to turn and press the corner laps inward in relation to other parts of the box end structure.

232. In a box machine of the class described, a folding station, and folding mechanism thereat including pivoted plates for supporting end-wing portions of a blank assembly, means for moving the plates about their pivotal axis, and means associated with the plates and acting during their pivotal movement to fold cover wing margins about the edges of the shell end wings and press the cover margins in position thereon.

233. In a box machine of the class described, a folding station, and folding mechanism including pivoted plates for supporting end-wing portions of a blank assembly, means for moving the plates about their pivotal axis, folding blades associated with the plates, and means acting during said pivotal movement to move the folding blades to fold cover wing margins about the edges of the shell end wings and press the cover margins in position thereon.

234. In a box machine of the class described, a folding station, depressible means for yieldably supporting a box-blank assembly, means for internally supporting the assembly and holding it on the supporting means during depression, folding members adjacent to the assembly end structure for turning up cover end wings during depression of the assembly, and means acting prior to the depression movement to temporarily grip and hold projecting end wing margins, stripper members arranged to engage under the ends of the shell end wings and strip them from the cover end wings and raise the shell wings to substantially vertical position, means for turning the assembly corner laps inward against the shell end wings, and means acting after depression of the assembly and the turning up of the cover end wings to press the assembly end structure.

235. In a box machine of the class described, a folding station, depressible means for yieldably supporting a box-blank assembly, means for internally supporting the assembly and holding it on the supporting means during depression, rolls adjacent to the assembly ends for turning up cover end wings during depression of the assembly, means acting prior to the depression movement to temporarily grip and hold projecting end wing margins, stripper members pivotally and convergently movable and arranged to engage under the ends of the shell end wings and strip them from the cover end wings and raise the shell wings to substantially vertical position, means for turning the assembly corner laps inward against the shell end wings, and means acting after depression of the assembly and the turning up of the cover end wings to press the assembly end structure.

236. In a box machine of the class described, folding mechanism comprising an extensible forming plunger, means for moving the plunger vertically, side wing folders, means for moving them convergently, corner lap folders arranged for convergent movement in planes approximately parallel to the assembly ends and also arranged for movement at substantially a right angle to said planes, assembly end wing manipulating devices arranged for movement substantially toward and from the ends of the assembly, and depressible means supporting the assembly in engagement with the forming plunger.

237. In a box machine of the class described, folding mechanism comprising an extensible forming plunger, means for moving the plunger vertically, side wing folders, means for moving them convergently, corner lap folders arranged for convergent movement in planes approximately parallel to the assembly ends and also arranged for movement at substantially a right angle to said planes, assembly end wing manipulating devices arranged for movement substantially toward and from the ends of the assembly and also for vertical movement, means movably supporting the assembly in engagement with the forming plunger, cover end wing folding devices, and box-end pressing means arranged to act on the assembly end structure after it is depressed away from the corner lap folding and end wing manipulating devices.

Signed at New York, in the county of New York and State of New York, this 1st day of September A. D. 1921.

HARRY BRIDGMAN SMITH.